(12) United States Patent
Telleria et al.

(10) Patent No.: US 10,697,188 B2
(45) Date of Patent: Jun. 30, 2020

(54) AUTOMATED DRYWALLING SYSTEM AND METHOD

(71) Applicant: Canvas Construction, Inc., San Francisco, CA (US)

(72) Inventors: Maria J. Telleria, Redwood City, CA (US); Gabriel F. Hein, Albany, CA (US); Kevin B. Albert, San Francisco, CA (US); Thomas F. Allen, Oakland, CA (US); Henrik Bennetsen, San Francisco, CA (US); Josephine Marie Pedersen, Martinez, CA (US); Jonathan B. Pompa, Long Beach, CA (US); Charlie Yan, San Francisco, CA (US)

(73) Assignee: CANVAS CONSTRUCTION, INC., San Francisco, CA (US)

( * ) Notice: Subject to any disclaimer, the term of this patent is extended or adjusted under 35 U.S.C. 154(b) by 0 days.

(21) Appl. No.: 15/942,286

(22) Filed: Mar. 30, 2018

(65) Prior Publication Data
US 2018/0283019 A1  Oct. 4, 2018

Related U.S. Application Data

(60) Provisional application No. 62/480,172, filed on Mar. 31, 2017.

(51) Int. Cl.
*E04F 21/02* (2006.01)
*E04F 21/165* (2006.01)
(Continued)

(52) U.S. Cl.
CPC .............. *E04F 21/026* (2013.01); *B05B 1/28* (2013.01); *B05B 7/0093* (2013.01); *B05B 9/007* (2013.01);
(Continued)

(58) Field of Classification Search
CPC ..... E04F 21/026; E04F 21/1657; E04F 21/12; E04F 21/0046; E04F 21/165; E04F 21/08;
(Continued)

(56) References Cited

U.S. PATENT DOCUMENTS 2,088,542 A    7/1937  Westin
2,514,748 A    7/1950  Di Stefano
(Continued)

FOREIGN PATENT DOCUMENTS

CN    2883554 Y    3/2007
CN    202023345 U   11/2011
(Continued)

OTHER PUBLICATIONS

Bao, "Flexible Pneumatic End-effector for Agricultural Robot: Design & Experiment", 2015, IEEE, pp. 2175-2176 (Year: 2015).*
(Continued)

*Primary Examiner* — Mohammad Ali
*Assistant Examiner* — David Earl Ogg
(74) *Attorney, Agent, or Firm* — Davis Wright Tremaine LLP

(57) ABSTRACT

An automated drywalling system network that include one or more automated drywalling systems that each comprise a robotic arm. The automated drywalling system network can also include one or more drywalling end effectors configured to couple to a distal end of the robotic arms of the one or more automated drywalling systems. The drywalling end effectors can include a drywall hanging end effector; a drywall mudding end effector; a drywalling sanding end effector; and a drywall painting end effector.

21 Claims, 18 Drawing Sheets

(51) Int. Cl.

| | | |
|---|---|---|
| *E04F 21/18* | (2006.01) | |
| *E04F 21/12* | (2006.01) | |
| *B05B 1/28* | (2006.01) | |
| *B05B 7/00* | (2006.01) | |
| *B05B 15/625* | (2018.01) | |
| *B05B 12/12* | (2006.01) | |
| *B05B 9/00* | (2006.01) | |
| *B25J 9/16* | (2006.01) | |
| *B25J 11/00* | (2006.01) | |
| *B26D 5/00* | (2006.01) | |
| *E04F 21/08* | (2006.01) | |
| *E04F 21/16* | (2006.01) | |
| *B24B 7/18* | (2006.01) | |
| *B24B 49/12* | (2006.01) | |
| *B24B 55/10* | (2006.01) | |
| *E04F 21/00* | (2006.01) | |
| *B05C 5/00* | (2006.01) | |
| *B05C 5/02* | (2006.01) | |
| *B05C 11/10* | (2006.01) | |
| *B05D 1/02* | (2006.01) | |
| *B05D 3/04* | (2006.01) | |
| *B05D 3/06* | (2006.01) | |
| *B24B 55/06* | (2006.01) | |
| *B25J 15/00* | (2006.01) | |
| *E04B 1/76* | (2006.01) | |
| *B05B 7/26* | (2006.01) | |
| *B05C 3/18* | (2006.01) | |
| *B05B 14/00* | (2018.01) | |
| *B05B 7/24* | (2006.01) | |
| *B05B 9/01* | (2006.01) | |
| *B25J 9/00* | (2006.01) | |
| *B26D 3/08* | (2006.01) | |

(52) U.S. Cl.
CPC .......... *B05B 12/122* (2013.01); *B05B 15/625* (2018.02); *B05C 5/004* (2013.01); *B05C 5/02* (2013.01); *B05C 11/1039* (2013.01); *B05D 1/02* (2013.01); *B05D 3/0413* (2013.01); *B05D 3/067* (2013.01); *B24B 7/182* (2013.01); *B24B 49/12* (2013.01); *B24B 55/06* (2013.01); *B24B 55/10* (2013.01); *B25J 9/1661* (2013.01); *B25J 9/1697* (2013.01); *B25J 11/0055* (2013.01); *B25J 11/0075* (2013.01); *B25J 15/0019* (2013.01); *B26D 5/007* (2013.01); *E04B 1/7654* (2013.01); *E04F 21/0046* (2013.01); *E04F 21/08* (2013.01); *E04F 21/085* (2013.01); *E04F 21/12* (2013.01); *E04F 21/16* (2013.01); *E04F 21/165* (2013.01); *E04F 21/1652* (2013.01); *E04F 21/1657* (2013.01); *E04F 21/18* (2013.01); *B05B 7/24* (2013.01); *B05B 7/26* (2013.01); *B05B 9/01* (2013.01); *B05B 14/00* (2018.02); *B05C 3/18* (2013.01); *B25J 9/0084* (2013.01); *B26D 3/085* (2013.01); *G05B 2219/40298* (2013.01); *Y10S 901/01* (2013.01); *Y10S 901/41* (2013.01); *Y10S 901/43* (2013.01); *Y10S 901/47* (2013.01)

(58) Field of Classification Search
CPC ..... E04F 21/16; E04F 21/085; E04F 21/1652; E04F 21/18; B05B 15/625; B05B 12/122; B05B 9/007; B05B 7/0093; B05B 1/28; B05B 5/02; B05B 14/00; B05B 9/01; B05B 7/26; B05B 7/24; B05C 5/02; B05C 11/1039; B05C 5/004; B05C 3/18; B24B 55/10; B24B 49/12; B24B 7/182; B24B 55/06; B26D 5/007; B26D 3/085; B05D 1/02; B05D 3/067; B05D 3/0413; B25J 11/0055; B25J 15/0019; B25J 9/0084; G05B 2219/40298; Y10S 901/47; Y10S 901/01; Y10S 901/41; Y10S 901/43

See application file for complete search history.

(56) References Cited

U.S. PATENT DOCUMENTS

| | | |
|---|---|---|
| 3,116,882 A | 1/1964 | Vork |
| 4,941,182 A | 7/1990 | Patel |
| 5,175,018 A | 12/1992 | Lee et al. |
| 5,279,700 A * | 1/1994 | Retti ........... E04F 21/165 118/679 |
| 5,670,202 A | 9/1997 | Guzowski et al. |
| 5,979,520 A | 11/1999 | Behrendt |
| 6,112,490 A | 9/2000 | Meyer |
| 6,149,506 A | 11/2000 | Duescher |
| 6,712,238 B1 * | 3/2004 | Mills ........... E04F 21/08 222/399 |
| 7,551,058 B1 | 6/2009 | Johnson et al. |
| 9,518,870 B2 | 12/2016 | Verdino |
| 9,527,211 B2 | 12/2016 | Posselius et al. |
| 9,694,381 B2 * | 7/2017 | Mohr ........... B05C 17/00589 |
| 9,702,830 B1 | 7/2017 | Akselrod et al. |
| 9,849,594 B2 | 12/2017 | Keese |
| 9,995,047 B2 * | 6/2018 | Raman ........... E04F 21/1872 |
| 2004/0159724 A1 | 8/2004 | van der Steur |
| 2005/0120840 A1 | 6/2005 | Koskovich |
| 2006/0108450 A1 | 5/2006 | Klinkenberg et al. |
| 2007/0000947 A1 | 1/2007 | Lewis et al. |
| 2007/0107632 A1 | 5/2007 | Ball |
| 2007/0151201 A1 | 7/2007 | Fellinger |
| 2009/0199690 A1 | 8/2009 | Sun et al. |
| 2010/0010660 A1 | 1/2010 | Salour et al. |
| 2011/0011222 A1 | 1/2011 | Bales |
| 2011/0211938 A1 | 9/2011 | Eakins et al. |
| 2011/0253291 A1 | 10/2011 | Allen et al. |
| 2012/0219699 A1 | 8/2012 | Pettersson et al. |
| 2013/0167471 A1 | 7/2013 | Denaro |
| 2014/0022281 A1 | 1/2014 | Georgeson et al. |
| 2014/0230726 A1 | 8/2014 | Gale et al. |
| 2015/0112482 A1 | 4/2015 | Kuwahara |
| 2015/0147460 A1 | 5/2015 | Manzi et al. |
| 2015/0336267 A1 | 11/2015 | Sun et al. |
| 2015/0350618 A1 | 12/2015 | Meier et al. |
| 2016/0052012 A1 | 2/2016 | Mohr |
| 2016/0121486 A1 * | 5/2016 | Lipinski ........... B05B 13/005 427/427.3 |
| 2016/0313294 A1 | 10/2016 | Dattilo et al. |
| 2017/0052507 A1 | 2/2017 | Poulos et al. |
| 2018/0009000 A1 | 1/2018 | Shang et al. |
| 2018/0021799 A1 * | 1/2018 | Raman ........... B05B 14/30 427/294 |
| 2019/0118209 A1 * | 4/2019 | Rennuit ........... B25J 9/1671 |

FOREIGN PATENT DOCUMENTS

| | | |
|---|---|---|
| CN | 105971253 A | 9/2016 |
| CN | 106088544 A | 11/2016 |
| DE | 102006056179 A1 | 6/2008 |
| JP | H03100265 A | 4/1991 |
| JP | H04169659 A | 6/1992 |
| JP | H10180178 A | 7/1998 |
| RU | 1789711 C | 1/1993 |
| RU | 2100686 C1 | 12/1997 |
| SU | 00160667 | 11/1963 |
| WO | 2013000524 A1 | 1/2013 |
| WO | 2016200439 A1 | 12/2016 |

OTHER PUBLICATIONS

"Robotic Sanding, Washing & Drying an Aircraft Fuselage with FANUC's New P-350iA/45 Robot", 2016, Fanuc America Corp., pp. 1-4 (Year: 2016).*

(56) References Cited

OTHER PUBLICATIONS

International Search Report and Written Opinion dated Feb. 28, 2019, International Patent Application No. PCT/US2018/052751, filed Sep. 25, 2018, 7 pages.

Krieg, "HygroSkin—Meteorosensitive Pavilion," Fabricate 2014: Negotiating Design and Making, Feb. 2014, https://www.researchgate.net/publication/273060832_HygroSkin_-_Meteorosensitive_Pavilion, 9 pages.

International Search Report and Written Opinion dated Aug. 2, 2018, International Patent Application No. PCT/US2018/025570, filed Mar. 30, 2018, 7 pages.

International Search Report and Written Opinion dated Jul. 5, 2018, International Patent Application No. PCT/US2018/025529, filed Mar. 30, 2018, 7 pages.

International Search Report and Written Opinion dated Jul. 5, 2018, International Patent Application No. PCT/US2018/025536, filed Mar. 30, 2018, 7 pages.

International Search Report and Written Opinion dated Jul. 5, 2018, International Patent Application No. PCT/US2018/025553, filed Mar. 30, 2018, 7 pages.

International Search Report and Written Opinion dated Jul. 5, 2018, International Patent Application No. PCT/US2018/025556, filed Mar. 30, 2018, 7 pages.

International Search Report and Written Opinion dated Jul. 5, 2018, International Patent Application No. PCT/US2018/025566, filed Mar. 30, 2018, 7 pages.

Forsberg et al., "A Construction Robot for Autonomous Plastering of Walls and Ceilings," Jun. 11, 1997, retrieved Aug. 8, 2019, from http://www.iaarc.org/publications/fulltext/A_construction_robot_for_autonomous_plastering_of_walls_and_ceilings.PDF, 9 pages.

Nagata et al., "Robotic sanding system for new designed furniture with free-formed surface," Robotics and Computer-Integrated Manufacturing 23(4):371-379, Aug. 2007.

Tuberville Enterprizes, "Walls & Ceilings Joint Compund Additive," Jun. 5, 2012, retrieved Aug. 8, 2019, from https://www.wconline.com/articles/88003-joint-compound-additive, 1 page.

\* cited by examiner

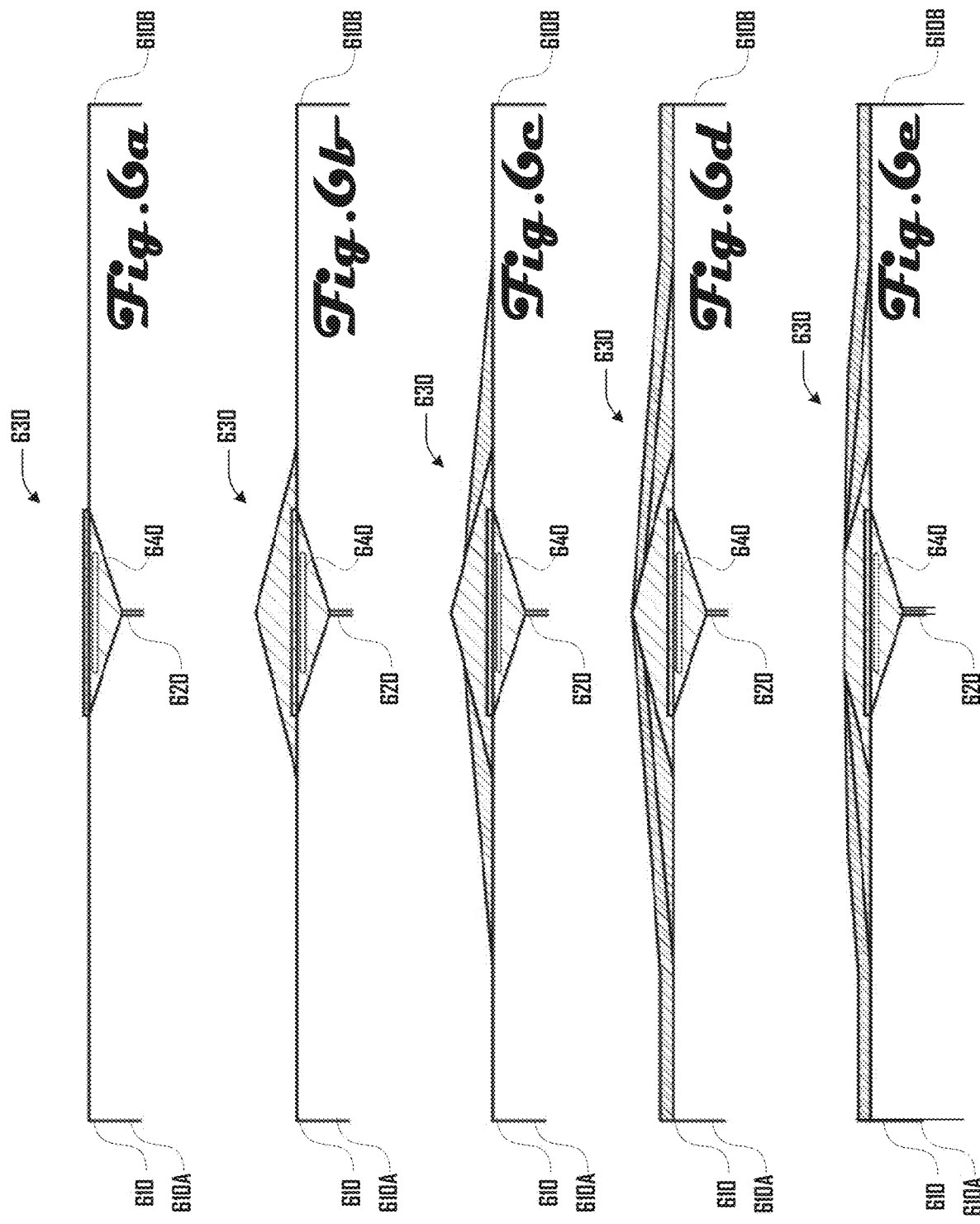

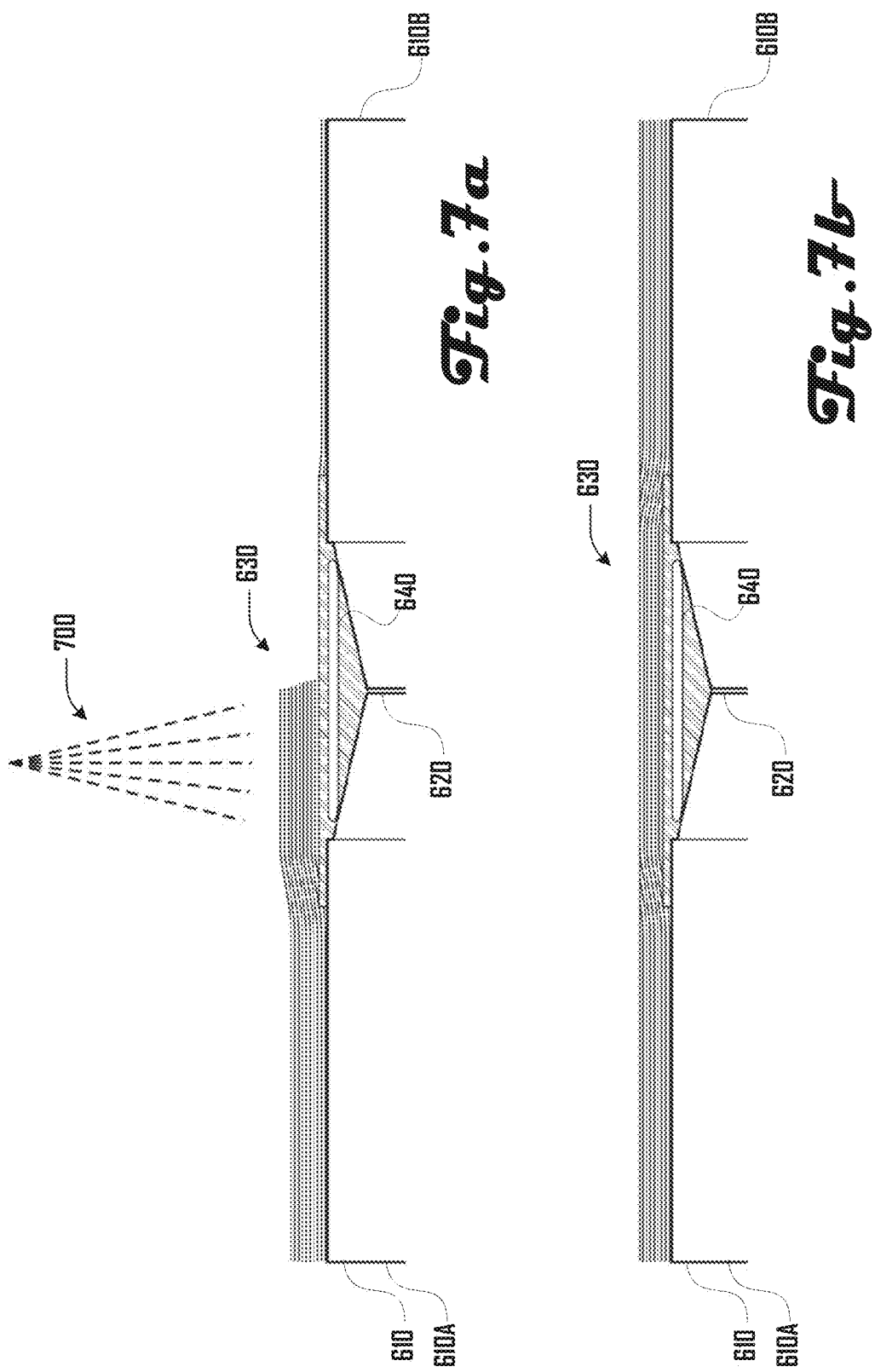

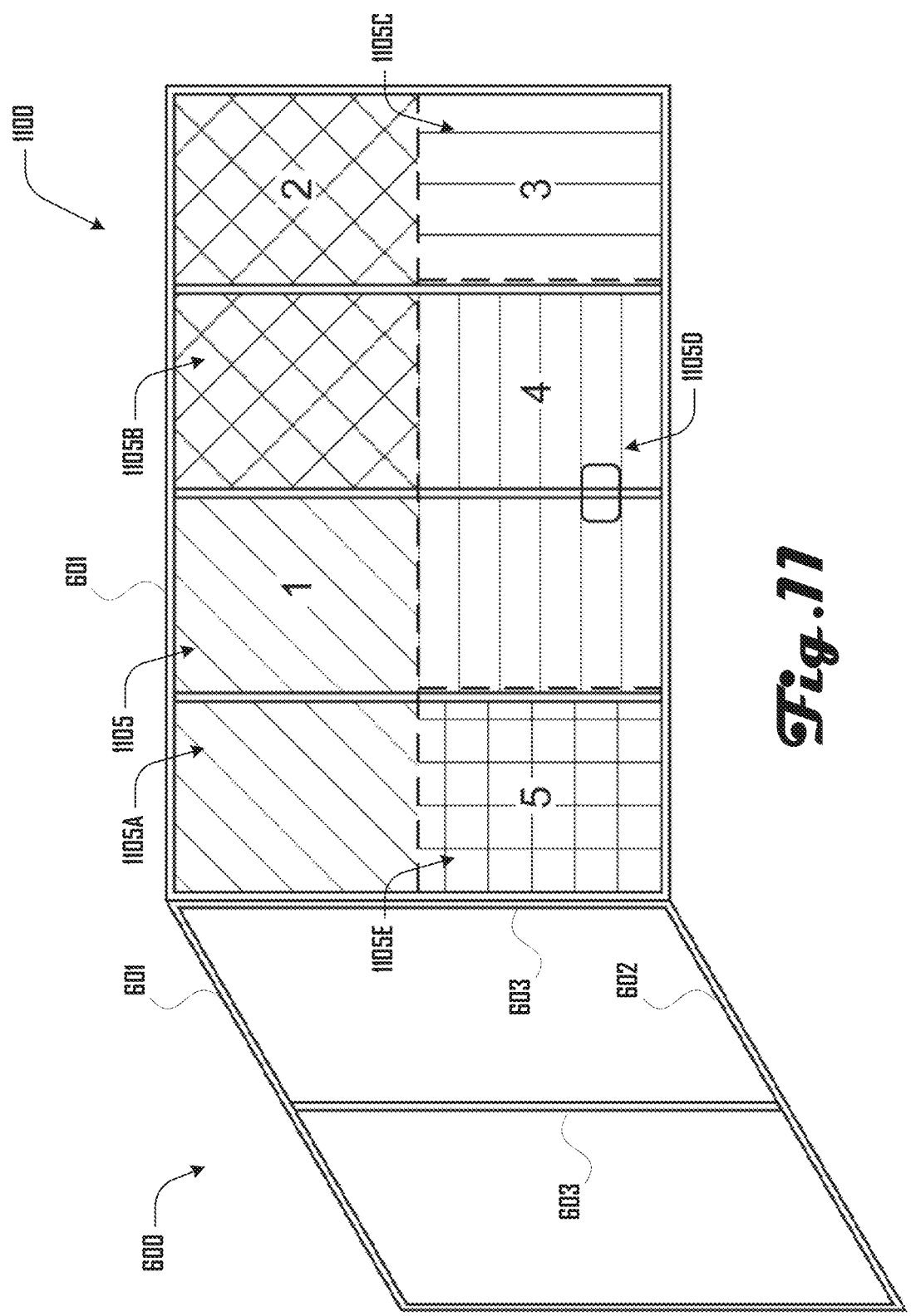

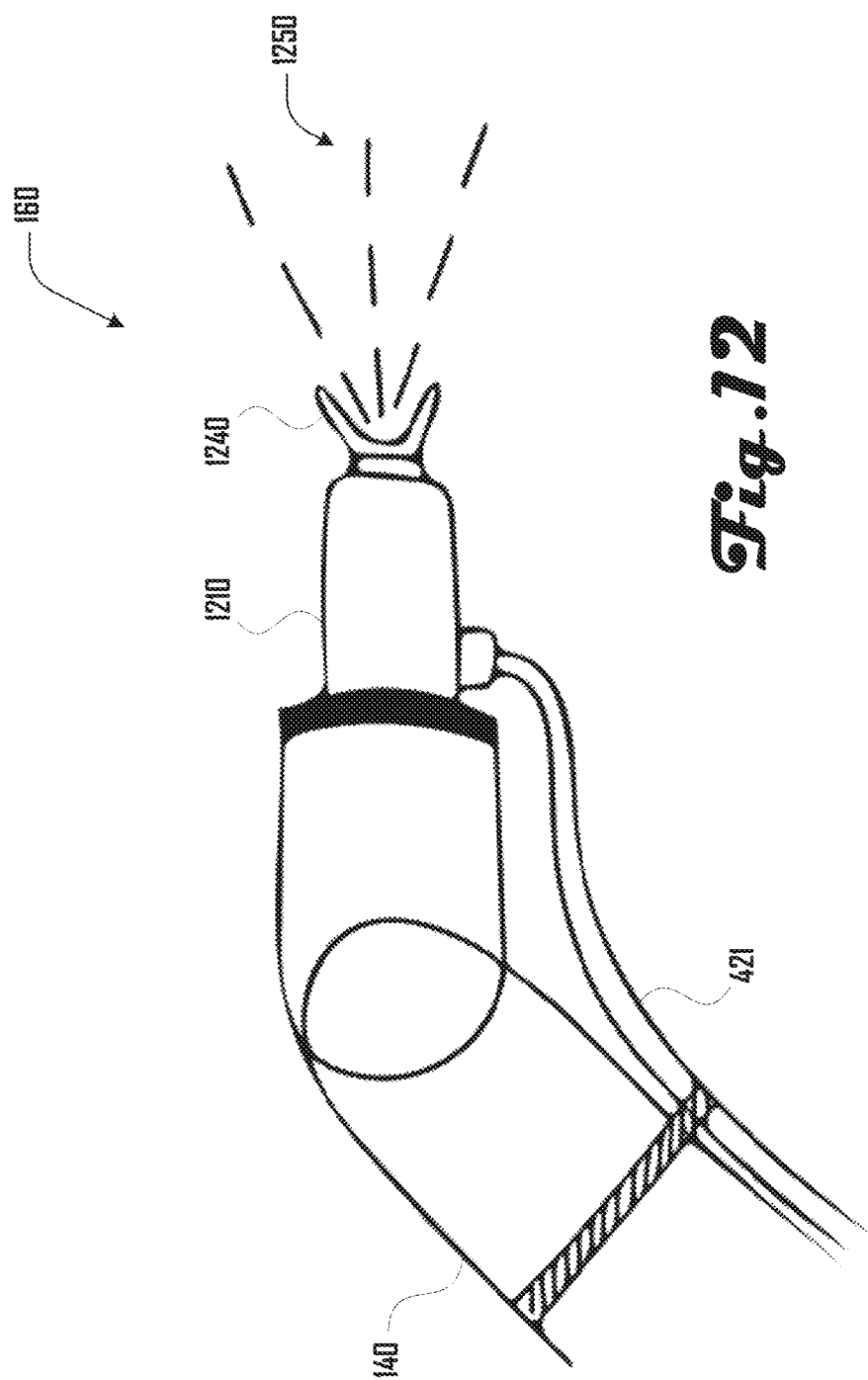

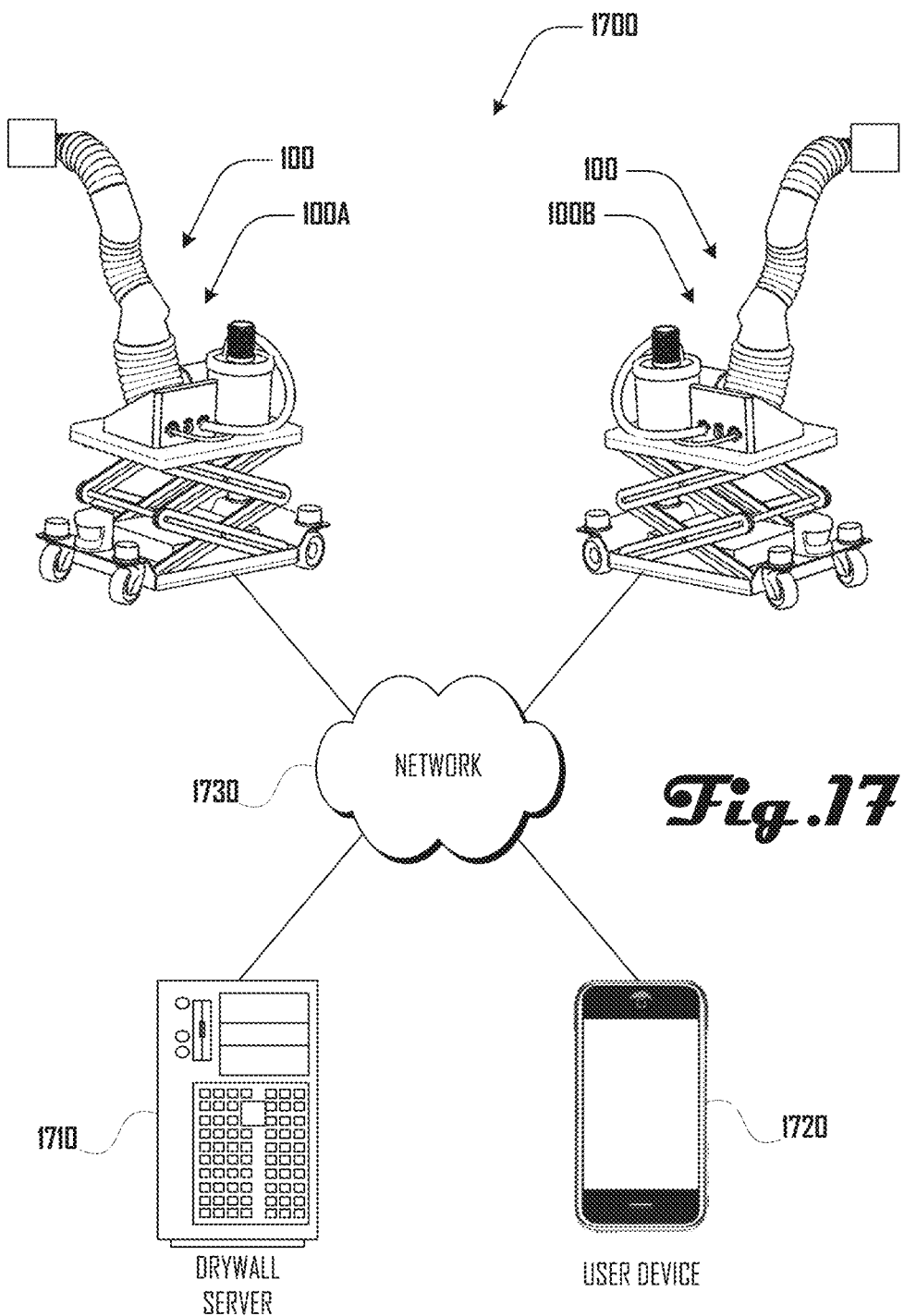

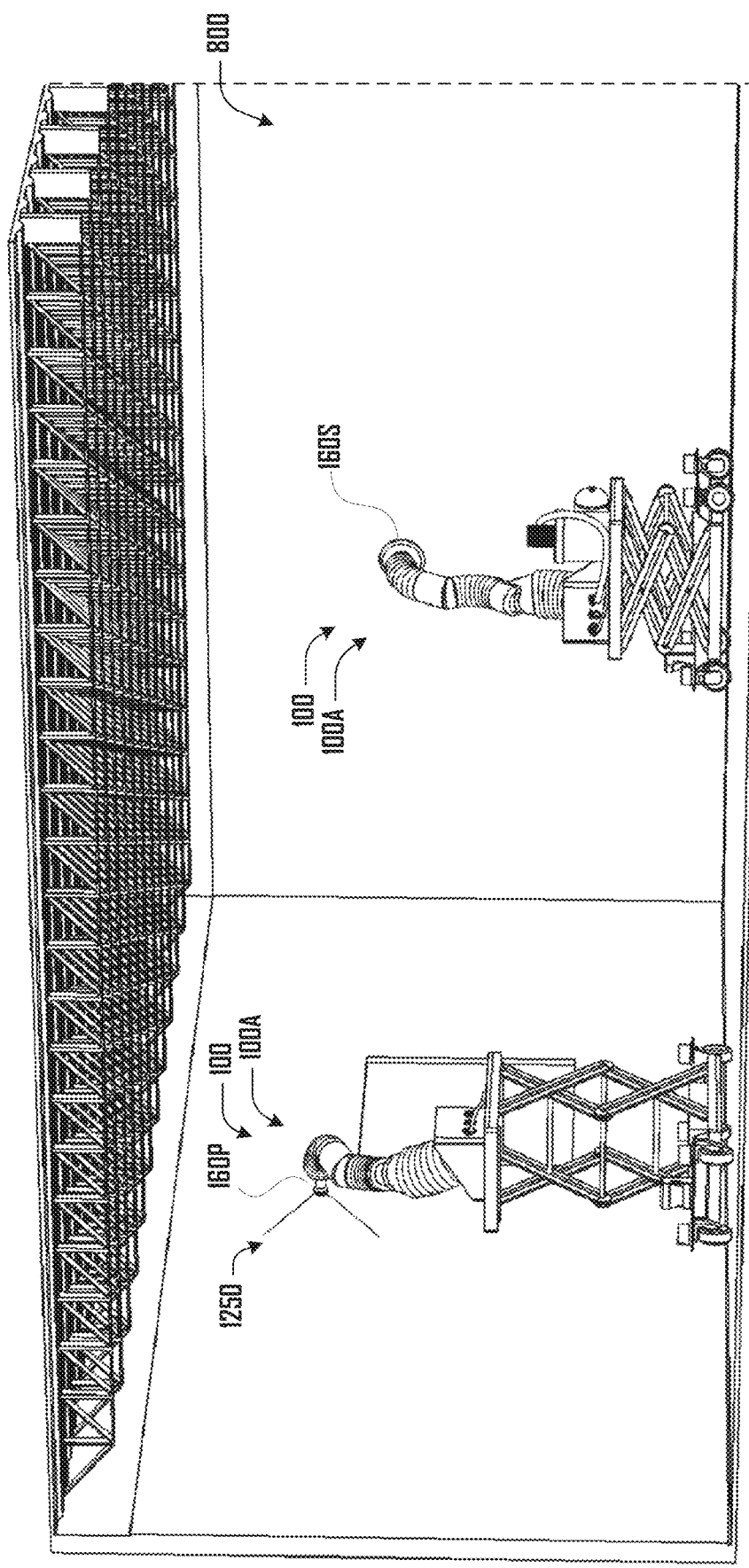

AUTOMATED DRYWALLING SYSTEM AND METHOD

CROSS-REFERENCE TO RELATED APPLICATIONS

This application is a non-provisional of, and claims the benefit of U.S. Provisional Application No. 62/480,172, filed Mar. 31, 2017, which application is hereby incorporated herein by reference in their entirety and for all purposes.

This application is also related to U.S. Non-provisional applications filed contemporaneously herewith, having respective application Ser. Nos. 15/942,158, 15/942,193, 15/941,886, 15/942,318, 15/942,087 and 15/941,974 and respectively entitled "AUTOMATED DRYWALL PLANNING SYSTEM AND METHOD," "AUTOMATED DRYWALL CUTTING AND HANGING SYSTEM AND METHOD," "AUTOMATED DRYWALL MUDDING SYSTEM AND METHOD," "AUTOMATED DRYWALL SANDING SYSTEM AND METHOD," "AUTOMATED DRYWALL PAINTING SYSTEM AND METHOD," and "AUTOMATED INSULATION APPLICATION SYSTEM AND METHOD." These applications are hereby incorporated herein by reference in their entirety and for all purposes.

BRIEF DESCRIPTION OF THE DRAWINGS

FIGS. 6a, 6b, 6c, 6d and 6e illustrate an embodiment of a manual mud application profile, where joint compound is applied over consecutive layers to taper out high points over a wider area and where sanding is then used to smooth out the final profile.

FIGS. 7a and 7b illustrate an embodiment of an automated compound application process where the joint compound is applied in a thick layer using a sprayer.

FIG. 11 illustrates an example of a visualization being projected onto a wall assembly 800 that provides instructions to a user and/or the system for hanging a plurality of pieces of drywall 610.

FIG. 12 illustrates one embodiment of an insulation end effector that includes a spray gun that is coupled onto the robotic arm.

FIG. 17 illustrates an embodiment of a drywalling system comprising a plurality of automated drywalling systems in accordance with one embodiment.

FIG. 18 illustrates another embodiment of a drywalling system comprising a first automated drywalling system painting and a second automated drywalling system performing sanding.

Figure 1:
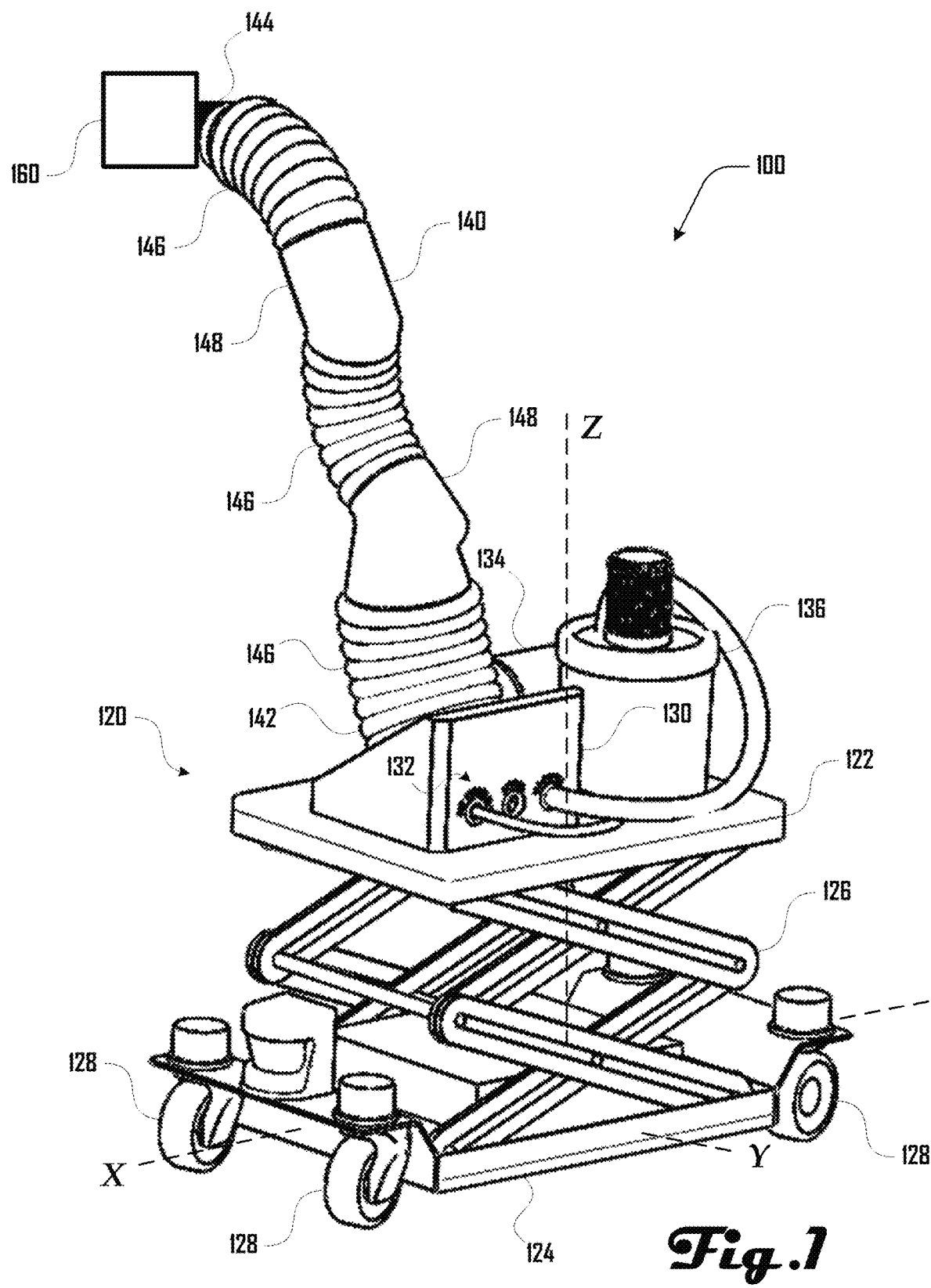
FIG. 1 is an exemplary perspective drawing illustrating an embodiment of an automated drywall installation system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

The following disclosure pertains to an automated drywalling system, which in some embodiments can be used for drywalling, including one or more of planning a configuration and location of drywall pieces on a wall assembly, cutting drywall pieces, hanging drywall pieces, performing mud work on hung drywall pieces, performing sanding on mudded drywall pieces and painting sanded drywall pieces.

One aspect pertains to systems and methods for automating the installation and finishing any suitable substrate including drywall, plasterboard, wallboard, gypsum panel, sheetrock or gypsum board. The system can also be used to finish walls and ceilings using plaster. As discussed in more detail herein, the automation system can comprise a robotic manipulator, vision system, tool for cutting the boards, measurement system, mobile cart, vertical lift, joint compound pump, vacuum, power sander, power sprayer and any combination of these components. The robotic arm and mobile base can be driven using pressurized fluids, electric motors, cable drives, belt drives, solenoids, voice coils, or any combination of power source. The automated drywall system can be electrically or gas powered, or the system can utilize pressurized fluid from an external source.

The planning construction of a wall assembly including hanging and finishing drywall can include utilizing a scanning system to capture the features and measurements of a room such as surfaces, seams, fasteners, cutouts, obstacles, workers, edges, and any other feature or component in the build site. Possible measurement systems can include: cameras, time of flight sensors (laser range finders, 3D laser scanners, ultrasonic), triangulation systems, structured light scanners, modulated light scanners, stereoscopic systems, photometric and silhouette techniques. The system can be used to detect wood framing or metal furring, as well as ducting, electrical boxes, window and door frames, to inform where drywall boards will be mounted.

The automated drywall system can comprise a variety of tools that enable the system to cut drywall, hang drywall, apply tape and mud, sand, apply insulation, paint or any combination of these. The tools can be positioned and controlled using a robotic manipulator, positioning stage, gantry or any combination of these. A single manipulator or any suitable plurality of manipulators can be used to complete one or more task through coordinated or individual paths. The robotic system can be a serial or parallel manipulator.

Figure 2:
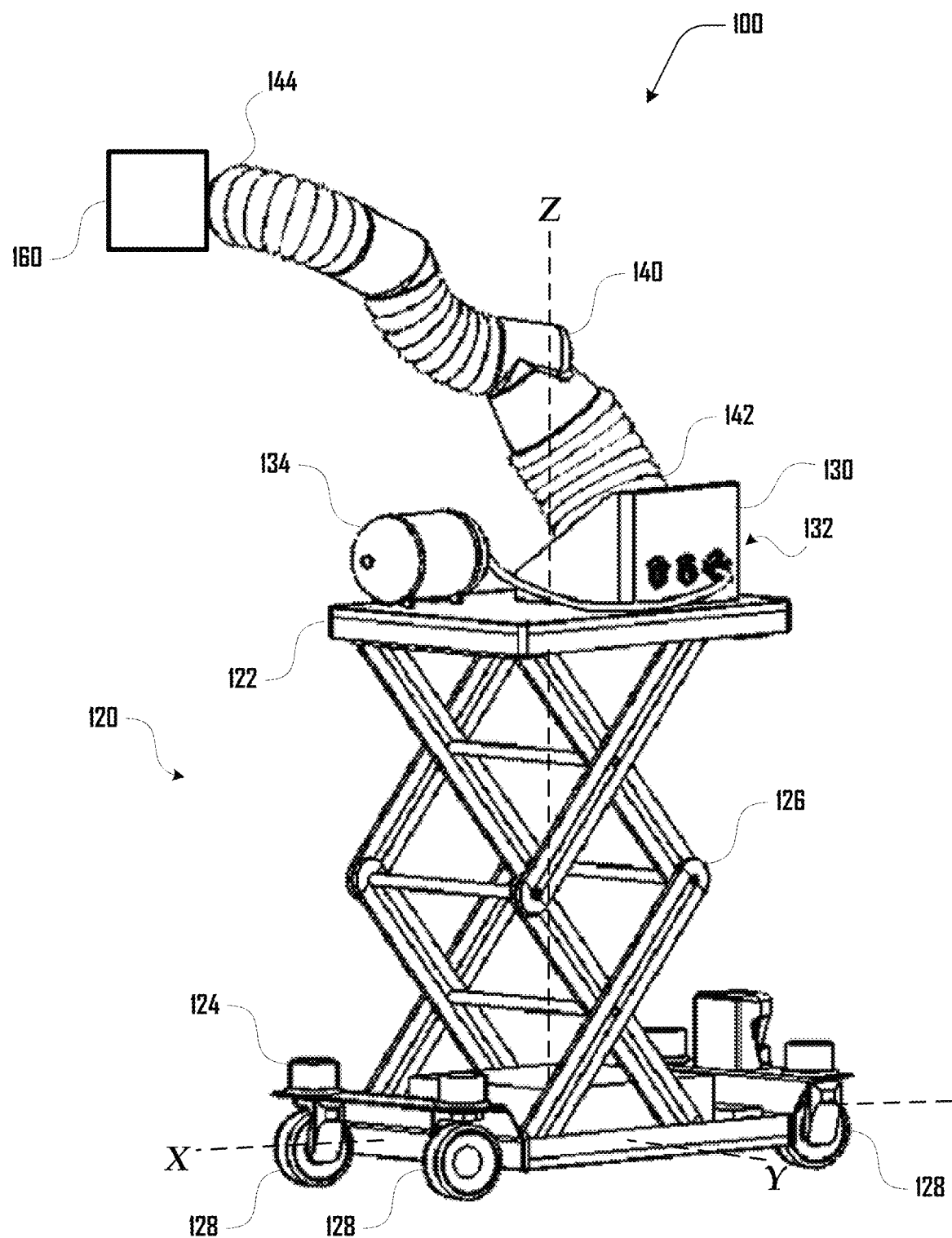
FIG. 2 is an exemplary perspective drawing illustrating another embodiment of an automated drywalling system.

Turning to FIGS. 1 and 2, examples of an automated drywalling system 100 are illustrated, which includes a base unit 120, a robotic arm 140 and an end effector 160. The base unit 120 comprises a platform 122 and a cart 124 with a lift 126 disposed between the platform 122 and cart 124. The cart 124 can be configured to be disposed on the ground and move within an XY plane defined by axes X and Y, and the lift 126 can be configured to raise the platform 122 up and down along axis Z, which is perpendicular to axes X and Y.

In the examples of FIGS. 1 and 2, the cart 124 can comprise a plurality of wheels 128, which can be used to move the cart 124 and drywalling system 100 on the ground in the XY plane. Such movement can be motorized or can be non-motorized. For example, in some embodiments, the drywalling system 100 can be configured for automated movement of the cart 124, motorized movement based on input from a user and/or non-motorized movement based on physical movement by a user. Additionally, while an example having wheels 128 is shown in some examples herein, it should be clear that the cart 124 can be configured for motorized and/or non-motorized movement via any suitable structures, systems, or the like.

The base unit 120 can include a brake system, lifting feet, floor locks, outriggers, or the like, to lock the position of the cart and stabilize the cart. By stabilizing the base unit 120 the system 100 can operate more accurately and safely in some example. The movement of the base unit 120 can also be measured, modeled and accounted for during operation to ensure a quality result. Monitoring and feeding the movement of the base unit 120 into a controller can allow the system 100 to operate on a less stable base and facilitate performing tasks while the mobile base unit 120 is moving or the lifting table 122 is changing height.

In the examples of FIGS. 1 and 2, the lift 126 is shown comprising a scissor lift that can raise and lower the platform 122 relative to the cart 124 along axis Z. In some examples, the lift 126 can provide for tilting of the platform 122. Such movement can be motorized or can be non-motorized. For example, in some embodiments, the drywalling system 100 can be configured for automated movement of the lift 126, motorized movement of the lift 126 based on input from a user and/or non-motorized movement based on physical operation of the lift 126 by a user. Additionally, while an example of a scissor lift is shown herein, it should be clear that any suitable lift system (e.g., lift tables, screw jacks, or the like, which can be powered pneumatically, hydraulically, or with an electromechanical motor or other suitable way) can comprise the lift 126 without limitation. The lift 126 can comprise sensors 326 (e.g., encoders, range finders, odometry on the motor, volume and mass measurements, proximity sensors, switches, and the like) to establish a height of the platform 122 relative to the cart 124 and/or ground.

The platform 122 can comprise a hub 130, which can couple with the robotic arm 140 at a base end 142 of the robotic arm 140. The hub 130 can comprise an input interface 132 that allows for various systems to couple with the hub 130, which can allow for resources provided by such systems to be provided to the robotic arm 140 and/or the end effector 160 coupled at a distal end 144 of the robotic arm 140 as discussed in more detail herein. For example, a pneumatic source, a power source, a vacuum source, a paint source, a mud or joint compound source, or the like can be coupled to the hub 130. FIG. 1 illustrates an example having an air compressor 134 and a vacuum source 136 coupled to the hub 130. FIG. 2 illustrates an example having an air compressor 134 coupled to the hub 130, which can be used to power pneumatic actuators 146 of the robotic arm 140 and/or provide compressed air to the end effector 160 at the distal end 144 of the robotic arm 140.

In various embodiments, the robotic arm 140 can comprise any suitable robotic arm system, which can include pneumatic actuators, electric actuators, and the like. The robotic arm 140 can have any suitable number of degrees of freedom. Although the examples of FIGS. 1 and 2, illustrate an example having pneumatic actuator units 146 separated by arm couplers 148, this example configuration should not be construed to be limiting on the wide variety of robotic arms 140 that are within the scope and spirit of the present disclosure.

As discussed in more detail herein, an end effector 160 can be coupled at the distal end 144 of the robotic arm 140. In some examples, the automated drywalling system 100 can comprise modular and/or multi-use end effectors 160, which can be configured for various drywalling, construction, or other tasks. For example, as discussed herein, end effectors 160 can be configured for drywall planning, drywall hanging, applying mud or joint compound to hung drywall, sanding mudded drywall, painting, and the like. Although various examples herein relate to drywalling and construction, further embodiments of the drywalling system 100 can be configured for any suitable tasks, including construction tasks, manufacturing tasks, gardening tasks, farming tasks, domestic tasks, and the like. Accordingly, the discussions herein related to drywalling and construction should not be construed to be limiting on the wide variety of tasks that the system 100 can be configured for.

Figure 3:
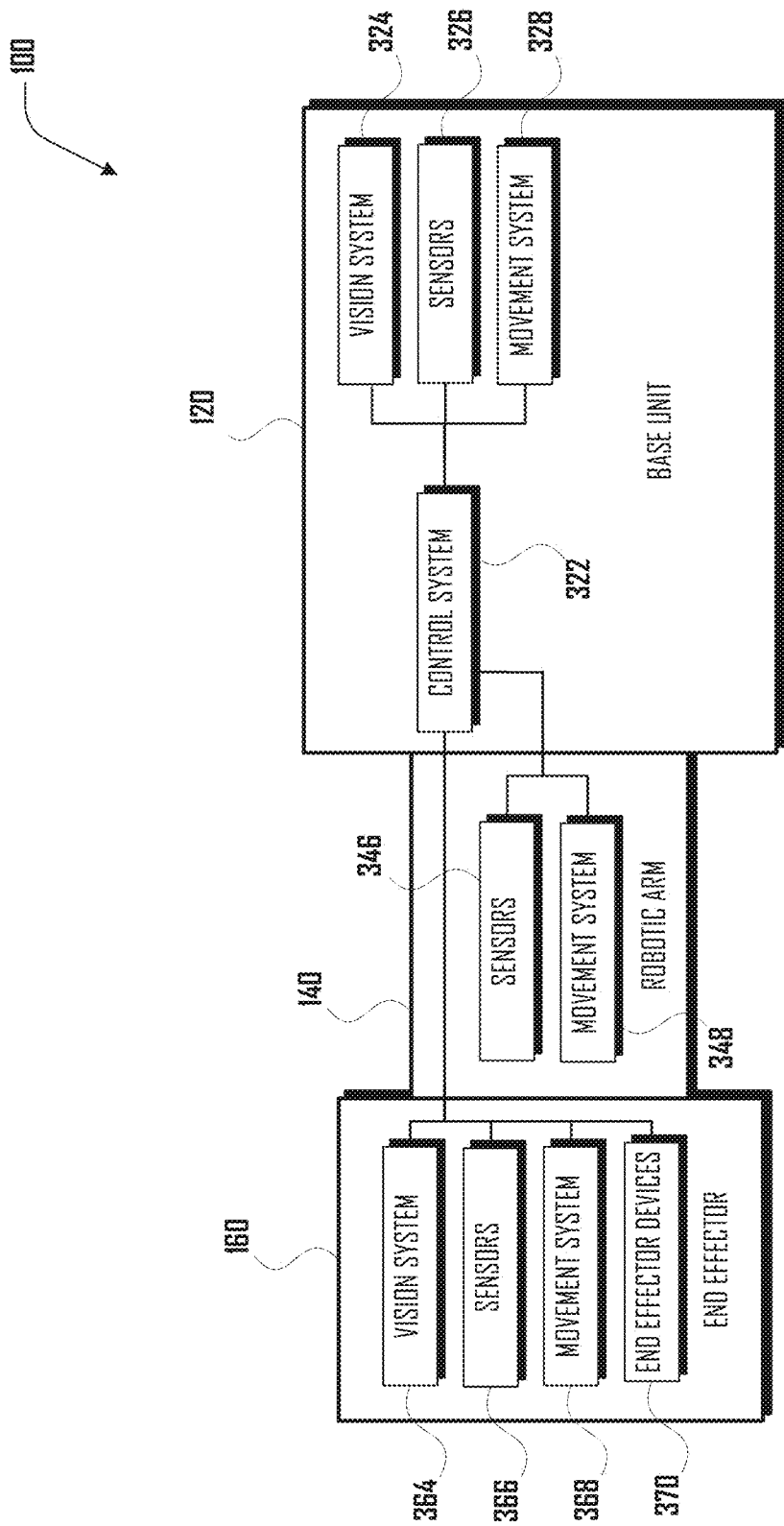
FIG. 3 is an exemplary block diagram illustrating systems of an automated drywalling system in accordance with one embodiment.

Turning to FIG. 3, a block diagram of a drywalling system 100 is illustrated, which includes a base unit 120 coupled to a robotic arm 140, which is coupled to an end effector 160. The base unit 120 is shown comprising a control system 322, which is operably coupled to a vision system 324, sensors 326, and a movement system 328. The robotic arm 140 is shown comprising sensors 346 and a movement system 348, which are operably coupled to the control system 322. The example end effector 160 is shown comprising a vision system 364, sensors 366, a movement system 368, and one or more end effector devices 370, which are operably connected to the control system 322.

In various embodiments, the connections between the control system 322 and respective vision systems 324, 364; respective sensors 326, 346, 366; respective movement systems 328, 348, 368; and end effector devices 370 can comprise any suitable type of connection including wired and/or wireless connections. For example, such connections can be configured for digital and/or analog communication of information between respective elements.

The vision systems 324, 364 can comprise one or more suitable vision system including one or more visible spectrum camera, radar, light detection and ranging (LIDAR) system, sonar, infrared camera, thermal camera, stereo cameras, structured light camera, laser scanners, and the like. The vision systems 324, 364 can comprise the same or different elements. Additionally, in some embodiments, one or both of the vision systems 324, 364 can be absent. In some embodiment, the robotic arm 140 can comprise a vision system.

The sensors 326, 346, 366 can comprise any suitable sensors in various embodiments including one or more sensors of humidity, temperature, air flow, laser curtains, proximity sensors, force and torque sensors, pressure sensors, limit switches, rotameter, spring and piston flow meter, ultrasonic flow meter, turbine meter, paddlewheel meter, variable area meter, positive displacement, vortex meter, pitot tube or differential pressure meters, magnetic meters, humidity sensor, conductivity sensor and depth or thickness sensors, and the like. The sensors 326, 346, 366 can comprise the same or different elements. Additionally, in some embodiments, one or more of the sensors 326, 346, 366 can be absent.

The vision systems 324, 364 and/or sensors 326, 346, 366 of the base unit 120, robotic arm 140, and/or end effector 160 can be configured to ensure safe operation next to one or more user, including but are not limited to, laser curtains, proximity sensors, force and torque sensors, pressure sensors, limit switches, speed limiters, LIDAR, radar, sonar, and the like.

The movement systems 328, 348, 368 can comprise any suitable movement systems in various embodiments including one or more of an electric motor, pneumatic actuators, piezo electric actuator, and the like. For example, in some embodiments the movement system 328 of the base unit 120 can comprise the lift 126 and motors that drive wheels 128 of the cart 124 (see FIGS. 1 and 2). In another example, the movement system 348 of the robotic arm 140 can comprise pneumatic actuators 146 as illustrated in the examples of FIGS. 1 and 2. In various embodiments, the movement system 368 of the end effector 160 can comprise motors or other systems that are configured to move, change the orientation of, rotate, or otherwise configure the end effector 160. In some embodiments, one or more of the movement systems 328, 348, 368 can be absent.

As discussed herein, the one or more end effector devices 370 can comprise various suitable devices, including a cutting device, hanging device, mudding device, sanding device, painting device, vacuum device, and the like. Other suitable devices can be part of an end effector 160 and can be selected based on any desired task that the end effector 160 can be used for.

As discussed in more detail herein, the control system 322 can receive data from the vision systems 324, 364 and/or sensors 326, 346, 366 can drive the movement systems 328, 348, 368 and one or more end effector devices 370 to perform various tasks including drywall planning, drywall hanging, applying mud or joint compound to hung drywall, sanding mudded drywall, painting, and the like. Accordingly, the control system 322 can drive the drywalling system 100 to perform various suitable tasks, with some or all portions of such tasks being automated and performed with or without user interaction. The control system can comprise various suitable computing systems, including one or more processor and one or more memory storing instructions that if executed by the one or more processer, provide for the execution of tasks by the automated drywalling system 100 as discussed in detail herein. Additionally, while a control system 322 is shown as being part of the base unit 120, in further embodiments, the control system can be part of the robotic arm 140 or end effector 160. Also, further examples can include a plurality of control systems and/or control sub-systems, which can be suitably disposed in one or more of the base unit 120, robotic arm 140, and/or end effector 160.

In various embodiments, the vision systems 324, 364 and/or sensors 326, 346, 366 can be used to follow a surface such as a wall, or allow the system 100 to be guided by features on the ground, wall, ceiling, or the like. For example, the base unit 120 can position itself along a wall by utilizing sensors such as rangefinders or acoustic sensors to determine a distance of the base unit 120 from adjacent walls. In some embodiments, the base unit 120 can measure and record a distance traveled along a wall or within a room by tracking wheel rotations.

Odometry can also be done on an inertial measurement unit of the system 100. An external positioning system such as a GPS, differential GPS, or motion capture type system can also be used to globally capture where the system 100 is located. One or more of the vision systems 324, 364 can be used to track features on the base unit 120 and locate the mobile base 120 relative to features in a room or the position of the one or more of the vision systems 324, 364. Additionally, the system 100 cart can be instrumented with motion detectors, proximity sensors, contact sensors or switches, force sensors, laser curtains, or the like to detect obstacles, adjacent surfaces, which can be desirable to avoid collisions with workers and other objects.

Figure 4:
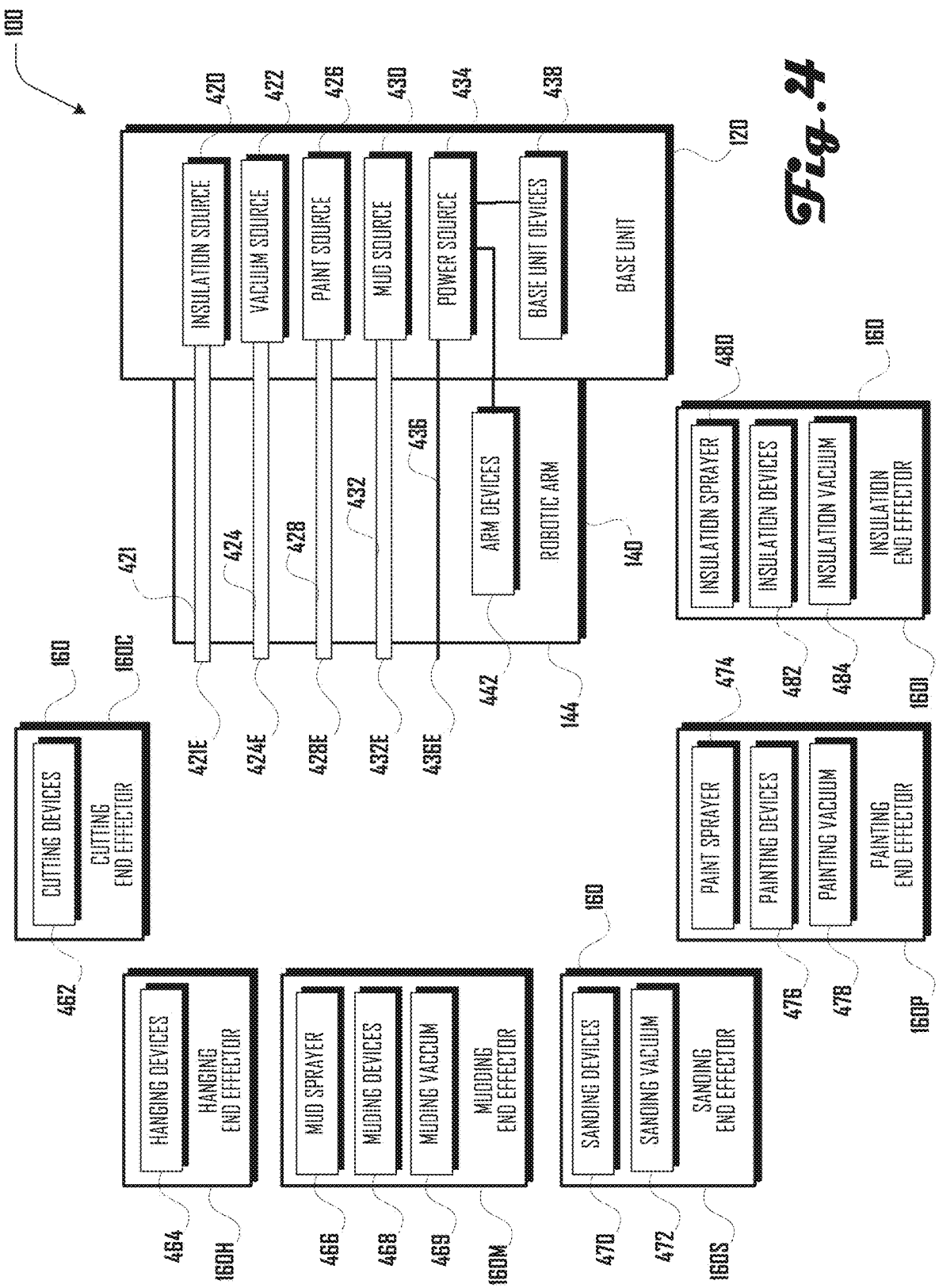
FIG. 4 is an exemplary block diagram illustrating systems of an automated drywalling system in accordance with one embodiment, including a plurality of end effectors configured to couple to an end of a robotic arm.

Turning to FIG. 4, an exemplary block diagram illustrating systems of an automated drywalling system 100 that includes a base unit 120 coupled to a robotic arm 140 and including a plurality of end effectors 160 configured to couple to the distal end 144 of the robotic arm 140. In this example, the end effectors 160 include a cutting end effector 160C, a hanging end effector 160H, a mudding end effector 160M, a sanding end effector 160S, a painting end effector 160P and a insulation end effector 160I.

As shown in FIG. 4, the base unit 120 can comprise an insulation source 420, a vacuum source 422, a paint source 426, a mud source 430, a power source 432, and one or more base unit devices 438. In various embodiments, one or more of the insulation source 420, vacuum source 422, paint source 426, mud source 430, and power source 432 can couple with a hub 130 (FIGS. 1 and 2) and provide resources to an end effector 160 coupled at the distal end 144 of the robotic arm 140 and/or to the robotic arm 140. For example, the insulation source 420 can be coupled with an insulation line 421 that extends via the robotic arm 140 to an end 421E, which can couple with an end effector 160 as discussed herein. The vacuum source 422 can be coupled with a vacuum tube 424 that extends via the robotic arm 140 to an end 424E, which can couple with an end effector 160 as discussed herein. The paint source 426 can be coupled with a paint tube 432 that extends via the robotic arm 140 to an end 432E, which can couple with an end effector 160 as discussed herein. The mud source 430 can be coupled with a mud tube 432 that extends via the robotic arm 140 to an end 432E, which can couple with an end effector 160 as discussed herein.

The power source 434 can be coupled with a power line 436 that extends via the robotic arm 140 to an end 436E, which can couple with an end effector 160 as discussed herein. Additionally, the power source 434 can provide power to arm devices 442 of the robotic arm 140 (e.g., sensors 346 and movement system 348) and to base unit devices 438 of the base unit 120 (e.g., control system 322, vision system 324, sensors 326 and movement system 328). In various embodiments, the power source can comprise one or more batteries and/or can be configured to plug into wall receptacles at a work site. For example, a power cord can be coupled to the power source 438, which allow the drywalling system 100 to be powered by local power at a worksite via a wall receptacle, generator, external batteries, or the like. However, in some embodiments, the automated drywalling system 100 can be completely self-powered and can be configured to operate without external power sources at a worksite. In further embodiments, the robotic arm 140 and/or end effectors 160 can comprise a separate power source that can be separate from the power source 438 of the base unit.

In various embodiments, the automated drywalling system 100 can be configured to perform a plurality of tasks related to construction including applying insulation, installing and finishing drywall, and the like. In such embodiments, it can be desirable to have a base unit 120 and robotic arm 140 that can couple with and operate a plurality of different end effectors 160 to perform one or more tasks or portions of tasks related to drywalling. For example, the cutting end effector 160C, hanging end effector 160H, mudding end effector 160M, sanding end effector 160S, painting end effector 160P and insulation end effector 160I can be selectively coupled with the robotic arm 140 at the distal end 144 to perform respective tasks or portions of tasks related to drywalling.

For example, the cutting end effector 160C can be coupled at the distal end 144 of the robotic arm 140 and coupled with the power line 436 to power cutting devices 462 of the cutting end effector 160C. The cutting end effector 160C can be controlled by the automated drywalling system 100 to cut drywall or perform other cutting operations. In some examples, the cutting end effector 160C can comprise a cutting vacuum that is coupled to vacuum source 422 via the vacuum line 424 to ingest debris generated by cutting done by the cutting end effector 160C.

The hanging end effector 160H can alternatively be coupled at the distal end 144 of the robotic arm 140 and coupled with the power line 436 to power hanging devices 464 of the hanging end effector 160H. The hanging end effector 160H can be controlled by the automated drywalling system 100 to hang drywall, assist with drywall hanging, or the like.

The mudding end effector 160M can alternatively be coupled at the distal end 144 of the robotic arm 140 and coupled with the power line 436 to power mudding devices 466 and/or mudding applicators 468 of the mudding end effector 160M. The mudding end effector 160M can be controlled by the automated drywalling system 100 to perform "mudding" or "mud work" associated with drywalling, including application of joint compound (also known as "mud") to joints between pieces of hung drywall, and the like. Joint compound as discussed herein can encompass pre-mixed, topping, taping, multi-use, all-purpose, and setting type compounds. Additionally, the mudding end effector can also be configured to apply joint tape, or the like. Additionally, the mudding end effector 160M can comprise a mudding vacuum 469 that is coupled to vacuum source 422 via the vacuum line 424 to ingest excess joint compound or mud generated by the mudding end effector 160M.

The sanding end effector 160S can alternatively be coupled at the distal end 144 of the robotic arm 140 and coupled with the power line 436 to power sanding devices 464 of the sanding end effector 160S. The sanding end effector 160S can be controlled by the automated drywalling system 100 to sand mudded drywall, and the like. Additionally, the sanding end effector 160S can comprise a sanding vacuum 472 that is coupled to vacuum source 422 via the vacuum line 424 to ingest debris generated by sanding done by the sanding end effector 160S.

The painting end effector 160P alternatively be coupled at the distal end 144 of the robotic arm 140 and coupled with the power line 436 to power a paint sprayer 474 and/or painting devices 476 of the painting end effector 160P. The painting end effector 160P can be controlled by the automated drywalling system 100 to paint drywall or other surfaces. Additionally, the painting end effector 160P can comprise a painting vacuum 472 that is coupled to vacuum source 422 via the vacuum line 424 to ingest excess paint spray generated by painting done by the painting end effector 160P.

The insulation end effector 160I can alternatively be coupled at the distal end 144 of the robotic arm 140 and coupled with the power line 436 to power an insulation sprayer 480 and/or insulation devices 482 of the insulating end effector 160I. The insulating end effector 160I can be controlled by the automated drywalling system 100 to apply insulation to a wall assembly or other suitable locations. Additionally, the insulation end effector 160I can comprise an insulation vacuum 484 that is coupled to vacuum source 422 via the vacuum line 424 to ingest excess insulation spray generated by insulation application by the insulation end effector 160I.

An automated mixer can be mounted on the base unit 120 or positioned near the workspace, which can comprise various systems including an insulation source 420, paint source 426, mud source 426, or the like. Such a mixer can do simple mechanical mixing or can precisely control the ratio of components used in a mixture, the mixing speed, and estimate the material consistency by measuring a motor load. One way of determining the consistency can be to measure a speed of the mixer at a given torque, or measure the torque required to achieve a desired speed. Material delivery systems can carefully measure the pressures required to maintain a desired flow rate. Problems with a material delivery mechanism can be detected by monitoring power requirements, flow rate, and the like.

Although the example automated drywalling system 100 of FIG. 4 is illustrated having six modular end effectors 160, other embodiments can include any suitable plurality of modular end effectors 160, with such end effectors 160 having any suitable configuration, and being for any suitable task or purpose. In further examples, the automated drywalling system 100 can comprise a single end effector 160, which can be permanently or removably coupled to the robotic arm 140. Additionally, in some examples a given end effector 160 can be configured to perform a plurality of tasks. For example, in one embodiment, an end effector 160 can be configured for insulation work, mud work, sanding and painting. Accordingly, the example of FIG. 4 should not be construed to be limiting on the wide variety of other embodiments that are within the scope and spirit of the present disclosure.

Figure 5:
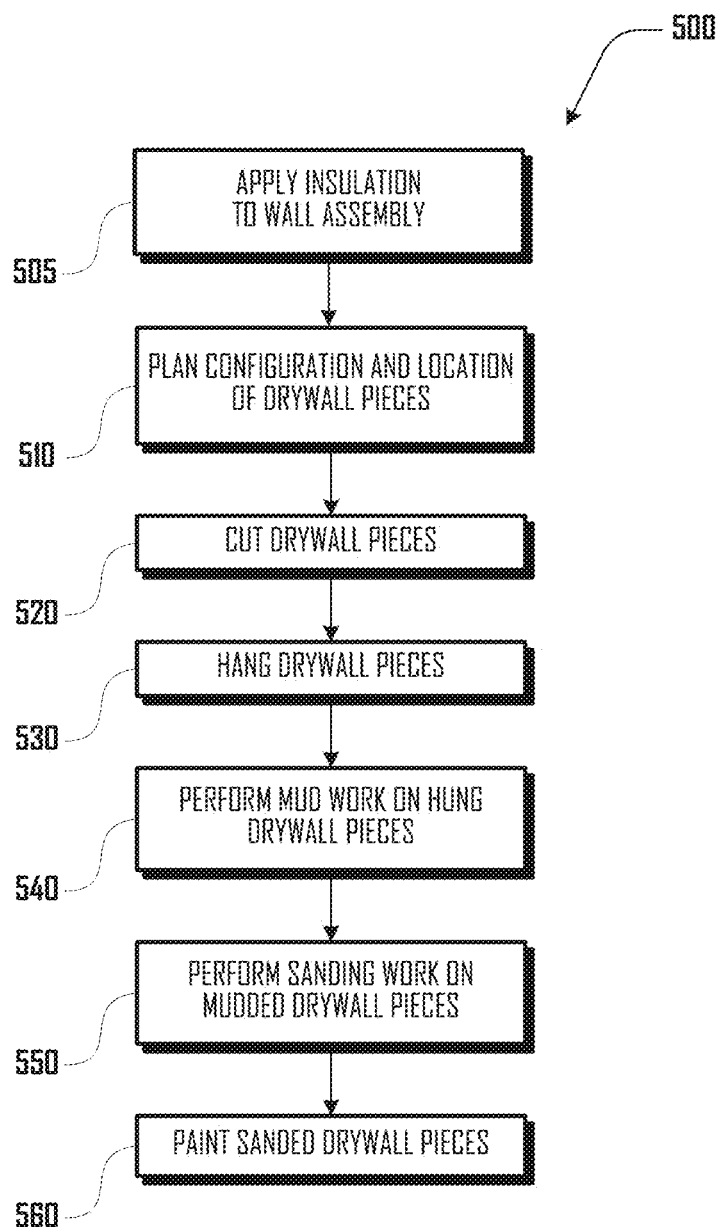
FIG. 5 illustrates a block diagram of method of installing drywall in accordance with one embodiment.

Turning to FIG. 5, a method 500 of building a wall assembly, including drywalling is illustrated, which can be performed in whole or in part by an automated drywalling system 100 as discussed herein. The example method 500 or portions thereof can be performed automatically by the automated drywalling system 100 with or without user interaction.

The method 500 begins at 505 where insulation is applied to a wall assembly. For example, as discussed in more detail herein, insulation can be sprayed between studs of a wall assembly or in any other suitable location of a wall, ceiling, floor, or the like. In other examples, sheets of insulation can be applied in such locations. In various embodiments, any suitable type of insulation material can be used, including fiberglass, cellulose, cotton fiber, polyurethane, open or closed cell foam, rock wool, vermiculite, urea tripolymer, and the like.

The method 500 continues at 510, where a configuration and location of drywall pieces is planned. For example, in some embodiments, the automated drywalling system 100 can be configured for automated scanning and mapping of a worksite (e.g., framing elements of a house or building) and automated planning of the shapes and sizes of drywall to be disposed at the worksite to generate walls, ceilings and the like. Such scanning and mapping can include use of vision systems 324, 364 (FIG. 3) and the like. Planning of shapes and sizes of drywall can be based at least in part on the scanning and mapping and can be performed by a computing device 100 of the automated drywalling system 100 or other suitable device, which can be proximate or remote from the automated drywalling system 100. In some embodiments, such planning can be based at least in part on building plans or maps that were not generated by the automated drywalling system 100.

The method 500 continues to 520, where drywall pieces are cut. Such cutting can be based at least in part on the scanning, mapping and planning discussed above. Additionally, such cutting can be performed by the automated drywalling system 100 at a worksite (e.g., via a cutting end effector 160C) or can be performed by a system remote from the worksite and generated drywall pieces can be delivered to the worksite.

At 530, generated pieces of drywall can be hung at the worksite, including hanging on studs, beams, posts, wall plates, lintels, joists, and the like, to define walls, ceilings and the like. Screws, nails or other suitable fasteners can be used to hang the drywall pieces. In some embodiments, the automated drywalling system 100 can be configured to hang drywall pieces including positioning the drywall pieces and coupling the drywall pieces in a desired location. In some examples, the automated drywall system 100 can be configured to assist a user in hanging drywall, including holding the drywall and/or tools in place while the user fixes the drywall pieces in place. In various examples a hanging end effector 160H can be used for such drywall hanging.

At 540, mud work can be performed on the pieces of hung drywall. For example, joint compound (known also as "mud") can be applied to seams or joints between adjacent pieces of drywall, over surfaces of the drywall, and/or can be applied over fasteners such as drywall screws or the like. In various examples, a mudding end effector 160M can be used to perform such mud work.

At 550, sanding can be performed on the mudded pieces of drywall. For example, where wet joint compound is applied to hung drywall pieces, the joint compound can be allowed to dry and can then be sanded by a sanding end effector 160S of an automated drywall system 100. In various examples, sanding can be performed to smooth out joint compound to generate a planar or otherwise consistent profile on the pieces of drywall in preparation for painting. At 560, the sanded drywall pieces can be painted. For example, in various examples, a painting end effector 160P of an automated drywalling system 100 can be used to paint the drywall pieces.

Although the method 500 of FIG. 5 relates to hanging and finishing drywall, it should be clear that other hanging and finishing methods can similarly be employed by the automated drywalling system 100, including methods related to hanging particle board, plywood, sheet rock, laminate, tile, wall boards, metal sheeting, lath and the like. Similarly the methods can be used with different coatings including plaster, polymer coatings, cement, stucco, organic coatings, and the like. Accordingly, the method 500 of FIG. 5 should not be construed to be limiting.

During mud work, automated drywalling system 100 can apply a layer or profile of compound that is greater than a thickness that conventionally is manually applied by human workers to allow for a sanding system (e.g., a sanding end effector 160S) to sand down the compound to a desired plane. For example, in some examples, manual joint compound application mud can be profiled to taper from high points. The automated drywalling system 100 can apply a thicker layer than normal enabling a sanding system to sand down high points to be level to the adjacent surfaces.

For example, FIGS. 6*a*, 6*b*, 6*c*, 6*d* and 6*e* illustrate one example of a mud application profile for a pair of drywall pieces 610A, 610B that form a seam 620, where joint compound 630 is applied over consecutive layers, which can include joint tape 640, to taper out the high points of joint compound 630 over a wider area. Sanding can then be used to smooth out the final profile. The high points of joint compound 630 can be caused by various features, including the seam 620, feature, raised stud, defect, or any combination of these. In some embodiments, such a mud application can be undesirable for automated application; however, in further embodiments, such a mud application profile can be employed by an automated system such as the automated drywalling system 100.

FIGS. 7*a* and 7*b* illustrate an example joint compound application process where the joint compound 630 is applied in a thick layer using a sprayer that generates a mud spray 700. Such an application process can be performed by the automated drywalling system 100 in various embodiments. The thickness of the joint compound 630 being applied to the pieces of drywall 610A, 610B defining the seam 620 can allow for a sanding system to be used to sand back high points of joint compound 630 to a level surface. The high points of joint compound 630 can be caused by the seam 620, feature, raised stud, defect, or any combination of these.

Figure 8A:
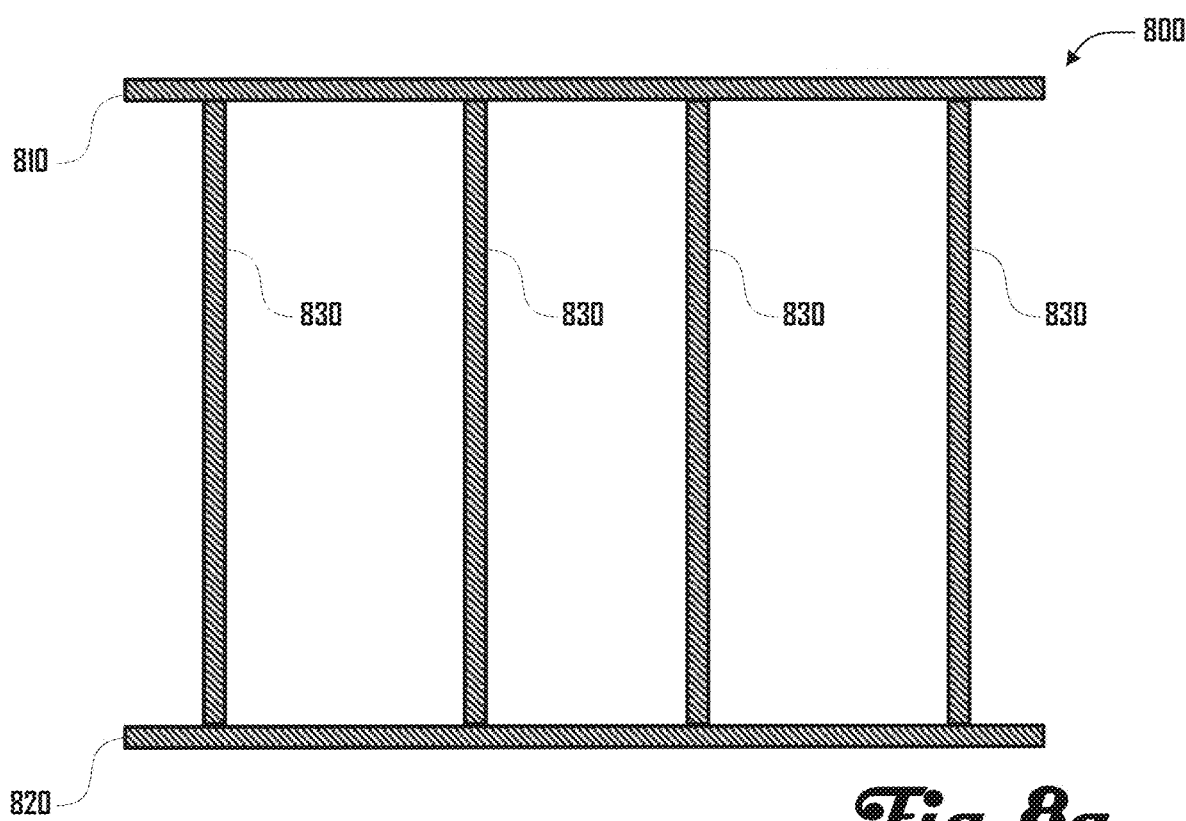
FIGS. 8a, 8b, 9a, 9b, 10a and 10b illustrate a series of steps in an example method of installing drywall to generate a wall assembly.
Figure 8B:
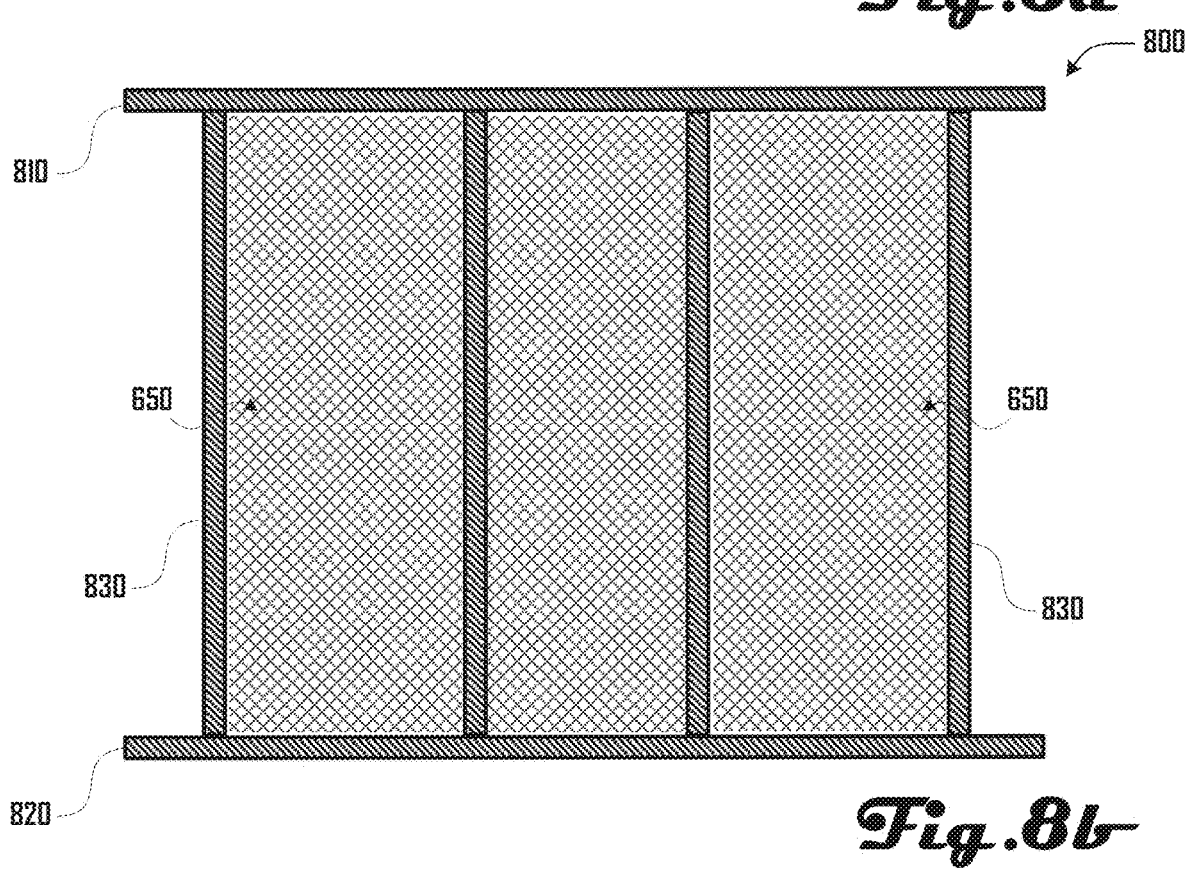

Turning to FIGS. 8*a*, 8*b*, 9*a*, 9*b*, 10*a* and 10*b* examples of a wall assembly 800 including a header 810 and footer 820, with a plurality of studs 830 extending therebetween is illustrated. As shown in FIG. 8*b*, insulation 650 can be applied to the wall assembly 800 between respective pairs of studs 830 and between the header 810 and footer 820. The insulation 650 can include any suitable type of insulating material, which can include spay insulation or sheets of insulation as described in more detail herein.

Figure 9A:
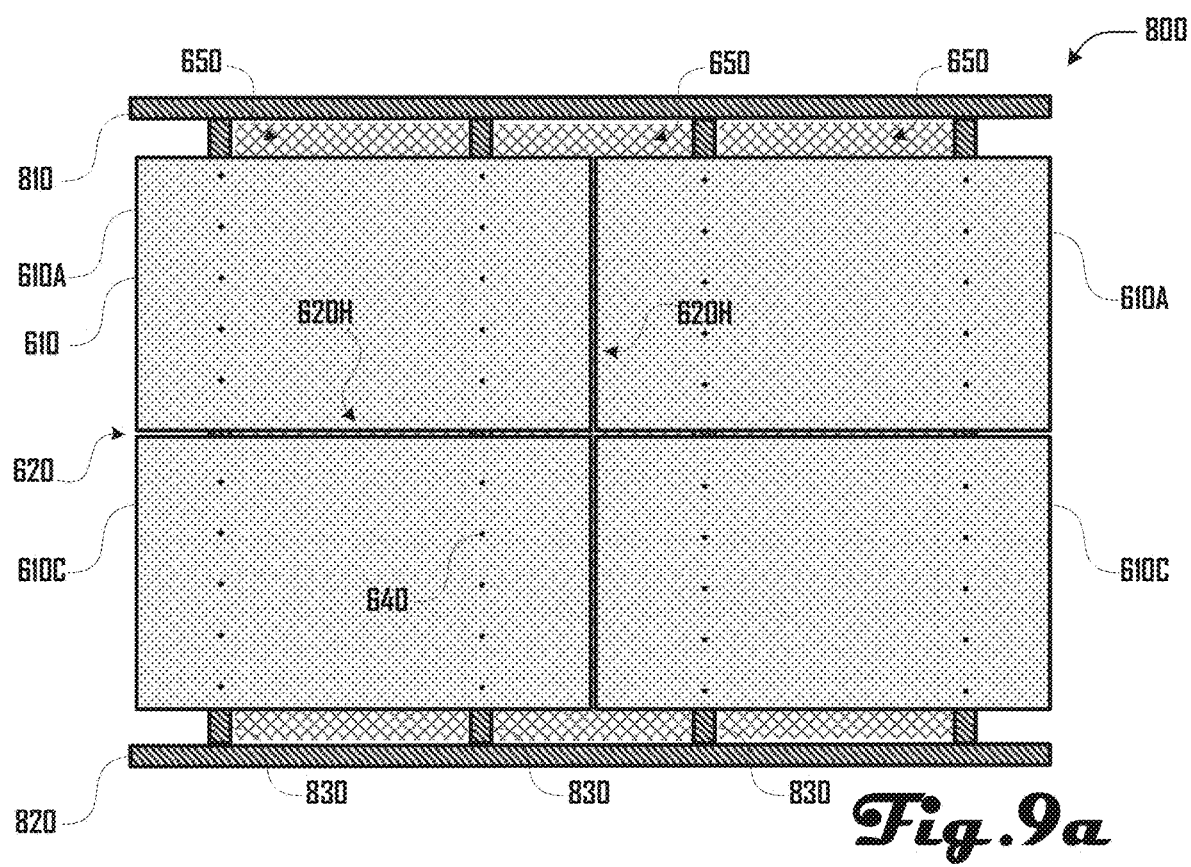
Figure 9B:
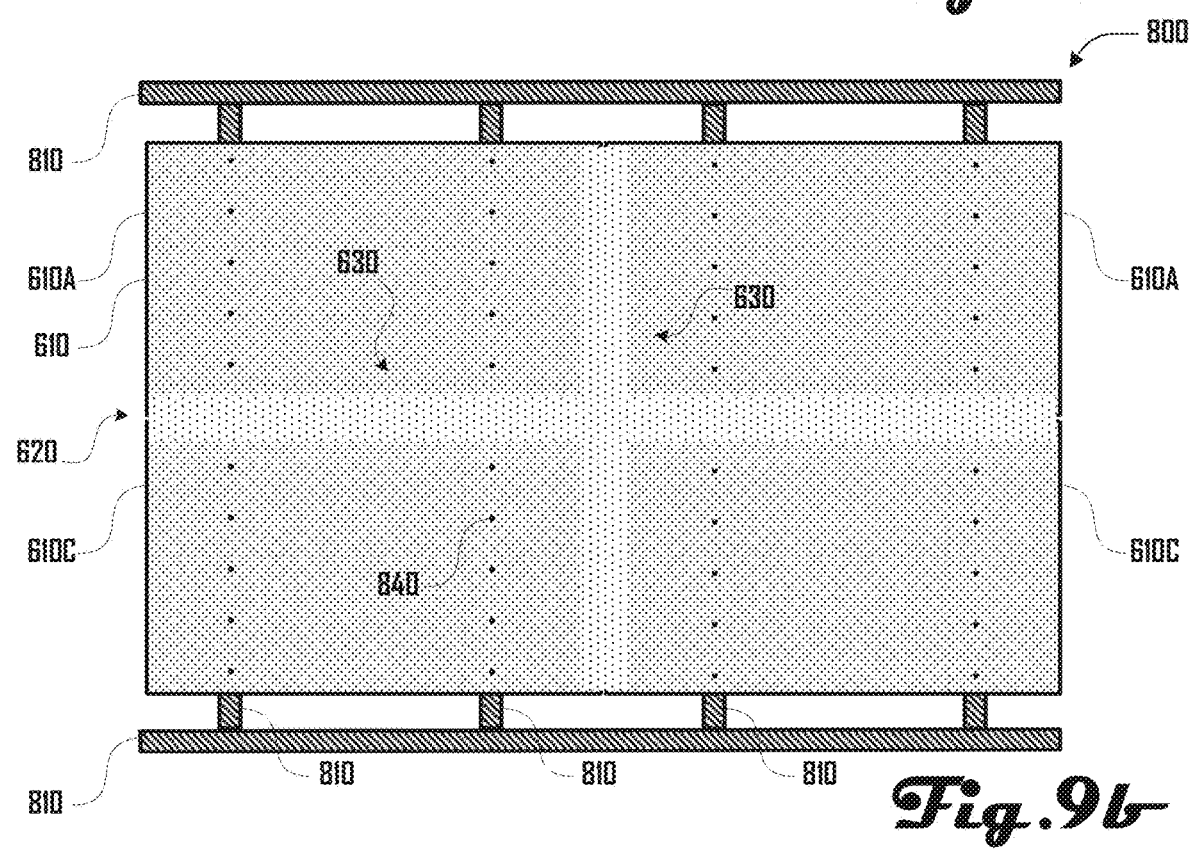
Figure 10A:
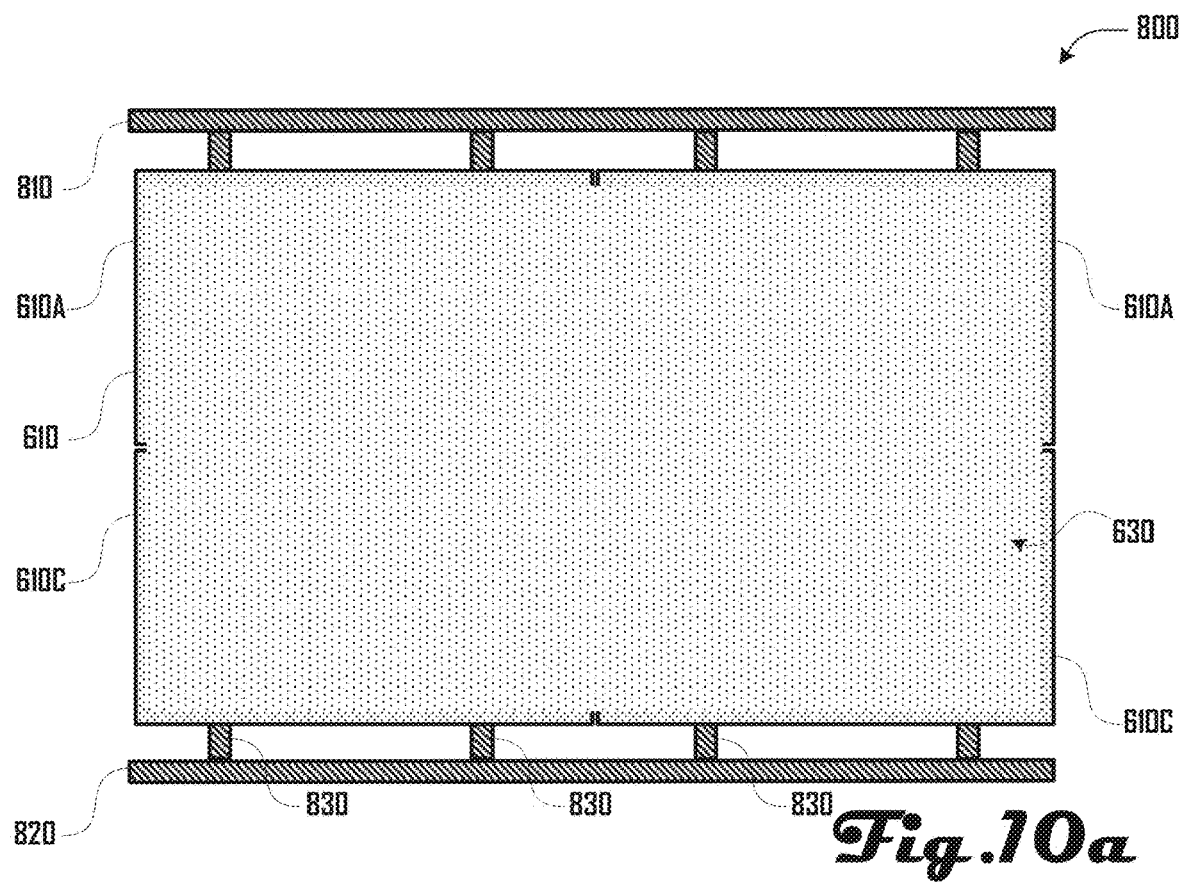
Figure 10B:
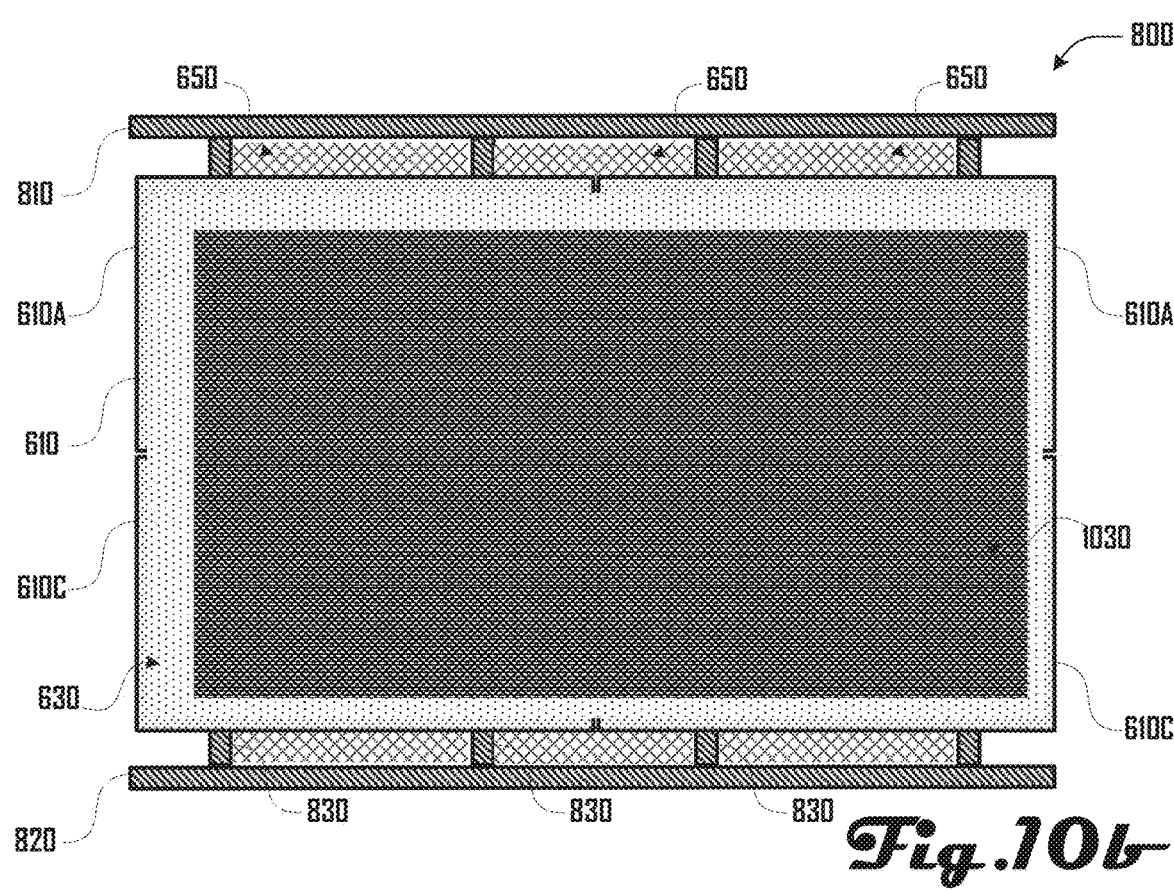

As shown in FIG. 9*a*, the drywall pieces 610A, 610B, 610C, 610C can be coupled to the studs 830 via a plurality of fasteners 640 (e.g., drywall screws) that extend though the drywall pieces 610 and into the studs 830. The drywall pieces 610 can define one or more seams 620, including in the example of FIG. 9*a* a vertical seam 620V and a horizontal seam 630H. In some embodiments, mud work can be performed on the seams 620 as shown in FIG. 9*b* and leaving portions of the drywall pieces 610 without joint compound 630. Additionally or alternatively, joint compound can be applied to portions of the drywall pieces 610 in addition to about the seams 620 as shown in FIG. 10*a*. The wall assembly 800 of FIG. 9*b* or 10*a* can then be sanded to generate a smooth profile or other profile as desired and the sanded wall assembly can be coated with paint 1030 as shown in FIG. 10*b*.

One aspect relates to an automated system 100 for cutting and hanging drywall or other substrates to cover surfaces like walls or ceilings. These substrates may or may not be covered with a coating including joint compound, plaster, stucco, insulation, or paint after they have been hung or attached to a wall assembly 800. As discussed in more detail herein, the automated drywalling system 100 can comprise a vision or mapping system, a planner, a marking system, a cutting systems, one or more robotic arms 140, one or more mobile bases 120, assist tools and stands, an augmented reality system, a user interface, a system to display maps or toolpaths in 3D on a computer or projected onto the environment, an inspection system to check placement and depth of fasteners 640 with associated images, a 2D or 3D map presenting the work performed, and any combination of these components.

In various embodiments, the automated drywalling system 100 can create a map of a construction site before the drywall 610 or other covering substrate is applied. This map or model can be created by importing building information modeling (BIM) and/or 2D, 3D plans into a planner system of the system (e.g., executed by the control system 322 or other suitable device). A map can also be created directly by the system 100 by utilizing vision systems 324, 364 and/or sensors 326, 346, 366 to scan the room. In some examples, vision systems 324, 364 can include stereo cameras, structured light, cameras, LIDAR, radar, sonar, laser scanners, thermal imaging or any combination of these components. Uploaded 3D or 2D plans can be combined with field data to create a more accurate map of the environment. Data from different sources can be combined using key features and user input. A map can include the location of the various elements of a wall assembly 800 including a header 810, footer 820, framing studs 830 as well as pipes, electrical conduit, ventilation ducts, and any other components installed on walls or ceilings. These locations can be derived from uploaded plans, a room scan and/or user inputs. To facilitate the creation of a map, a user can help identify features through analysis of images, including tagging of features physically or digitally. The user can physically tag components using various suitable elements, including but not limited to, a laser, tags, markers or a combination of these. The vision systems 324, 364 and/or sensors 326, 346, 366 can pick up these tags or track such tags as a user moves around the room and locates the features.

The automated drywalling system 100 can comprise a computational planner (e.g., executed by the control system 322 or other suitable device) which can utilize a map uploaded to the system and/or a map created by a mapping system of the system 100 to create a layout for how to cover the target surfaces of a wall assembly 800 with drywall 610 or other substrate. The planner can optimize the layout of the substrate for any of the following conditions including but not limited to, minimizing waste, minimizing substrate material used, minimizing coating material required to complete the surface, minimizing number of seams 620, joints or interfaces, minimizing cuts, available drywall sizes, or any combination. The system 100 can also optimize the layout for sound insulation, fire resistance, type of framing, coating to be applied, location of vents, placing seams, joints, or interface in the most accessible positions or away from the harshest lighting conditions. Repair and maintenance considerations can also be input into the planner resulting in the planner creating a layout that facilitates access to key pipes, vents, electrical connections and minimizes damage to the rest of the surface as a result of removing one panel. The planner can take direct input on the layout from the plans, map or architectural specifications. The planner can also reduce the size of the pieces to reduce the work required to bring into the room. Geographical and building information can also serve as an input to the planner including ground stability, room use, propensity for natural disasters, and the like.

The planner can determine how a room should be covered using drywall 610 or other substrate and output how each board or piece should be cut to fit the model. The automated drywalling system 100 can use this information to directly cut or score the boards using a cutting tool on a gantry, router system or the robotic manipulator. For example, in one embodiment a cutting end effector 462 can be used to cut pieces of drywall 610. The system 100 can also visually mark the cuts on drywall 610 using a laser, marker, paint, chalk or other visual method to guide a worker as to where the drywall 610 should be cut. The worker can then cut the drywall 610 using a knife, power saw, router, or the like. The automated drywalling system 100 can comprise a gantry system that positions a cutting tool or marker in two dimensions. A linear stage can then be used to move the tool into the board. The system 100 can be designed to minimize waste. The automated drywalling system 100 can also be used to create partial cuts that allow for the drywall 610 or board to be folded to create a continuous corner or curvature. The automated drywalling system 100 can also utilize custom board pieces or sizes that are designed to enable a robotic manipulator or operator to hang the drywall. In some embodiments, the system 100 can send the information on how to cut drywall 610 to an off-site system. The pieces of drywall 610 cut off-site can then be delivered to the site for installation. The system 100 can also mark pieces of drywall 610 or other suitable substrate to individually label them so that the pieces of drywall 610 can be referenced back to a map, plan, instructions, or the like.

With pieces of drywall 610 cut, a next step can be to hang the pieces of drywall 610 on wood framing or metal furring of a wall assembly 800 or other structure. The system 100 can facilitate this process by utilizing the base unit 120, robotic arm 140, and/or end effector 160 to assist a worker with lifting the board or to independently move and position the board. The base unit 120, robotic arm 140, and/or end effector 160 can also be used to screw or nail the drywall 610 into the studs 830 of a wall assembly 800. Similarly the base unit 120, robotic arm 140, and/or end effector 160 can hold a board of drywall 610 in place while a worker screws or nails the drywall 610 to place on a wall assembly 800. The automated drywalling system 100 can utilize a room model or map and vision systems 324, 364 and/or sensors 326, 346, 366 can be used to indicate when a board of drywall 610 needs to be shimmed to achieve a desired plane or location. The vision systems 324, 364 and/or sensors 326, 346, 366 can be used to check that the hanging process has been completed as prescribed and highlight any problem areas like high or low points. A room model or map can be updated after walls and/or ceilings are covered with drywall 610 so that such a model or map reflects the as-built condition and measurements.

The automated drywalling system 100 can produce a visualization, paths, or instructions or a combination of these to guide how drywall 610 or other suitable substrate is to be installed or hung. A visualization can include 2D or 3D maps marking joint outlines and can include numbers indicating an order that the pieces of drywall 610 should be installed in. Instructions can also be provided to the user indicating which piece of drywall 610 is to be placed where and in which order. Such instructions can include visual and/or auditory instructions. In one example, a visualization system can include a projection of a plan onto a target surface. For example, such a visualization can be done with a laser system, projector, through augmented reality headset or goggles worn by a user, or the like.

For example, FIG. 11 illustrates an example of a visualization 1100 being projected onto a wall assembly 800 that provides instructions to a user and/or the system 110 for hanging a plurality of pieces of drywall 610. In the example of FIG. 11, the visualization 1100 includes five visualization portions 1105A, 1105B, 1105C, 1105D, 1105E that are projected onto the wall assembly via any suitable method including, but not limited to via a user interface, via a projector via a laser system, via an augmented reality headset or goggles, or the like.

The visualization portions 1105 can define an order that a user or the system should hang pieces of drywall 610. For example, the first visualization 1105A can correspond to a first piece of drywall 610 that should be hung on the wall assembly 800 and the second visualization 1105B can correspond to a second piece of drywall 610 that should be hung on the wall assembly 800, and so forth. Alternatively, the visualization portions 1105 need not correspond to a specific order and can be indicative of separate pieces of drywall 610 to be hung on the wall assembly in any suitable order.

The visualizations portions 1105 can be identified as being separate in various suitable ways, including via different patterns as shown in FIG. 11, via different colors, via different animations, via different numbers, via different letters, and the like. In some examples, the visualization portions 1105 can be respectively removed or changed when a corresponding piece of drywall 610 is hung. For example, where a piece of drywall 610 is hung in the third visualization portion 1105C, the visualization portion can be removed (e.g., by no longer being projected) while other portions 1105 without drywall hung being maintained.

In another example, visualization portions 1105 can indicate correct or incorrect hanging or drywall pieces 610 during or after the hanging of such pieces of drywall 610. For example, a visualization portion 1105 can be colored red while a piece of drywall 610 is being hung corresponding to that visualization portion 1105 and when the piece of drywall 610 is in a position that is determined to be correct, the visualization portion 1105 can turn green to indicate correct positioning of the drywall piece 1105 on the wall assembly 800. Such a change from red to green can be done before or after the drywall 610 is coupled to the wall assembly 800 (e.g., via fasteners 640, or the like).

Similarly, a visualization 1100 can provide cues as to an order that drywall 610 is to be hung, including the next piece of drywall 610 that should be hung. For example, where an order of hanging begins with the first visualization portion 1105A and continues to the second 1105B, third 1105C, fourth 1105D and fifth portions 1105E, the first portion 1105A can blink to indicate that this drywall piece 610 should be hung on the wall assembly 800 in a position corresponding to the first visualization portion 1105A first.

Additionally, a visualization 1100 can project visualization portions 1105 onto pieces of drywall to assist a user and/or the system 110 in identifying drywall pieces that should be hung on a given portion of a wall assembly 800 corresponding to a given visualization portion 1105 on the wall assembly 800. For example, a visualization portion 1105 can be projected onto a piece of drywall 610 that is to be hung next and the visualization portion 1105 can follow the piece of drywall 610 as it is being moved, hung and coupled to the wall assembly 800. In various embodiments, a pattern, color, number or other suitable indicator can match between the visualization portion on a piece of drywall 610 and a portion of a wall assembly 800 to indicate correspondence between the two.

Also, while visualizations 1100 and visualization portions 1105 can relate to locations on a wall assembly 800 where pieces of drywall 610 are to be hung, in further embodiments, visualizations 1100 and visualization portions 1105 can relate to various other aspects of drywalling, including the location of portions of a wall assembly 800 behind pieces of drywall, indications of how to correctly position pieces of drywall 610, and locations where fasteners 640, or the like should be applied.

Pieces of drywall 610 can be hung by the automated drywalling system 100 and/or human operators. For example, in some embodiments an automated drywalling system 100 having a hanging end effector 160H can automatically pick up and hang pieces of drywall 610 including coupling drywall 610 to a wall assembly 800 via fasteners 640 (e.g., drywall screws), and adhesive, or the like. In another example, an automated drywalling system 100 having a hanging end effector 106H can automatically pick up and position pieces of drywall 610 at a wall assembly 800 and a user can fasten or otherwise couple the pieces of drywall to the wall assembly.

As discussed herein, various compositions such as insulation 650, joint compound 640, paint 930, and the like, can be applied to a wall assembly 800 during various stages of constructing the wall assembly 800. For example, insulation 650 can be sprayed between studs 830 and a header 810 and footer 820 (see FIG. 8b). In another example, joint compound 640 can be applied to boards of drywall 610 that have been coupled to studs 830, including at joints 620 between drywall 610 (see FIG. 9b) and on surfaces of the drywall 610 away from the joints 620 (see FIG. 10a). Additionally, in a further example, paint 930 can be applied over pieces of drywall 610 that have been coupled to studs 830 and that have been finished with joint compound 630 (see FIG. 10b).

Such application of insulation 650, joint compound 640, paint 930, and the like, can be performed with various suitable end effectors 160 including an insulation end effector 160I, a mudding end effector 160M, a painting end effector 160P, or the like.

FIG. 12 illustrates one embodiment of an end effector 160 that includes a spray gun 1210 that is coupled onto the robotic arm 140. A trigger can be actuated with an actuator (e.g., a servo, solenoid, pneumatic cylinder, or the like) which can open a nozzle 1240 to generate a spray 1250. Insulation 650, joint compound 630, paint 930, adhesive or other suitable coating material can be fed to the spray gun 1240 and nozzle 1240 via sources such as an insulation tube 421, paint tube 428, mud tube 432, or the like, which can feed from an insulation source 420, paint source 426, mud source 430, or the like, disposed at the base unit 120 (See FIG. 4).

Additionally, while separate sources 420, 426, 430 and lines 421, 428, 432 for insulation 650, joint compound 630 and paint 930 are shown, in further embodiments, a single source and/or single tube can feed a sprayer 1240 with different materials. For example a general source hopper can be loaded with insulation 650, joint compound 630 or paint 930, and the loaded material can be fed to the spray gun 1240 and nozzle 1240 with the same tube or line. Such embodiments can be desirable to allow the same source and/or tube to be used without requiring a plurality of different systems for different coating materials.

In various embodiments, a spray end effector 160 having a spray gun 1210 as shown in FIG. 12 can be used to deliver insulation 650, joint compound 630, paint 930 or other suitable coating to a target surface. In some examples, a spray gun 1210 can comprise an airless spray system or air assisted spray system. A pump can be used to move material from a source to the spray gun 1210. The material can be pumped at high pressures, in some examples, to enable the material to be sprayed or aerosolized. In some examples, high material particle speeds can produce a smoother finish, which can be desirable in some examples.

The pressure, flow rate, piping system resistance and the like, can be tuned or controlled by the automated drywalling system 100 to change the speed and amount of material being delivered to the spray gun 1210 and ejected from the nozzle 1240 as a spray 1250. The automated drywalling system 100 can use any suitable actuator (e.g., a servo, solenoid, air cylinder, linear actuator, or any combination of these) to open and close the nozzle 1240 of the spray gun 1210.

In some examples, a manual spray gun can be instrumented to use an electro-mechanical system to pull the trigger allowing the system 100 to control the timing of the material delivery as well as the opening and closing of the nozzle 1240. An automatic spray gun 1210 can also be used and controlled by the system 100 directly in further examples. The robotic arm 140 and end effector 160 and/or base unit 120 can thereby be used to apply material as a spray 1250 onto or into various target locations, including surfaces of drywall pieces 610 and/or seams 620 defined by one or more drywall pieces 610, which can be covered by joint compound 630 and/or joint tape 640. The spray gun 1210 can also be used to apply adhesive onto the surface for wallpaper or insulation application. In some examples, the spray gun 1210 can apply insulation 930 at a target location or target surface.

Figure 13:
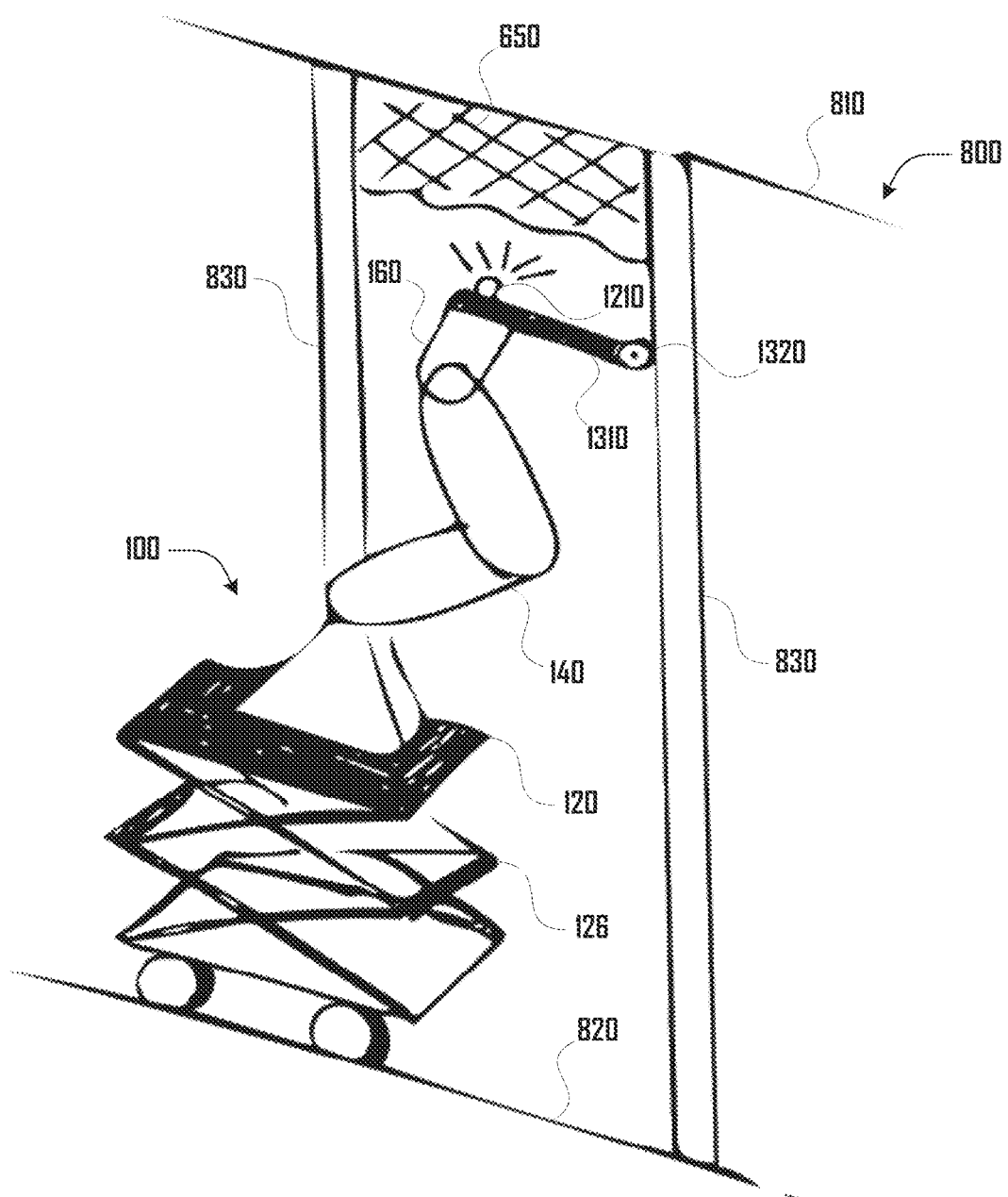
FIG. 13 illustrates an example embodiment of an automated drywalling system where an insulation end effector utilizes studs of a wall assembly as a guide for delivering insulation between the studs, header and footer of the wall assembly.

For example, FIG. 13 illustrates an example embodiment of an automated drywalling system 100 where an insulation end effector 160 utilizes studs 830 of a wall assembly 800 as a guide for delivering insulation 650 between the studs 830, header 810 and footer 820. As shown in FIG. 13, the end effector 160 can comprise an arm 1310 having a roller 1320 that can be pressed against an internal face of a stud 830 for guiding the sprayer 1210. In various examples, the insulation end effector 160 can utilize the surrounding surfaces as datums and a roller, wheel, blade, or the like, can be pushed in contact with such a datum surface or feature for reference.

Such contact points can extend away from an insulation application zone to enable the use of datums away from the where the sprayer 1210 is applying insulation 650. For example, FIG. 13 illustrates the end effector 160 having an arm 1310, which can allow the sprayer 1210 to be spaced centrally between the studs 830, while the roller 1320 contacts one of the studs 830 for use as a datum.

In various embodiments, the end effector 160 can control the position of the contact points such that the correct or optimal datum surface is used. For example, the arm 1310 can be extendible and retractable to provide for a desired offset from the stud 830 or other contact surface. Additionally, the force and pressure on contact points can also be controlled. For example, force can be directly or indirectly measured or estimated by monitoring the deflection of the mounting structure, and the like. In one embodiment, the spray end effector 160 can utilize a roller 1320 to guide the sprayer 1210 along a stud 830 or other portion of a wall assembly as shown in FIG. 13. In some examples, the system 100 can operate in hybrid force and position control following the stud 830 and spraying the insulation 650 in a target area relative to the stud 830.

The spray gun 1210 can use a variety of suitable nozzles 1240 including fan shape, bell shape, or the like. The system 100 can also use a tunable spray gun 1210 that can control the shape of the nozzle 1210. The shape of the material spray 1250 can be controlled in some examples by physically changing the shape of the nozzle 1210. The shape of the material spray 1250 can also be controlled using air streams, or the like which can act on the material spray 1250.

In some embodiments, a cassette with different nozzles 1240 can be installed on the spray gun 1210 allowing the automated drywalling system 100 to select a desired nozzle 1240 to control the shape of the spray 1250. A fan shape can also be tuned by using a set of sliding mechanisms to set the fan width and opening of the nozzle 1240. The diameter of a bell can also be tuned by a sliding cone with expanding orifice size. The robotic arm 140 and/or base unit 120 can also be used to move the nozzle 1240 closer or farther away from a target surface resulting in a narrower or wider fan or bell spray pattern respectively. The system 100 can utilize an array or series of nozzles 1240 to spray the material over a larger surface. The nozzles 1240 can be individually controlled and tuned or such nozzles 1240 can be controlled as a unit.

A series of tests can be performed to establish the characteristics of a pattern of material spray 1250 delivered by a nozzle 1240. In one embodiment, one or more vision system 324, 364 can be used to characterize a pattern of material spray 1250 and provide feedback for tuning parameters including tool parameters related to a nozzle 1240, spray gun 1210, material source, or the like, as discussed herein. Another embodiment can utilize an array of sensors (e.g., piezo sensors or other force sensors) on a test board, which can be used to measure the force applied by the pattern of material spray 1250 as it hits the sensors. The force pattern can be used to estimate a profile of the pattern of material spray 1250 as it is hitting the surface. The feedback from these sensors can be used to tune the profile of one or more spray nozzles 1240, spray gun 1210, material source, or the like.

The automated drywalling system 100 can include a mixer, pump and the like that can deliver mixed material to the various tools including a spray gun 1210. Such a mixer, pump and the like can be part of a material source disposed at the base unit 120 or disposed external to the system 100. In some embodiments, a mixer can utilize sensors to control a mixing ratio of water, slurry, pigments, or dry coating material, and any additives that enhance structure of the coating material, color the coating material, decrease setting or drying time, or the like. The mixer can control the mix ratio by measuring the mass, volume, density, or viscosity of the components or the mixture that defines the coating material (e.g., joint compound 630, paint 930, insulation 650, or the like). The mixing system can utilize pre-mixed material or can add solvent such as water and/or additives as desired to a mixture.

Figure 14:
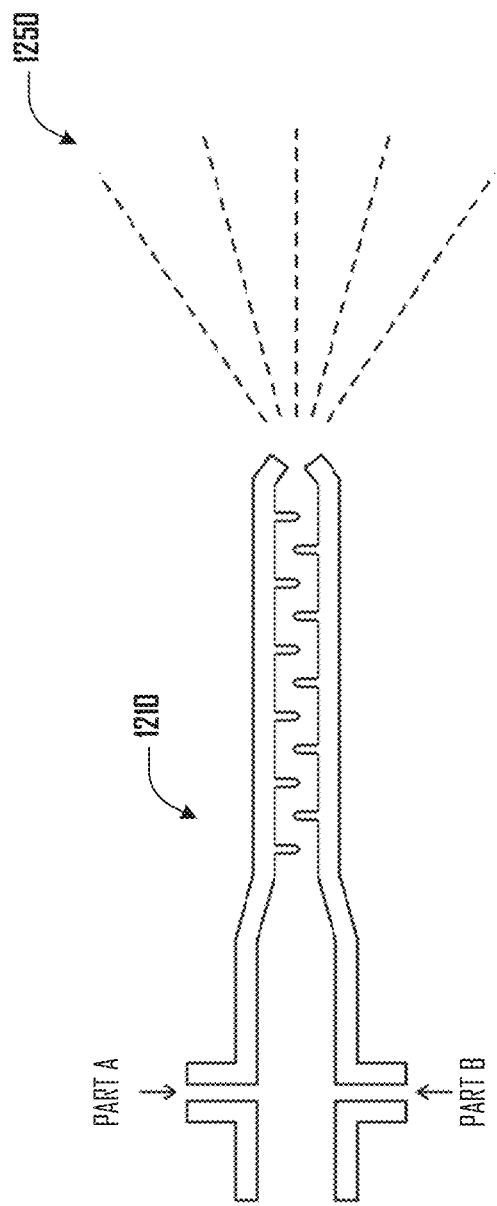
FIG. 14 illustrates an example of an in-line nozzle for mixing insulation, water, and any additives at an application site.

The automated drywalling system 100 can also use a spray gun 1210 that has been designed to mix the components of the material at the nozzle 1240. For example FIG. 14 illustrates and example of an in-line nozzle 1240 for mixing a coating material (e.g. paint 930, joint compound 630, insulation 650, adhesive, or the like) with solvent, and any additives at the application site. The nozzle 1240 or other cartridge or packet can be detachable in some examples to be cleaned or to be disposable.

A material source, a material line, a nozzle 1240, a pump, or the like, can be instrumented with sensors to measure flow rate, pressure and other desirable parameters. Pressure sensors can be used to monitor the pressure along a material line enabling the detection of changes in the pressure, flow rate, as well as the detection of clogs. In some examples, an orifice plate can be used to measure the flow rate through the spraying system in combination with a set of pressure sensors. Other flow rate sensors can include, but are not limited to a rotameter, spring and piston flow meter, ultrasonic flow meter, turbine meter, paddlewheel meter, variable area meter, positive displacement, vortex meter, pitot tube or differential pressure meters, or magnetic meters for conductive coatings. Detecting a change in flow, pressure in the material line, or reaction force at the end effector 160 (e.g. at a spray gun 1210) can be used to determine that a clog has occurred. The spray gun 1210 can produce a reaction force when spraying so if that reaction force changes the system 100 can identify that the material spray 1250 has changed, which can be indicative of a clog or other issue.

The spray gun 1210 or other end effector can also include a vacuum system, spray guards, or the like, that can be used to minimize overspray and reduce the amount of excess sprayed material in the air. For example, in various embodiments an end effector 160 can comprise a vacuum system that includes a vacuum hood disposed around an end and nozzle 1240 of a spray gun 1210 to capture overspray or fumes. The vacuum hood can surround the spray gun 1210 and can include an adjustable vacuum setting. The vacuum hood can be coupled to a vacuum line 424, which is connected to the vacuum source 422 to provide a vacuum to the vacuum hood.

In various embodiments, an end effector 160 can comprise one or both of a vacuum system and spray guard of various suitable configurations. The guard and/or vacuum system can be deployed when the automated drywall system 100 is spraying near another surface or a feature. The spray guards and/or vacuum systems such as a vacuum hood can be retracted using a linear actuator, solenoid, air cylinder, or other suitable electro-mechanical actuator. In some embodiments, a spray guard can also be mounted on a rotary stage such that the spray guard can be rotated into place next to a sprayer 1210 by actuating the motor or servo. Accordingly, in some examples, the position of the spray guard about a circumference of the spray gun 1210 can be selected by the system 100 and/or a user.

Figure 15:
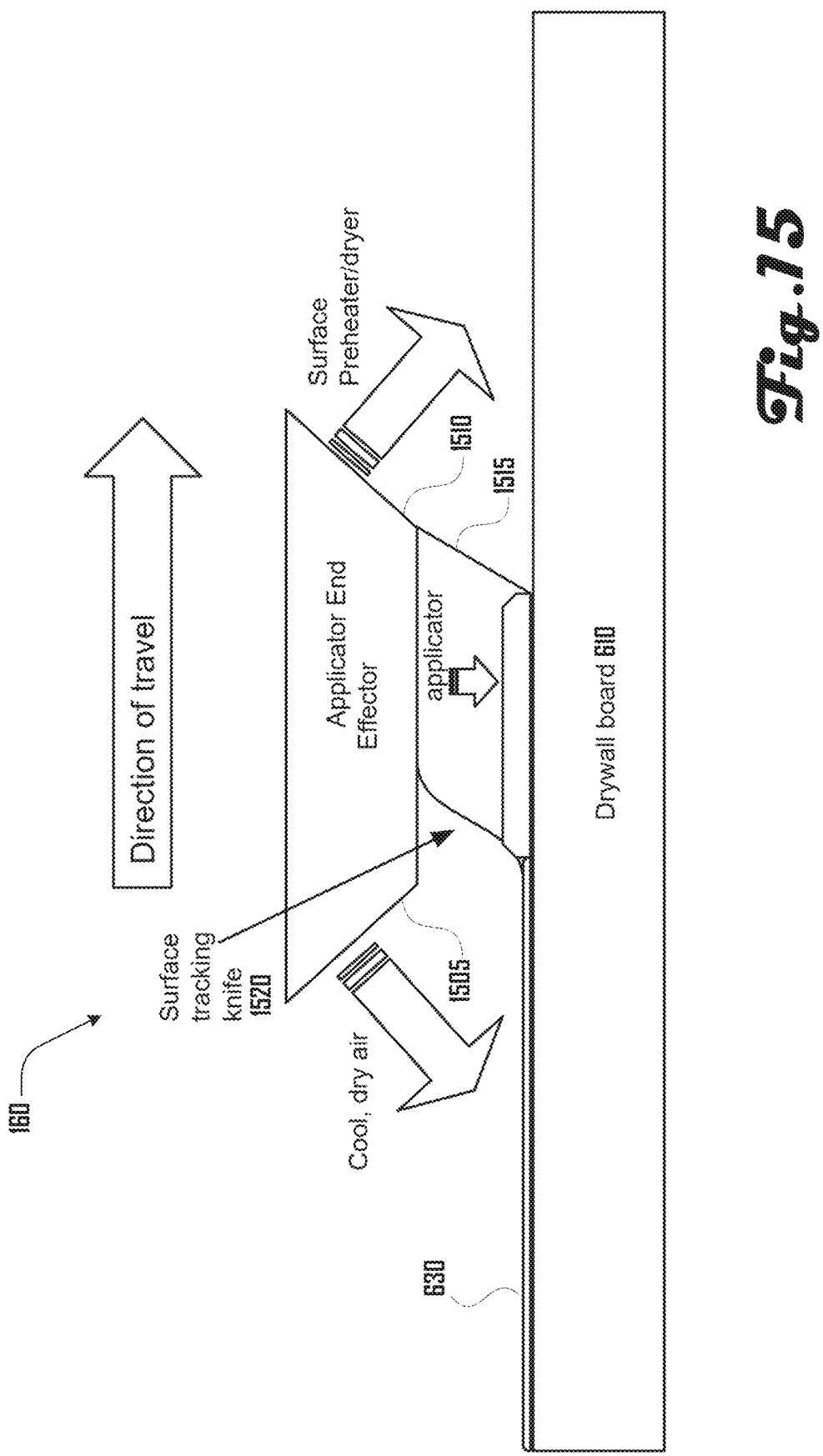
FIG. 15 illustrates an example embodiment of a mudding end effector having an application box that further comprises a first and second blower.

The automated drywall system 100 can also include an end effector 160 that comprises a flat box 1515 to apply various materials including insulation 650, joint compound 630, paint 930, and the like, as illustrated in the example embodiment of FIG. 15. In various embodiments, the automated drywall system 100 can move the box 1515 along a target surface. An actuator can control the shape and/or position of a blade 1520 to tune the profile of material being applied on the target surface. Various tool parameters, including box opening size, blade size, blade shape, and the like, can be controlled to simulate different sized boxes that are used to create a profile that feathers or blends material over a target surface such as a drywall board 610, or the like.

The end effector box 1515 can be automatically fed using a pump and line as discussed herein. An end effector 160 having a box 1515 can also include sensors (e.g., proximity, force, contact sensors) to ensure that the box 1515 is in contact with the target surface during the application of material. Additionally, a vision system 364, 324 of the end effector 160 or base unit 120 can also be used to ensure that the flat box 1515 is in contact with the target surface during application of material.

In some embodiments, an end effector 160 can include elements including, but not limited to a heater, curing light, blower or a combination of these. For example, FIG. 15 illustrates an example embodiment of a mudding end effector 160 that comprises a first blower 1505 and a second blower 1510. The first blower 1505 can be configured to apply cool and/or dry air to insulation 650, joint compound 630, paint 930, adhesive, or the like, that has been applied to a target surface by the effector 160. The second blower 1510 can be configured to apply heat and/or dry air to a surface on which such material will be applied. As shown in FIG. 15, the end effector 160 can include an applicator box 1515 that can include a tracking knife 1520 that can be used to profile the applied material. In various embodiments, preheating and drying the target surface on which material is being applied can improve the material application process. Cooling and/or drying the applied material via the first blower 1505 can be desirable to speed the drying/curing process of the material and can improve the final condition of the material on the target surface.

In various embodiments, elements including but not limited to a heater, fan, UV light, microwave emitter, or a combination of these elements can also be a separate part of the automated drywalling system 100. These components can be mounted on an end effector 160, a robotic arm 140, mobile base 120, positioning stage 122, gantry, or the like, or can be static in the room and separate from the automated drywalling system 100. A purpose of these components can be to speed up the curing, drying, or setting time of an applied material, but can also be used to prepare the surface for the application of such material. An embodiment of the end effector 160 utilizes a heater that leads the material application box 1515 for preheating the target surface on which material will be applied by the end effector 160. The material application point can be followed by a blower, which can act over the applied material. The end effector 160 can also utilize two heaters leading and following the material application or utilize two fans or a combination of these. In some examples, an end effector 160 can comprise a thermal imaging camera to assess a temperature of the joint compound 630 and calculate a moisture content for the joint compound 630. In further embodiments, the system 100 can comprise a humidity sensor and depth or thickness sensor.

The tool parameters or settings on the fan, heaters, or lights can be determined by the planning system (e.g., by the control system 322) using information from one or more of sensors 366, 346, 326 and/or vision systems 364, 324. For example, environmental sensors (e.g., temperature, humidity, and the like) and a prescribed material composition and applied thickness can be used to determine tool parameters for environmental control tools or systems such heaters, coolers, blowers, or the like. In another example, the end effector 160 can comprise a thermal imaging camera to assess the temperature of the applied material and calculate the moisture content of the applied material. The automated drywalling system 100 can also have a humidity sensor, conductivity sensor and depth or thickness sensors such as laser range finders, sonar, radar, LIDAR, and the like. Toolpaths, tool parameters settings, material composition, fan, heater, light settings, and the like can be adjusted in real-time based at least in part on the measurements, sensing or data obtained from such sensors or visions systems.

Figure 16:
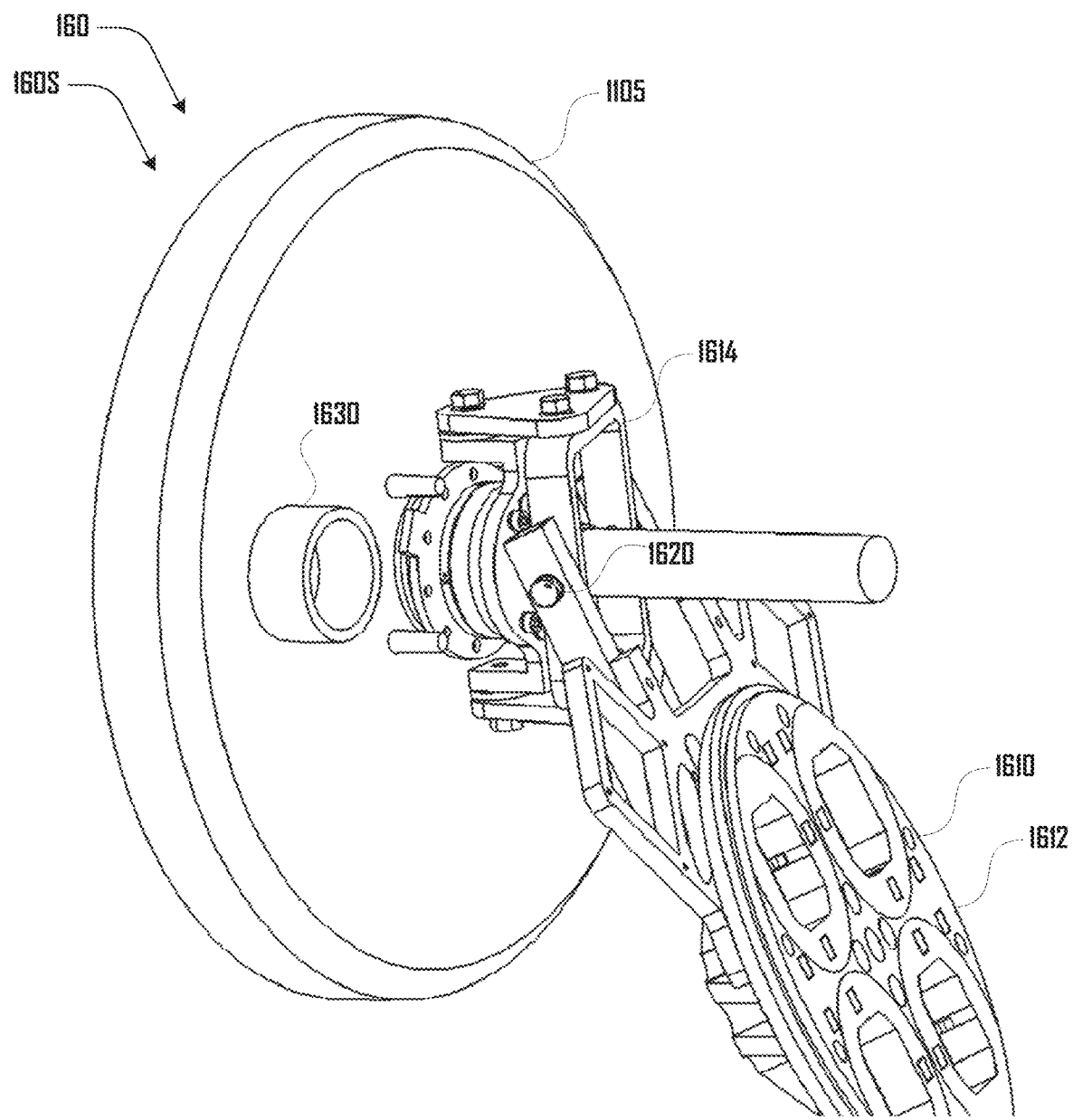
FIG. 16 illustrates an embodiment of a sanding end effector with a passive gimbal that comprises a first and second section, which are coupled via a rotatable joint.

As discussed herein, in various embodiments, the system 100 can be configured to sand joint compound 630 that has been applied to drywall 610 via a sanding end effector 160S. For example, FIG. 16 illustrates an embodiment of a sanding end effector 160S with a passive gimbal 1610 that comprises a first and second section 1612, 1614, which are coupled via a rotatable joint 1620. The gimbal 1610 is coupled to a sanding head 1105, which includes a vacuum port 1630, which can couple with an end 424E of a vacuum line 424 that provides a vacuum generated by a vacuum source 422 (see FIG. 4).

In another embodiment, the position of the sanding head 1105 can be controlled through an active gimbal of the end effector 160 using feedback from one or more of the sensors 326, 346, 366 and/or vision systems 324, 364 that establish the relative orientation between sanding head 1105 and sanding surface. A powered or passive gimbal or end effector degrees of freedom can be encoded such that the orientation of the sanding head 1105 is known to the system 100. The sanding end effector 160S can also utilize outriggers such as rollers to use adjacent surfaces or raised edges as datums to guide sanding and achieve accurate corners. These rollers can be instrumented to measure force, contact, proximity, or the like, or passively make contact while the system 100 utilizes sensing (e.g., force and torque sensing) to maintain a pressure or force against the datum surface. The information about sanding head orientation relative to the robotic arm 140 and/or base unit 120 can be used to alter the toolpath, tool parameter and/or system configuration to ensure the automated drywalling system 100 can carry out the sanding process without running into limitations of the hardware. The gimbal of an end effector 160 can be mounted in series with a force stage to allow for the sanding head 1105 to be able to tip, tilt and move normal to the target surface.

In both passive and active embodiments of a gimbal of an end effector 160, the angular position of the gimbal can be recorded to locate and establish the plane of the target surface. The angular position of the gimbal can be recorded using one or more sensors 326, 346, 366 and/or vision systems 324, 364, which can include, but are not limited to, encoders on a rotary axis, laser range finders, capacitance sensors, IMUs, an external vision system, sonar sensors, potentiometers, motor loads, or any combination of these. The gimbal system can be tuned to minimize dynamic effects by using springs, dampers or a combination of these. The gimbal system can be designed to minimize the distance between the sanding surface of a sanding head 1105 and the tip and tilt axes. In one embodiment, the tip-tilt pivot points are mounted on a ring with a diameter greater than that of the sanding head 1105, enabling for the pivots to be on the same plane as the sanding surface.

In embodiments with more than one sanding head 1105, all sanding heads 1105 can be mounted on a single gimbal structure or each head or multiple heads 1105 can be mounted on separate gimbals. Mounting the heads 1105 or group of heads 1105 on separate gimbals can allow for a sanding head surface plane to be set, limited, guided by the surface, or controlled separately. A multiple sanding head tool with each head 1105 on a separate gimbal can allow for each head to follow the target surface passively or actively to achieve the desired planarity and finish. The sanding head 1105 can be mounted on a gimbal in series with a compliant system described above that limits, sets, or controls the force applied on the surface.

In some embodiments, the sander head 1105 or other end effector portion can be surrounded by a vacuum hood that uses negative pressure to suction the dust or debris generated by sanding via the sanding head 1105. In some embodiments, the sanding head 1105 and sanding pad can also have holes or pores to allow for the negative pressure to be applied directly on a sanding surface. In some examples, the vacuum system 472 can use a filter to ensure that particles are captured. HEPA filters can be used in some embodiments. The collected material can be recycled. A sensor can be mounted on or about the automated drywalling system 100 to monitor air quality and particulate matter. The system 100 can trigger an alarm when unsafe air quality is detected. The magnitude of the negative pressure or vacuum can be controlled as a way to control the normal force applied by the sanding head 1105 on the target surface. The sanding end effector 160S can also have a trailing brush, sponge, wiper, vacuum port or any combination of these to help collect dust that is on the surface. The vacuum system 472, vacuum source 422, or the like, can be monitored to detect clogs or when the system is full. Clogs can be detected by monitoring the motor load, air flow, or vacuum reading. The amount of material in a collection system can be monitored by weight of the system, time in operation, visual sensors, or the like.

Turning to FIG. 17, an example of an automated drywalling system network 1700 that comprises a plurality of automated drywalling systems 100 is shown, which includes a first and second drywalling system 100A, 100B that are operably connected to a drywall server 1710 and a user device 1720 via a network 1730.

In various embodiments, the first and second drywalling systems 100A, 100B can be the same system 100 or can be different systems 100. For example, the first and second drywalling systems 100A, 100B can have the same or different end effectors 160, the same or different computing capabilities, or the like. In some embodiments, the systems 100 can be configured for performing different drywalling tasks at the same time or can be configured for performing the same drywalling task at the same time (e.g., hanging, mudding, sanding, painting, or the like). For example, FIG. 11 illustrates an example of a drywalling system comprising a first automated drywalling system 100A painting and a second automated drywalling system 100B performing sanding.

In some examples, the user device 1720 can be used to control one or more of the systems 100 and/or receive data from the systems 100 related to drywalling tasks, system status, system setup, and the like. The user device 1720 can be present locally with the systems 100 and/or can be remote from the systems 100. For example, a user can initiate one or more drywalling task to be performed by one or more of the systems 100 while the user and user device 1720 are present at a worksite with the systems 100 and can monitor progress of the systems 100 and the one or more tasks remotely via the user device 1720. Although a single user device 1720 is illustrated in FIG. 17, in further examples, an automated drywalling system network 1700 can comprise any suitable plurality of user devices 1720 or a user device can be absent. Additionally, while the user device 1720 is shown as being a smartphone in the example automated drywalling system network of FIG. 17, in various embodiments the user device 1720 can comprise any suitable device including a laptop computer, tablet computer, wearable computer, gaming device, home automation system, augmented or virtual reality system or the like.

In various embodiments, the drywall server 1710 can be used to control the automated drywalling systems 100, store data related to the automate drywalling systems 100 and the like. For example, as discussed in more detail herein one or more maps or models of one or more worksite or portions of one or more worksite can be stored at the drywall server 1710. In various examples, a user device 1720 can communicate with the drywall server 1710 to configure, program, or otherwise control the systems 100. In some embodiments, the drywall server can comprise one or more physical or cloud-based server and in some embodiments the drywall server 1710 can be absent. The network 1730 can comprise any suitable wired or wireless network including the Internet, a Wi-Fi network, a Bluetooth network, a cellular network, a local area network (LAN), or the like.

As discussed herein, in some examples, the automated drywall systems 100 can comprise a computational planner (e.g., executed by a control system 322 of a respective system 100). In some embodiments, one or both of the drywall server 1710 or user device 1720 can execute a computational planner and one or more of the automated drywall systems 100 may or may not execute a computational planner. In further embodiments, one or both of the drywall server 1710 or user device 1720 can execute a master computational planner with the systems 100 executing a sub-planner. In some embodiments, a plurality of systems 100 can be controlled by a computational planner being executed on one of the plurality of systems 100.

A planner can be used to plan tasks for one or more drywalling system 100. For example, the planner can be extended beyond a single system 100 to coordinate the paths and tasks for multiple drywall automation systems 100, which may or may not include a planning system. Such fleet coordination of a plurality of automated drywalling systems 100 can involve uploading maps, models, or the like created by one system 100 to a local or remote database, which can enable a plurality of systems 100 to have access to the map, model, or the like. This can remove a necessity for each separate system 100 to rescan a worksite.

Additionally, maps or models generated by one or more systems 100 can be stitched together to create a larger global map or model of a room, building, site, or the like. Automated drywalling systems 100 can report discrepancies or changes to previous scans, updating the map or model and propagating such data to peer systems 100. Such maps or models can be stored on one or more of the systems 100, the drywall server 1710, the user device 1720, or the like. New scans generated by the one or more systems 100 can be incorporated into a map or model as layers or in any other suitable way, when a new task has been executed such that the system 100 has overlaying maps or models of the workspace at different steps of the process. For example, maps or models generated or used on previous days, in previous tasks, or in previous sessions can be used as a starting input for a new task allowing the system 100 to use such models or maps as starting points for navigation and/or to update the parameters of the task given the starting conditions. The systems 100 can upload their data via the network 1730 (e.g., using Bluetooth, local Wi-Fi, wireless communication systems, wired systems or the like).

The computational planner can utilize multiple systems 100 to optimize how a job is completed. For example, a planner can coordinate paths of any suitable plurality of different systems 100 to avoid collisions, high loads in a floor area, tight spaces, and/or inefficient use of resources. The planning system can break down a workspace to optimize for time to complete the job, minimum number of drywall systems, minimizing the amount of manual work, maximizing tool utilization, or the like. In some examples, a user can review plans for the workspace and review what each system 100 will be tasked with doing. The fleet plan can be updated given new inputs from the individual systems 100 such as progress, errors or faults, a system 100 being down, user updates, work order changes, new requirements system constraints, and the like. In some examples, a user can preview how changing requirements and constraints may effect completion time, job costs, utilization, manual work, assets required, and the like.

Similarly, information about how a previous task has been done and the parameters of the finished product of one or more individual steps of one or more previous tasks can be communicated between automated systems 100 to enable the determination of process parameters of a subsequent step. In one example, a first automated system 100 that was responsible for spraying joint compound 630 can provide data about compound thickness localized to features of the wall to a second automated system 100 responsible for sanding, which can enable the sanding system to vary its process parameters based on correlating this data with detected features. Data from a plurality of systems 100 can be saved (e.g., at the drywall server 1710, user device 1720, or the like) in order to document work done, provide diagnostic information for the systems 100, and be analyzed to change the operating parameters and improve future performance of the systems 100. For example, machine learning or artificial intelligence algorithms can be applied to data over multiple jobs to update operating parameters and change the performance of one or more individual systems 100 of an automated drywalling system network 1700.

The computational planner can utilize a user interface to enable the worker to control, program, debug, plan, setup the machines, and the like. For example, such a user interface can be part of an automated drywall system 100 a user device 1720, or other suitable device. A user interface can be used to give a user information regarding steps that can be taken to setup each automated drywall system 100 or a fleet of automated drywall systems 100. Each step can be checked off when complete and the user can request more information on each step. The workspace of one or more system 100 can be shown overlaid on a camera feed or projected onto one or more target surface to help a user position one or more automated drywalling system 100. In various embodiments, the workspace can be projected using lights, lasers, or the like. One or more system 100 can automatically perform certain steps of one or more drywalling task and the user interface can report the progress of each step, and can give guidance to the steps the user can follow to perform one or more task. The user interface can be used to setup one or more automated drywalling system 100, run calibration routines, and the like. The user interface can also be used to plan one or more drywalling task including detecting wall, user definition of path parameters or a path itself, auto generation of a tool path, user input of tool parameters, and the like. The planner can automatically optimize tool parameters, tool paths, and the like given a set of user inputs.

The user interface can be a graphical user interface and can include a 2D or 3D representation of the worksite and/or workspace. Such a representation can include camera feeds as well as computer models and reconstructions created using sensor data. The interface can overlay paths, quality visuals, progress, a robot model, and the like over the camera or workspace models. As the task is completed, the path can be highlighted in different colors or with different style lines to indicate completion, quality achieved, problem areas, and the like.

Problems, issues, bugs, and the like, can be reported in a user interface. Lights on the base unit 120, robotic arm 140, and/or end effector 160 as well as sounds, vibrations, or the like can also be used to indicate problems, system motion, that work is in progress, that the system 100 is on or off, that one or more toolpath is running or paused, that the system 100 needs attention or refill of materials, and the like. In further examples, a user interface can display information on the progress, task and tool parameters, and quality metrics of the task being performed.

Environmental conditions can also be recorded by the system 100 and can be displayed on a user interface. For example, the system 100 can indicate to a user steps to take to correct or improve environmental conditions including air quality, temperature, humidity, and the like. In some examples, if the system 100 detects unsuitable or unsafe conditions for drywalling tasks, the system 100 can display a warning to a user and provide guidance on how to address such unsuitable or unsafe conditions. In various examples, the system 100 can use an optimization method to determine what parameters can be used to improve various drywalling tasks, including but not limited to, reducing work time, increasing work quality, minimizing material usage, and the like. The system 100 can generate reports and such reports can be presented on a user interface, including reports on tasks executed, quality metrics, environmental conditions, task completion, and performance logs, and the like. Information can include robot workspace, tool paths, tool parameters, task progress, sequence of approach, coating application rate(s) and/or thicknesses, spray pressure(s) and/or flow rate(s), force(s) applied by one or more tool, coverage record, path speed, tracking error, time to complete a task, tool time, setup time, vacuum waste material collected, cleaning time, and the like. In various examples, a user interface can display filter conditions, and the system 100 can trigger an alarm or instruction when a filter needs to be replaced or cleaned.

A user can interface with a computational planner using a computer, tablet, touch screen, mobile device, pendant, joystick, controller, or buttons directly on the system 100 (e.g., via a drywalling server 1710, user device 1720 and/or the system 100). In some examples, a worker can also position and train the base unit 120, robotic arm 140, and/or end effector 160 by directly moving the base unit 120, robotic arm 140, and/or end effector 160. The user interface, controller, buttons, or the like, can be used to record such positions as well as to change a control mode, task, or the like.

A computational planner can leverage fleet connectivity and a global planner (e.g., via the network 1730) to share information collected on one system 100 with other systems 100 within the automated drywalling system network 1700. The planner can create paths and toolpaths based on data from one or more vision systems 324, 364 and/or sensors 326, 346, 366, job or task requirements, user inputs, and the like. Changes made by a user to a plan, task, toolpath, tool parameter, or the like, can be recorded and fed to one or more machine learning algorithms to update the planner. In one embodiment, a user can edit a toolpath to deal with a type of feature such as an opening on the wall and the planner can learn from this input and in the future automatically plan this user defined path for similar features that fit this criteria related to such features.

In some examples, an augmented reality system can be used to show a worker a toolpath plan generated by the planner, task instructions, an original BIM or model, or the like. An augmented reality display can be presented via a user device 1720 or an automated drywalling system 100 (e.g., using a headset, smart goggles, projections, and the like). For example, a worker can be shown areas that require manual coating application. In some examples, user can also overlay worksite models or maps in an augmented reality system to show the location of studs, framing, pipes, ducts, electrical system, or the like behind one or more pieces of drywall 610 to facilitate joint compound application, sanding, painting and the like. Drywall tools, both manual and automated, can be tracked in a map or model using one or more of the vision systems 324, 364 and/or sensors 326, 346, 366 (e.g., via an inertial measurement unit (IMU), tags, RFID, and the like). In some examples, a warning can be given to an operator if an attempt is made to use a tool in an erroneous position, under the wrong tool settings, and the like. The system 100 or tools can also utilize vision systems 324, 364 and/or sensors 326, 346, 366 (e.g., radar, sonar, thermal imaging, and the like) to establish what is behind pieces of drywall 610 or other substrates.

The automated planning system can also produce a visualization, paths, instructions, or the like, to guide a user in completing manual work (see e.g., FIG. 11). In some examples, a visualization can include 2D or 3D maps marking areas of work with labels. Further embodiments, a visualization can also include a projection of a plan onto a target surface, which can be done with various suitable visualization systems, including a laser system, projector, augmented reality headset or goggles worn by the user, and the like.

A computational planner for installing and/or finishing drywall can encompass all or any of the planning steps of a drywalling process, including cutting boards of drywall 610, hanging drywall 610, and finishing drywall 610, including the walls, ceilings, and the like. The planning system can utilize job parameters such as finish quality, job timeline, materials, location of light sources, and the like, to create a plan for one or more step of a drywalling process (see, e.g., the method 500 of FIG. 5). The planner can optimize a generated plan for quality, cost, asset utilization, minimization of manual work, time to completion, facilitating manual work, or the like.

One or more of the vision systems 324, 364 and/or sensors 326, 346, 366 of the planning system 100 can be used to detect wood framing or metal furring, ducting, electrical boxes, window, door frames, and the like, which in some examples can inform where the pieces of drywall 610 will be mounted on a wall assembly 800. In some examples, the planning system can implement an optimization algorithm to determine how a room should be covered with drywall using information of available board sizes. In various examples, the computational planner can be directed to minimize various elements including the number of seams 620, wasted material, number of boards, number of butt joints, any other function defined as a cost, and the like. The planner can also use information about the room from a computer model or building information modeling (BIM) system to determine how to cover the walls and ceilings with drywall 610. The planner can have options to allow for a user to edit a proposed layout of one or more pieces of drywall 610 and/or a hanging sequence of pieces of drywall 610. In some examples, a computational planner can set a sequence for hanging drywall 610 and/or applying spray insulation such that this insulation can be applied in between sheets of drywall 610 either before one side of the wall assembly 800 is closed or through openings in elements such as drywall 610. In some examples, spray insulation, caulking, or the like can be applied after boards of drywall 610 have been hung on a wall assembly 800.

The planner can be used determine a model or map of how a room should be covered in drywall 610 and output how each board of drywall 610 should be cut to fit the model or map. Toolpaths for the system 100 generated by the planner can be used by an automated marking and/or cutting system in various embodiments. In some examples, a planner can utilize custom board pieces or sizes that are designed to enable an end effector 160 and/or operator to hang drywall 610. In further embodiments, the planner can output tool paths for the base unit 120, robotic arm 140, and/or end effector 160 to install drywall 610 and/or to assist a user during the installation. The tool paths can include joint commands, target poses, end effector positions, and the like, to pick up drywall 610 from a pile of drywall 610, move to the target surface, rotate and position drywall 610 as required, move into position, install fasteners 640 or the like.

The system 100 can also output paths for a gantry system, which can pick-up, move, position, anchor drywall 610, or the like. The planner can also output paths for the mobile base 120 to follow to deliver the materials such as drywall 610, position an end effector 160 or robotic manipulator 140, move a tool to assist the user in the hanging process, position visualization or lighting equipment, and the like. The mobile base 120 can work in coordination with a user, robotic arm 140 and/or end effector 160 to execute various drywalling tasks. A position of the mobile base 120 can be used as a rough positioning stage, with the vertical lift 126 of the base unit 120 setting a height of the robotic arm 140 and end effector 160, which can act as a fine positioning stage.

Another step in a drywalling process can include applying drywall tape 640 and/or joint compound 630 over boards of drywall 610 that have been hung on a wall assembly 800. The planner can take as an input a layout of how the boards of drywall 610 were hung by the system 100 in the room to locate seams 620 and/or the system 100 can scan the room to create an updated map or mode of the layout of drywall 610 hung in the room. The location of the framing elements (e.g., a header 810, footer 820, studs 830, or the like) type of fasteners 640 used, layout of the drywall 610 on the wall assembly 800, and the like, can provide information on the planarity, flatness of the wall, and location of high or low points.

The computational planner can then utilize a map or model uploaded to the system 100 and/or created by the automated drywall system 100 to determine tool paths and/or tool parameters for the base unit 120, robotic arm 140, and/or end effector 160 to achieve the specified joint compound application, sanding, painting, and the like for the desired finish. The planner can create toolpaths based on a global map or model of the room and can then update these paths given updated local measurements once the base unit 120, robotic arm 140, and/or end effector 160 are in place.

The planner can be informed by data from vision systems 324, 364 and/or sensors 326, 346, 366 on the flatness of the wall, by user inputs, by location of seams 620 as specified by a layout planner or a scan of the room after the substrate was applied, and the like. The planner can produce toolpaths and tool parameters to enable the system 100 to apply joint compound to smooth out joints, seams, low points, high points, and other features to create a visually flat wall. Toolpaths and/or tool parameters can also be determined by a desired or required finish. For example, areas that are exposed to changing, harsh, or bright lights can receive a higher quality finish with tighter controls on tool planarity, tool overlaps, thickness and characteristics of compound applied, texture, and the like.

The 2D or 3D maps or models created by the system 100 can be registered to the physical environment utilizing recognizable features such as doors, windows, outlets or corners. The registration can also be done using markers, tags, or laser outlines that are placed in the room. A projection or visualization system can find the features or markers and can locate the maps or models created using these. The system 100 can utilize a user interface to enable the user to help locate the map or projection relative to the environment and resolve any issues or discrepancies. The user can utilize a physical marker to signify key features for the system 100 allowing the system 100 to locate the map or model relative to the physical environment. The system 100 can also use one or more of the base unit 120, robotic arm 140, and/or end effector 160 to find target features, markers or surfaces and locate them relative to the system 100, which can be located using a localization system including laser range finders, computer vision, LIDAR, radar, sonar, stereo vision, odometry, IMUs, or the like.

The robotic arm 120 can utilize a compliant or force limiting end effector 160 to enable safe contact with the environment allowing the system 100 to accurately locate target surfaces, features or components, accommodate errors in positioning without damaging the substrate or the robotic arm 120. By utilizing the robotic arm 120 and compliant end effector to locate a physical component the system 100 can establish a point, line, or plane and therefore locate a virtual plan, map or model on the physical environment. Toolpaths can be updated from the virtual plane to the physical plane. Refitting of the toolpaths onto the contacted surfaces can enable the system 100 to deal with errors and discrepancies between the modeled environment and physical environment. These tools enable quick on-site calibration using global room wide maps and local measurements. Refitting the toolpaths allows for errors in positioning of the base unit 120, robotic arm 140, and/or end effector 160. The base unit 120, robotic arm 140, and/or end effector 160 can also utilize radar, sonar, thermal imaging to establish what is behind the substrate, and this information can be used to update the virtual map and ensure that no damage is done to any electrical, plumbing or ventilation.

The planner can output tool poses or tool paths for the base unit 120, robotic arm 140, and/or end effector 160 including joint commands, target poses and end effector positions, or the like. The system 100 can also output paths for a gantry system or positioning stage which can be used in conjunction with the robotic arm 140 or without a robotic arm 140 to move and position tools. The planner can also output paths for the mobile base 120 to position a gantry, positioning stage, robotic manipulator 140, end effector 160, or the like, including paths to move a tool to assist a user in the hanging and finishing process, or positioning visualization and/or lighting equipment. The mobile base unit 120 and vertical lift 126 can work in coordination with a user, robotic arm 140, end effector 160, gantry or the like to execute one or more task. The planner system can control the different components of the platform (e.g., the base unit 120, robotic arm 140, and/or end effector 160), which can allow for coordinated movements and forces with a target goal of moving a tool or end effector 160 to a desired position under the prescribed forces and moments. The position of the base unit 120 can be used as a rough positioning stage, with the vertical lift 126 setting the height of the robotic arm 140, which can act as a fine positioning stage.

The automated drywalling system 100 can utilize the computational planner and a model or map uploaded to the system or a model or map created by the mapping system to create an optimal layout for how to cover target surfaces with drywall 610 or other substrate given available board sizes. The planner can generate a plan based on directives including minimizing number of seams 620, minimizing wasted material, minimizing number of boards, minimizing number of butt joints, or any other suitable function. The planner can also use information about a room from a computer model or building information modeling (BIM) system to determine how to cover walls and ceilings with drywall 610. The planner can have options to allow for a user to edit the proposed layout of drywall 630 and hanging sequence of the drywall 630. The planner can be configured to minimize the size of the drywall pieces 610 to reduce the work required to bring drywall 610 into a room.

The planner can use joint compound application paths generated by the system 100 to inform how the surface is to be sanded, smoothed or polished to achieve the desired finish. The toolpaths and tool parameters from the joint compound application performed by the system 100 can serve as inputs for the system 100 to facilitate automated sanding of the mudded drywall 610, which can enable sanding to be tuned according to the application of the joint compound 630 by the system, including features of joint compound 630 and compound characteristics such as how the joint compound 630 was dried, type, hardness, and layers of joint compound 630 applied.

In some examples, the system 100 can apply a layer or profile of joint compound 630 that is greater than a thickness that is manually applied to allow for the sanding system to sand down to a desired plane. In some examples of manual joint compound application (e.g., as shown in FIG. 6a-6e) mud 630 can be profiled to taper from high points. In various examples, the system 100 can apply a thicker layer than other methods, which can enable the system 100 to sand down high points to be level to the adjacent surfaces. For example, another method of applying joint compound 630 is illustrated in FIGS. 7a and 7b.

In various examples, the planner can create toolpaths based on a global map or model of a room and then update generated toolpaths given updated local measurements once the base unit 120, robotic arm 140, and/or end effector 160 are in place. The planner can be informed by thickness measurements, data from vision systems 324, 364 and/or sensors 326, 346, 366 on the flatness of the wall, information recorded on how joint compound 630 was applied in previous steps by the system 100, user inputs, location of seams 620 as specified by a layout planner or a scan of the room by the system 100 after the drywall 610 was applied, and the like. The planner can produce toolpaths and/or tool parameters to enable the system 100 to smooth out joints, seams, low points, high points, and other features to create a visually flat wall. The toolpaths and/or tool parameters can also be determined based on a desired or required finish. For example, areas that are exposed to changing, harsh, or bright lights and areas that will be painted to a glossy finish can receive a higher quality finish with tighter controls on roughness, planarity, and tool overlaps.

The system 100 can also utilize a feedback mechanism for communicating contact, forces, gimbal displacement information, tool orientation, motor loads, finish quality, and the like to the computational planner for the purpose of real time updating of the tool paths and tool parameters for improving finish. The planning system can use tool position and orientation, captured surface conditions and models or maps to update the robotic toolpaths to ensure that the desired contact is maintained during sanding. The system 100 can also determine areas that need another mud, sanding, or painting pass; rework of mudding, sanding or painting using the system 100, or rework of mudding, sanding or painting to be done manually by the user. A user can also use a user interface (e.g., via a user device 1720) to indicate areas that the user has identified as needing rework. The planner can use this input along with other information about the previous drywalling work performed by the system 100 to create one or more new toolpaths and/or tool parameters. Both user and system feedback can be fed into a machine learning algorithm to create a better model for mudding, sanding, and/or painting future surfaces given a set of initial conditions of various drywalling tasks.

Similarly the computational planner can be used to create tool paths and tool parameters to apply a coating such as wall paper, paint 930 or joint compound 630 on the drywall. The planner can be informed by data from vision systems 324, 364 and/or sensors 326, 346, 366 on the flatness of the wall, user inputs, location of seams 620 as specified by a layout planner or a scan of the room by the system 100 after the drywall 610 was applied. The planner can produce toolpaths and tool parameters to enable the system 100 to apply paint, wall paper or other coatings to surfaces. The toolpaths and/or tool parameters can also be determined by a desired or required finish. For example, areas that are exposed to changing, harsh, or bright lights can receive a higher quality finish with tighter controls on paint thickness, overlaps, textures, or wallpaper seam location.

The planner can specify tool parameters such as nozzle size and shape, spray pressure and distance between a sprayer and target surface, speed, and the like, to create a toolpath that can cover the surface with the prescribed overlap and thickness of coating materials (e.g., joint compound 630, paint 930, adhesive, wallpaper, and the like). Changing these parameters can control the size of a spray pattern on the wall, and the planner can use this control to facilitate coverage, to increase the robot workspace or to minimize the number of cart positions required to complete a given task. Sanding overlap can also be tuned by the planner to enable a generated toolpath to cover the entire surface of drywall 610 given a defined sanding disk size. The planner can also separate tool control from base unit 120 control, from robotic arm 140 control, and/or from end effector 160 control, which can enable the system 100 to perform dry runs of tool paths and/or tool parameters. Such dry-runs can be used by a user to review a toolpath and/or tool parameter before treating the surface of drywall 630 with a coating. A dry-run can have an additional offset such that the tool is not in contact with the drywall 610 or joint compound 630 during the dry-run. A user interface can enable the user to change feed rates for the dry-run to speed up or slow down the tool path.

In various examples, the planner can use one or more vision systems 324, 364 and/or sensors 326, 346, 366 to establish a condition of the wall before and after application of joint compound 610, paint 930, or sanding to determine appropriate toolpaths and tool parameters. For example, in some embodiments, the system 100 can use structured lights, stereo cameras, images, lights and shadows, LIDAR, radar, sonar, point clouds or the like, to establish a condition of the surface of drywall 610. Such conditions include establishing a surface plane relative to the tool or another surface, detecting high or low points, curvature, defects, and the like. The vision systems 324, 364 and/or sensors 326, 346, 366 can be used to create a topographical map of the surface of drywall to identify high and low spots. A map or model can be created after the drywall 610 or other substrate has been hung. The map or model can also be an input from a board layout plan (e.g., generated by the system 100) that specifies the location and types of joints 620 and other features in the room. The map or model can be updated by the vision systems 324, 364 and/or sensors 326, 346, 366 as the system 100 is moved around the room. For example, the system 100 can utilize rollers, proximity sensors, contact sensors, profilometers, and the like, to measure the profile of the surface of drywall 610. The base unit 120, robotic arm 140, and/or end effector 160 can be used to make contact with rollers or other suitable mechanism on an encoded linear stage and then move such elements over the surface creating a topographical map. This can be done over joints or seams 620 to determine the profile of a surface of drywall 610. The system 100 can utilize a generated or uploaded topographical map or model to compute how paint 930 or joint compound 630 should be applied, tapered, and/or sanded to create a visually flat wall.

The automated drywalling system 100 can be instrumented with vision systems 324, 364 and/or sensors 326, 346, 366 that provide data to the planner to improve operation and ensure quality of drywalling tasks performed by the system 100. The vision systems 324, 364 and/or sensors 326, 346, 366 can be used to check that the drywall hanging process has been completed as prescribed and the system 100 can highlight any problem areas like high or low points. The system 100 can be used to check that drywall fasteners 640 (e.g., drywall screws or anchors) are spaced correctly according to a plan or code and that such fasteners 640 have been installed at the correct depths. A detailed plan showing the location of the drywall fasteners 640 (e.g., drywall screws or anchors) can be used to facilitate inspections and can be accompanied with images of each fastener 640. The automated drywall system 100 can be used to scan the room after the drywall 610 has been hung to update a map or model to as-built conditions or create an additional layer of the map or model. The as-built map or model can be used as an input to planning of any task of a drywalling process, including indicating how joint compound 630, paint 930, or sanding should be applied to achieve the desired visual flatness and finish.

During various steps in a drywalling process, the system 100 can use data from vision systems 324, 364 and/or sensors 326, 346, 366 (e.g., force and torque sensors) to apply a desired force during troweling, taping, sanding, painting, drywall hanging, and the like. The vision systems 324, 364 and/or sensors 326, 346, 366 can monitor only force normal to a blade, rollers, sanding head, or the like, or multiple axes including torque measurements and six-axis sensing. Such force sensing can be used to control the force or pressure applied at a tool of an end effector 160. A minimum force or contact readings can also be used to ensure that sufficient contact is made before a material is allowed to flow or tool is started, with force below a certain threshold or determined loss of contact triggering the stop of material flow or turning off the tool, which can be desirable for safety in some examples.

The vision systems 324, 364 and/or sensors 326, 346, 366 can be used to capture where and how adhesive, joint compound 630, paint 930, or the like, has been applied. By monitoring the spray pattern applied on the wall, the system 100 can detect clogs, nozzle or blade wear, or other problems. In one example, a thermal camera can be used to detect an applied coating material, which can be at a different temperature than a target material such as drywall 610. The temperature of a coating material (e.g., joint compound 630 or paint 930) can be controlled to facilitate detection by vision systems 324, 364 and/or sensors 326, 346, 366. Monitoring the coating materials temperature can give information on the moisture content of such a coating material. For example, a coating material (e.g., joint compound 630 or paint 930) can have a prescribed coloring or additive to create contrast between the target surface and the coating material, which can facilitate the detection of areas that have been covered by the coating material and areas that have not been covered. The color can change as the coating material dries as well as after it has been sanded. The system 100 can also apply joint compounds 630 in layers with different colors to facilitate detecting how much material has been applied and removed at various locations. Data from vision systems 324, 364 and/or sensors 326, 346, 366 (e.g., capacitance, radar, resistance, humidity, conductivity, sonar measurements, or the like) can be used to establish the thickness of the coating material that has been applied to the drywall 610. In some examples, lights or other illumination systems can be mounted on the base unit 120, robotic arm 140, and/or end effector 160 or external to the system 100 to illuminate a target surface, which can enable the detection of coated surfaces, high and low points, tool marks, coating roughness, orange peel, and defects using one or more vision systems 324, 364 and/or sensors 326, 346, 366.

The planning system can monitor the coverage achieved by a tool and update tool paths and tool parameters to generate a desired coating profile applied to a surface of drywall 610. The planner can dynamically tune a sprayer fan or bell until a spray pattern matches a desired shape, thickness, size, or the like. In various examples, the system 100 can move the sprayer closer or farther away from a target surface to change a spray pattern generated by the sprayer. A coating system (e.g., sprayer of joint compound 630 or paint 930) can tune the covering material flow rate, pressure, spray tool speed, or the like, to achieve a desired thickness. The toolpaths and/or tool parameters can be updated to ensure that a desired overlap is being achieved.

The vision systems 324, 364 and/or sensors 326, 346, 366 can be used to detect a sanding finish, and using this information, the planner can establish if a sanding pad needs to be changed. A user interface can display the wear on a sanding pad and can alert a user when the disk needs to be changed. A sanding model with inputs from a sanding tool, including motor load, sanding speed, grit, material collected by the vacuum system, contact forces, tool orientation, and the like, can be used to estimate the material removed at various points.

In various embodiments, a planning system can utilize a feedback mechanism for communicating contact, forces, tool orientation, motor loads, environmental readings, finish quality, and the like to a larger robotic system (e.g., automated drywalling system network 1700 of FIG. 17) and master planner (e.g., implemented by a drywall server 1710) for the purpose of real time updating of the tool paths and tool parameters for improving finish generated by one or more automated drywalling systems 100. The systems 100 can use tool position, orientation, captured surface conditions, models, maps and the like, to update the robotic toolpaths and/or tool parameters to ensure that desired contact and forces are maintained during performance of a task by the system 100.

A computational planner can use quality monitoring to determine areas that need another coating or sanding pass, rework using the automated drywalling system 100, or rework to be done manually by a user. A user can also use a user interface to indicate areas that the user has identified as needing rework. The planner can use this input from the user interface along with other information about the previous work performed by the system 100 to create a new or revised toolpath and/or tool parameter for the system 100. User and/or system feedback can be fed into a machine learning algorithm to create a better model for sanding future surfaces, applying joint compound 630, or applying paint 930 given a set of initial conditions.

The planner can use data from one or more of the vision systems 324, 364 and/or sensors 326, 346, 366 (e.g., force and contact sensor information) to operate the system 100 in force control, where motions and speeds of the system 100 are driven to ensure a desired force is applied in desired directions or in desired locations. Similarly, force sensing can be used to detect contact with an object, obstacle, intersecting wall or ceiling, and the like. By monitoring the forces, torque, and the like on the base unit 120, robotic arm 140, and/or end effector 160 the system 100 can detect that it has made contact with an adjacent wall or ceiling and can alter a toolpath or tool parameter accordingly. In some examples, force measurements can be used to detect accidental contact and can trigger a safety operation such as stopping the system 100 or retracting the system 100 away from a determined contact point.

The base unit 120, robotic arm 140, and/or end effector 160 can also use one or more of the vision systems 324, 364 and/or sensors 326, 346, 366 to detect that an end effector 160 or tool is touching a surface, obstacle, object, or worker, as well as detect the distance to an adjacent surface or detect contact with that surface. The vision systems 324, 364 and/or sensors 326, 346, 366 (e.g., force, contact, displacement, or proximity sensors) can be mounted on outriggers from the base unit 120, robotic arm 140, and/or end effector 160 to sense obstacles, objects, or adjacent surfaces ahead of one or more tools of an end effector 160. The system 100 can detect, follow, and use adjacent walls as datums to guide coating application or sanding and to achieve accurate corners, and the like. For example, in some embodiments, the end effector 160 can comprise a guiding element configured to engage a target surface, adjacent walls, or the like, to allow the end effector 160 to be guided in one or more drywalling task associate with the target surface. For example, such a guiding element can include an arm extending from the end effector 160, with the arm having a roller at the end of the arm configured to engage the target surface or portion of a wall assembly as a mudding, sanding or painting guide.

A computational planner can prescribe one or more control strategies for the base unit 120, robotic arm 140, and/or end effector 160 to complete one or more drywalling tasks. For example, position control can be used to command the system 100 to follow a trajectory given speed, acceleration, jerk constraints, and the like. In another example, the system 100 can be controlled at the joint level by giving commands to the joints of the base unit 120, robotic arm 140, and/or end effector 160 to achieve a desired robot state and/or tool position. In further examples, control can be done at a higher level, which can allow a user or program to control the position and orientation of an end effector 160 only. In yet another example, the system 100 can be controlled in task space where the system 100 controls a tool relative to the task. This approach can focus on achieving a desired tool position, orientation, speed, or the like relative to a target surface rather than on each joint of the base unit 120, robotic arm 140, and/or end effector 160 reaching a respective target goal. The automatic drywalling system 100 can utilize force control to control the force applied to a target surface, an obstacle, adjacent surfaces, objects, and the like. The applied force can be controlled in a single axis or multiple axes. Hybrid control modes can also be used in various embodiments. For example, the system 100 can be commanded to achieve a given position as long as a given force is not exceeded.

A computational planner can generate reports and interface with other software platforms including BIM packages, and the like. In some examples, reports can be created that can be used for inspection, certification, and the like. For example reports can be customized to provide information required to pass a standard, test, or certification. A reporting system can also provide a live update of a current task progress, a live camera feed, and the like. This information can be used to help track asset performance and work progression. Such data can be reported to a BIM system or other software to facilitate planning of other trades, next steps, or schedule inspections or other tasks. Reports can include partial or full maps of joint compound applied and tool paths and tool parameters utilized to complete various task. In some examples, images and/or video can be recorded to facilitate quality check, for tracking of issues, and the like. The system 100 can record some or all tool parameters or tool paths used to complete one or more task, which can be fed to a machine learning software to enable the system 100 to learn from past work. In various examples, the reports can be used to optimize workflow and scheduling. For example, an optimization function of the system 100 can be updated to meet desired task parameters including minimizing task time, completion of the task in a part of the worksite to allow other trades to come in, minimizing cost, optimal use of assets and workforce, and the like. Reports generated by the system 100 can include information on environmental conditions present during one or more tasks and how the process of one or more task was changed based on the environmental conditions present during performance of the task.

In some examples, a planner can create a report that shows process parameters that were used to cover a surface of drywall, and the order of operations, and the like. Reports can include BIM, 3D and 2D maps or plans, images, video, and the like. The maps and/or models provided by the system 100 can be used to facilitate repairs and maintenance by providing a customer with the location of components behind a wall assembly 800 as well as the location of seams 620 to facilitate the removal of panels or boards of drywall 610.

After the completion of each task, updated room models or maps that reflect the as-built conditions and measurements can be used as a model or map from which subsequent drywalling steps are planned. The drywall 610 and/or fastener 640 layout generated or provided in a hanging step can serve as an input for a joint compound application plan generated by the system 100. A map of the thickness of joint compound 630 applied, with or without shrinking, can be fed into a planning system, which can plan tool paths and tool parameters for the system 100 to achieve a desired finish for sanding and/or painting. In various examples, sanding toolpaths and/or tool parameters can be used as inputs to a painting plan generated by the system 100. The computational planner can be used to create a plan for the full drywalling process including mapping a room, cutting drywall 610, hanging drywall 610, applying joint compound 630 to the drywall 610, sanding joint compound 630 on drywall 610, painting drywall 610, and the like.

In further examples, the planning system can be used to create tool paths and/or tool parameters for treating surfaces other than drywall 610 including but not limited to cement, polymers, metals, stucco surfaces, and the like. The system 100 can plan how to apply coatings on drywall 610, boards, lath, mesh, or other suitable substrates. The system 100 can also be used to create paths for sanding, polishing, or smoothing surfaces.

As discussed herein, the automated drywalling system 100 can be used to deliver spray foam insulation, blanket or batting insulation, blow-in insulation, or the like. In one embodiment, the system 100 can be used to mix, deliver, and apply insulation 650 during framing and hanging of drywall 610. The system 100 can configure how insulation 650 is prepared, how insulation 650 is delivered onto the substrate and how insulation 650 is set, cured or dried. The system 100 can be used to trim or cut insulation 650 as the insulation 650 is delivered or after insulation 650 has set in place.

Insulation 650 can be delivered or applied onto a target surface using a variety of tools. In one embodiment, a sprayer system is used to deliver the insulation 650. The pressure, flow rate, and piping system resistance can be tuned or controlled to change the speed and amount of material delivered. The system can use a servo, solenoid, air cylinder, linear actuator, or any combination of these to open the orifice of the sprayer. The spraying tool can also include a vacuum system, spray guards, or a combination of these that are used to minimize overspray, reduce the amount of material in the air, and capture fumes. The robotic manipulator or positioning stage can be used to locate the sprayer.

The automated drywalling system 100 can dispense batting or blanket insulation by rolling it onto the surface or between framing elements such as studs 830 and the like. The system 100 can use a tool to locate the blanket relative to the framing or other feature and to cut the blanket to length. A roller or blade can be used to push the insulation into place. The end effector can use the framing or other feature as a datum for guiding the tool. The insulation width can be set to match the spacing between studs 830. A sprayer 1210 can be used to apply adhesive onto a surface for batting or blanket insulation coupling to the surface.

The automated drywalling system 100 can include a cutting tool for trimming insulation 650 after it has been applied. The system 100 can create a map or model of the room given the application parameters and/or by directly mapping the room after the insulation 650 has been applied. The model or map of the room with insulation 650 can be used to determine areas that need to be trimmed or cut to enable the closing of the walls and the installation of doors or windows. An insulation trimming system can follow the front edge of the studs 830, or other framing elements, and cut insulation 650 that protrudes beyond the plane of the stud 830. In one embodiment, an insulation trimming system can comprise a blade that is pushed along two studs 830 removing insulation material 650 that extends beyond the plane created by the studs 830. The insulation trimming tool can be powered or unpowered. The base unit 120, robotic arm 140, and/or end effector 160 can be used to drive a cutting tool through the insulation. The insulation 650 can be cut to create room for electrical boxes, wires, framing, conduit, pipes, or any other mechanical, electrical or plumbing component.

The system 100 can also be used to apply the joint tape 640 and/or joint compound 630 and achieve any level of drywall finish, including between 0 and 5. The system 100 can utilize joint compound 630, also known as mud or setting type compound or hot mud. Joint compound 630 can include pre-mixed, topping, taping, and all-purpose compounds. An end effector 160 that automatically dispenses a desired amount of compound 630, and tape 640 can be attached by the base unit 120, robotic arm 140, and/or end effector 160. In some examples, tape 640 can be dyed or marked so that it is easier for one or more vision systems 324, 364 to identify. Different tapes 640 can be used to provide information to the system 100 about the specific joint 620. In some examples, an end effector 160 can use a joint compound 630 comprising fibers to replace or in addition to tape 640. One or more vision systems 324, 364 can be used to identify the seams 620 between boards of drywall 610 and guide the base unit 120, robotic arm 140, and/or end effector 160 during taping. The system 100 can also use the base unit 120, robotic arm 140, and/or end effector 160 to guide taping tools such as a bazooka or banjo taping system, which can be sensorized and automated.

In various embodiments, an end effector 160 can utilize a disposable or removable nozzle, cartridge, or packet to deliver the joint compound 630, insulation 650, paint 930, or the like. This component can then be detached from the end effector 160 and thrown away. As discussed herein, in some examples, the system 100 can deliver the joint compound 630 via a sprayer 1210 that is fed pre-mixed compound. The compound 630 can be sprayed before applying the tape 640 and/or after applying the tape 640. The system 100 can use a mesh or porous tape 640 to allow the compound 630 to be sprayed through the tape 640 to fill a gap under the tape 640.

In some embodiments, joint compound 630 can be applied or smoothed using a blade that is dragged over the applied joint compound 630. The end effector 160 can apply joint compound 630 and tape 640 at the same time for a first layer, can apply only compound 630 over the tape 640, or the like. The shape, profile, and size of the blade can be controlled to deliver the desired profile of compound 630. Similarly, the pressure or force on the blade can be controlled to change the thickness and profile of the applied compound 630. The robotic manipulator can also use a drywall flat box 1515 to apply the joint compound 630 as discussed herein (see e.g., FIG. 15).

To achieve the desired flatness of the finished drywall 610, the system 100 can optimize the delivery of the compound 630 to build up more mud on low spots and less on high spots. The vision systems 324, 364 and/or sensors 326, 346, 366 can be used to create a topographical map of the plane to identify high and low spots. The system 100 can also utilize rollers, proximity sensors, contact sensors, and profilometers to measure the profile of the surface. The system 100 can also use information of the joint location to profile the delivery of joint compound 630 to account for the height variations typical of joints 620. The end effector 160 can then be used to apply a specific profile of joint compound 630 to the wall. This can be done by controlling the profile of a sprayer 1210, the shape and size of a troweling blade, a distance between the end effector 160 and board of drywall 610, the application speed, the number of passes over a given spot, the consistency of joint compound 630, and the like. A thickness measurement can also be used to determine an amount of joint compound 630 that is to be delivered to a given spot.

The system 100 can also tune the profile of the delivered joint compound 630 to account for overlap of the subsequent application of joint compound 630. The joint compound thickness at the edges can be reduced such that the overlap region achieves the final desired thickness. This approach can be used to increase overlap error tolerance at transition points between robot workspaces. The automated drywalling system 100 can utilize information about the room, compound mixture and desired compound profile to determine a joint compound application profile to account for shrinkage of the joint compound 630. Compound mixture definition can include real-time adjustments of gypsum, plaster of paris, and water content for desired results given environmental conditions, and layer finish requirements.

To finish mudded drywall 610 (see e.g., FIGS. 9a and 10b), the automated drywalling system 100 can utilize a powered or unpowered sander to smooth or remove joint compound 630 or plaster. The sander can be integrated as a sanding end effector 160S for the robotic arm 140 as discussed herein. The base unit 120, robotic arm 140, and/or end effector 160 can utilize force control to apply the pressure required to remove the desired amount of material or achieve the desired surface texture or roughness. Sanding path and pressures can be informed by thickness measurements, data on the flatness of the wall obtained from vision systems 324, 364 and/or sensors 326, 346, 366, or information recorded on how the joint compound 630 was applied in previous steps. By controlling or measuring and accounting for sanding pressure, tool and toolpath parameters, and compound composition, a desired amount of joint compound 630 can be removed to achieve a desired flatness. Tool parameters include size, grit, shape of sandpaper, and the like. Toolpath parameters can include rotational speed, feed rate, dwell time, overlap region, and the like. The system 100 can also utilize information on the location and type of seams 620, defects or other obstacles, and the like, to determine toolpaths and tool parameters. Tool parameters that can be controlled include applied normal force, rotational speed of the sander, sander torque, paper grit, and the like. Tool path parameters include speed at which the tool moves relative to the drywall 610 or into the drywall 610 also known as feeds, dwell time at a given point, size of overlap, lead-in and lead-out sequences, path sequence, direction of feed relative to the tool rotation, and the like. The sanding time, sander rotational speed, motor torque and load, as well as force applied can also be tracked to dictate when the sanding paper must be cleaned or changed. The user interface can display the wear on the pad and alert the user when the disk needs to be changed. The automatic drywalling system 100 can also include an automatic sanding disk station that allows the system 100 to replace sanding pads without any human intervention.

The automated drywalling system 100 can be used to prime and paint surfaces as discussed herein. A painting effector 160P can be used to dispense the paint 930, or a roller can be used to apply paint 930 either by directly depositing the paint 930 or by back rolling over a spray of paint 930. The paint 930 can be delivered to the roller through a nozzle 1240 or sprayer 1210. A hood or other cover can be used around the sprayer 1210 or roller to capture overspray, fumes and drips. The hood can utilize negative pressure to collect the overspray. Monitoring of the tool time can be used to indicate when a filter must be changed. The system 100 can control tool speed, spray shape, coating flow rate, distance from the wall, applied pressure on the roller, number of layers applied, dwell time, direction and angle of application, or a combination of these to apply the desired coating thickness of paint 930 and achieve the desired finish. One or more of the vision systems 324, 364 and/or sensors 326, 346, 366 can be used to detect applied thickness, moisture content, coating consistency, and coverage of paint 930. The vision systems 324, 364 and/or sensors 326, 346, 366 can be used to detect surfaces that have been treated, to identify areas that require a different process and to track task progress. Cameras can be used to allow users to verify quality at the site or remotely. The system 100 can optimize tool and path parameters to achieve the desired quality. The target surface can be illuminated with different lights and wavelengths to enable the detection of defects or to allow the user or system 100 to evaluate the coating of paint 930 under different conditions.

Tools and/or end effectors 160 can be mounted onto the robotic arm 140 in series with a structure that limits, sets, or controls the amount of force applied on a target surface. The structure can limit, set or control only the normal force applied on the surface by the blades, rollers, or the like, and/or it can limit, set or control forces applied by the tools along the target surface as well as torques applied. Blades or rollers can be mounted on an air bag, air shock, air cylinder, air bellows, with a fixed or variable pressure setting. The pressure and the normal area of the pressure vessel can set the amount of forces applied by the tool on the surface. The blade or roller can also be mounted on a spring, tunable spring, or shock in order to set, limit or control the forces applied on the surface. Forces can also be set, limited or controlled using a pressure controlled hydraulic system including a cylinder, bellows, or reservoir. In one embodiment, a short-stroke low-mass end effector linear actuator mechanism is used for fast tracking of surface contours and constant normal force. In embodiments with more than one tool, the tools can be mounted on a single force limiting structure or each head or multiple tools can be mounted on separate structures. Mounting the tools or group of tools on separate structures allows for the applied forces and moments to be set, limited, or controlled separately.

An end effector 160 can include sensors 366 and/or a vision system 364 to provide a desired orientation of the end effector 160 or tool of the end effector 160 relative to a wall or other target surface. One example can include providing for the planarity of a sanding head 1105 relative to a target surface; however the sanding head 1105 can also be set an angle to the target surface. Planarity can be established by utilizing the sensors 366 and/or a vision system 364 to detect the plane of the surface and then match the position of the sanding head 1105 using the degrees of freedom of the base unit 120 and/or robotic arm 140. Planarity can also be established by utilizing a vision sensor 364 at the end effector 160, or a set of sensors 366 (e.g., proximity, range, or contact sensors) to establish a position of the sander head 1105 relative to the wall. The tool orientation can be controlled directly by the setting the joint angles of the base unit 120, robotic arm 140, and/or end effector 160, by a powered gimbal or joint at the end effector 160, or by a passive gimbal that allows the sanding pad to tip and tilt relative to the end of the robotic arm 140. Such a passive gimbal can enable the sanding head 1105 to follow the plane of the surface despite errors in the position of the base unit 120, robotic arm 140, and/or end effector 160. In another embodiment, the position of a tool or end effector 160 can be controlled using feedback from the vision systems 324, 364 and/or sensors 326, 346, 366 that establish the relative orientation between the tool and surface. Powered or passive gimbals or end effector degrees of freedom can be encoded such that the orientation of the sanding head 1105 is known to the system 100.

An end effector 160 can also utilize outriggers such as rollers, or the like, to use adjacent surfaces or raised edges as datums to guide drywalling tasks and achieve accurate corners, and the like. Such rollers can be instrumented to measure force, contact, proximity or passively make contact while the system 100 utilizes force and torque sensing to maintain a pressure or force against the datum surface. The information about tool orientation relative to the system 100 can be used to alter the toolpath and system configuration to ensure the drywall automation system 100 can carry out the process without running into limitations of the hardware.

The system 100 can include vision systems 324, 364 and/or sensors 326, 346, 366 (e.g., humidity, temperature, air flow sensors, and the like) to establish the environmental conditions for one or more drywalling task. The automated drywalling system 100 can utilize such environmental sensors to determine optimal joint compound, paint, and insulation mixture ratios, set path parameters such as feed speed, thickness of mud applied, blade profiles and pressures, sander settings, and the like. Environmental information in conjunction with parameters of joint compound 630, insulation 650, paint 930, and the like, can be used to determine or estimate drying and setting times for such materials, which can allow the system 100 to plan when the next step should begin. The system 100 can also determine when such materials have set and/or dried by measuring moisture content of such materials, thermal conductivity of a covered seam 620, using a thermal imaging camera or thermometer (contact or non-contact), by detecting differences in colors using a camera, and the like. Thermal measurements can be used to infer moisture content of such materials by comparing the temperature of the material to surrounding materials. For example, as water or other solvent evaporates from a mixture, the temperature of the material can be lower than that of the surrounding materials. Models of the joint compound, paint, and insulation drying or curing process can also be used to estimate the time to dry and/or cure given a set of starting conditions and information about the environment. Environmental from vision systems 324, 364 and/or sensors 326, 346, 366 can be used in conjunction with an HVAC system or heater, air conditioner, fans to control the room conditions. Readings from vision systems 324, 364 and/or sensors 326, 346, 366 can trigger any of these systems, or a combination, to maintain the room at the desired conditions for quality, reduced drying time, or comfort of the operator.

In various embodiments, vision systems 324, 364 can identify and track features of the base unit 120, robotic arm 140, and/or end effector 160 to estimate a robot state. The system 100 can utilize several estimates of the robot state such as kinematic model and odometry, joint level sensing, a vision estimate, and the like, to create a more accurate representation of the robot state. The identification of features of the base unit 120, robotic arm 140, and/or end effector 160 can be simplified in some examples by placing tags (unique or non-unique) on the robot, workspace, objects, end effectors and the like. The vision system can utilize information about such tags to search and ID the tags. The system 100 can have a file of information corresponding to the tag or feature. The file can include information such as a full 3D model, size, weight, use of the marked object, and the like.

The vision systems 324, 364 and/or sensors 326, 346, 366 can be used to create a full or partial model of a room, work surface or construction site. The system 100 can utilize a previously generated 3D model of the space to enhance the model created by the vision systems 324, 364 and/or sensors 326, 346, 366, or to fit the data from the vision systems 324, 364 and/or sensors 326, 346, 366. Features that the vision systems 324, 364 and/or sensors 326, 346, 366 can identify include corners, edges between adjacent walls, ceiling, floor, windows, doors, outlets, seams, fasteners, openings, and the like. The system 100 can utilize one or more vision systems 324, 364 and/or sensors 326, 346, 366 to achieve workspace coverage and ensure features are not occluded by the robot, worker, obstacles and cart. The vision systems 324, 364 and/or sensors 326, 346, 366 can be mounted on the base unit 120, robotic arm 140, and/or end effector 160, or as stand-alone units in a work area. During various drywalling tasks, the vision systems 324, 364 and/or sensors 326, 346, 366 can be used to identify and establish the plane of the target surface. The vision systems 324, 364 and/or sensors 326, 346, 366 can also use the surface to guide the motion of the base unit 120 along a wall and controlling the distance between the base unit 120, wall and ceiling. The vision systems 324, 364 and/or sensors 326, 346, 366 can be used to identify seams 620 and fasteners 640, or the like before taping, after taping and after being covered with mud 630. The location of such elements can allow the system planner to establish how a surface should be finished and to track the location of the base unit 120, robotic arm 140, and/or end effector 160.

The computational planner can utilize one or more vision systems 324, 364 and/or sensors 326, 346, 366 to achieve a desired workspace coverage and to help ensure features are not occluded by the base unit 120, robotic arm 140, end effector 160, obstacles, workers, or the like. The one or more vision systems 324, 364 can comprise multiple full or partial combination of multiple cameras, ranging systems, and the like whose outputs can be stitched together to create a composite point cloud, image, model of a workspace, or the like. In some examples, the system 100 can use multiple RGB cameras with depth sensors (RGBD) and/or LIDAR sensors. The system 100 can operate in an iterative manner where the planner adjusts the viewpoint of the one or more vision systems 324, 364 to "get a closer look" at features or cutouts, to look behind an obstacle, and the like. The planner can utilize simultaneous localization and mapping (SLAM) to construct and update a map of the environment while simultaneously keeping track of the location of the base unit 120, robotic arm 140, and/or end effector 160. In some examples, the autonomous mobile base 120 can be driven by outputs of a SLAM algorithm, odometry, safety sensors, and the like. SLAM algorithms can use BIM, maps, models, or the like, of the site as a starting point for mapping. The planner can use SLAM to patch or update existing maps. The mobile base 120 can be used to move the vision systems 324, 364 and/or sensors 326, 346, 366 around a workspace to collect a map of a workspace.

The planner can use one or more vision systems 324, 364 and/or sensors 326, 346, 366 to identify no-go zones, which are zones that should not be treated. For example, such no-go zones can comprise 2D areas on a surface such as windows, outlets, or other openings that should not be treated; therefore, the end effector 160 should not be driven to enter these areas. No-go zones can also be 3D volumes that the base unit 120, robotic arm 140, and/or end effector 160 should not be driven to enter. In various examples, such no-go zones can comprise sensitive spaces, or volumes that are filled by obstacles, equipment, people, and protrusions from a target surface. The vision systems 324, 364 and/or sensors 326, 346, 366 can identify an obstacle, object, person, or the like and create a 3D volume no-go zone around such an identified obstacle, object, person, or the like, to identify locations that the computational planner should not drive the vision systems 324, 364 and/or sensors 326, 346, 366 to enter. Once such an obstacle, object, person, or the like, is identified it can be tracked and the no-go volume or plane can be updated.

In other words, two or three dimensional no-go zones can be identified by the system 100 and/or by a user and these no-go zones can be updated based on movement of objects (e.g., workers, robots, construction materials, or the like) or can be updated based on changes in conditions within go zones and/or no-go zones (e.g., addition of drywall, mudding, sanding, painting). In various embodiments, establishing and/or updating such go and no-go zones can be important for workers and other people who will be moving around the system 100.

The system 100 can track the task time, pressure, material flow rate, material characteristics (e.g., of insulation 650, joint compound 630, paint 930, or the like), and clog events to estimate and inform when a nozzle 1240 or blade of an end effector 160 should be cleaned or changed. The nozzle and blade wear models can also take as an input the type of material applied and the conditions under which it was applied.

The vision systems 324, 364 and/or sensors 326, 346, 366 can be used to detect finish, tool pattern, and the like, and establish if the nozzle 1240 or blade needs to be changed. A user interface can display wear on the nozzle 1240 or blade and alert a user when such elements need to be changed. A spraying system can include a mechanism to automatically replace the nozzle 1240. One embodiment can use a cassette with replacement nozzles 1240 that can be rotated into place. The sprayer 1210 can also have a mechanism to rotate the nozzle 1240 or tip to clear a clog. The nozzle clearing or replacement can be run without any human intervention or as a collaboration between the system 100 and the user.

The system 100 can reduce health and safety concerns associated with sanding, painting, mud application, insulation application, and the like, which can enable methods of finishing that involve a large amount of sanding or other drywalling tasks. Methods of finishing that involve tight process controls can also be implemented through the use of the automated drywalling system 100. Tracking and controlling aspects of one or more drywalling task including material applied, environmental conditions, tool speed and location, and the like, can enable the use of material and process models that can be used to optimize various drywalling processes. For example, in a sanding task, control of the sanding task parameters including normal force, tool speed and torque, position and feed rate enable precision sanding to control the removal rate required to achieve a desired flatness. Information about the applied mud such as thickness, consistency, time since deposition, composition of mixture, and environmental conditions can be used to determine optimal sanding process parameters.

The information from the vision systems 324, 364 and/or sensors 326, 346, 366 can also be used to determine and apply the optimal joint compound profile. The system 100 can enable this approach by gathering detailed information on the surface profile and flatness and by controlling the delivery of joint compound 630 to the surface. The consistency, volume, composition, water content, delivery profile, tool speed, feed rate and other parameters can be controlled to achieve the desired mud profile and thickness. In one embodiment, the thickness of applied joint compound 630 can be tapered as a function of distance from a joint 620. In further examples, thickness of applied joint compound 630 can also be tapered at regions that will be overlapped (for example: resuming work after a transition or movement of the mobile base 120). A 3D printing approach to leveling the surface can be utilized where the system controls the amount and location of applied joint compound 630. The compound composition can be altered in real time based on measurements as well as updated models. The automated application of joint compound 630 and sanding can change the amount of layers required to finish a surface or achieve a given level of quality. Controlling or monitoring the parameters of joint compound 630, environmental conditions, layer thickness, and delivery profile can enable the use of a reduced number of layers to achieve the desired finish. Reducing the number of layers can decrease the amount of time required to complete the task. Controlling the mixing of the joint compound 630 can allow for the use of faster setting joint compounds 630 to reduce drying time between layers. Mixing at a nozzle 1240 can be used to minimize wasted material, cleaning time, or achieve tighter control on mud composition. Additives can be mixed into the joint compound 630 at the nozzle 1240 or at a mixer. The additives can be used to differentiate different layers of applied compound 630 or facilitate feature recognition using the one or more vision systems 324, 364. One embodiment utilizes different colorants for each layer of joint compound 630 to provide a visual feedback to the system 100 once a layer has been removed or a layer has been covered (e.g., via sanding, painting, or the like). In some examples, additives can be invisible to the human eye yet visible to the one or more vision systems 324, 364.

Although various examples discussed herein can relate to construction, including application of insulation and drywall hanging and finishing, the present disclosure should not be construed to be limiting on the wide variety of other applications that automated drywalling systems 100 can be used for. For example, in further embodiments, one or more systems 100 can be used with plaster, stucco, cement, polymer coatings, varnishes, or organic and inorganic compounds. In some examples, the system 100 can control the delivery of plaster or joint compound 630 and can use the base unit 120, robotic arm 140, and/or end effector 160 to trowel, float, and sand the plaster or compound 630. The system can also be used to apply other compounds, thermal sprays, foam insulation, and the like. After the drywall 610 has been finished, the automated system 100 can be used to apply primer, paint, varnishes or other coatings. The base unit 120, robotic arm 140, and/or end effector 160 can be used to sand, smooth, and/or polish other surfaces including concrete, stone, polymer, metal, and wood. The system 100 can sand surfaces to prepare for coatings or to remove coatings, rust, defects, or the like.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. An automated drywalling system network comprising:
 a plurality of automated drywalling systems that each comprise: a base unit that includes:
  a platform, a cart configured to be disposed on and move on the ground, and a lift disposed between the platform and cart, the lift configured to raise the platform up and down;
  an elongated robotic arm that extends between a base end and a distal end, the robotic arm coupled to the base unit on the platform at the base end of the robotic arm; and
  one or more vision systems, and
 a plurality of drywalling end effectors configured to interchangeably couple to each of the distal ends of the robotic arms of the plurality of automated drywalling systems, with each of the plurality of end effectors configured to be controlled by each of the plurality of automated drywalling systems when a respective end effector of the plurality of end effectors is coupled to a respective automated drywalling system of the plurality of automated drywalling systems, the plurality of end effectors comprising:
  an insulation end effector configured to apply insulation to a wall assembly;
  a drywall hanging end effector configured to hang drywall pieces on a wall assembly;
  a drywall mudding end effector configured to apply joint compound to a drywall pieces disposed on a wall assembly;
  a drywalling sanding end effector configured to sand joint compound on drywall pieces disposed on a wall assembly; and
  a drywall painting end effector configured to paint drywall pieces disposed on a wall assembly; and an electronic visualization system that presents a visualization associated with a target wall assembly that generates information to be read by the one or more vision systems in order to control each of the plurality of end effectors when a respective end effector of the plurality of end effectors is coupled to a respective automated drywalling system of the plurality of automated drywalling systems.

2. The automated drywalling system network of claim 1, wherein the mudding end effector is further configured to apply joint tape to one or more joints between respective drywall pieces disposed on the wall assembly.

3. The automated drywalling system network of claim 2, wherein the mudding end effector is further configured to run a blade over joint tape and joint compound applied at the one or more joints between the respective drywall pieces.

4. The automated drywalling system network of claim 1, wherein each of the plurality of automated drywalling systems further comprises a vacuum hood disposed at the distal end of the respective robotic arm, the vacuum hood configured to surround each of the plurality of drywalling end effectors when a respective drywalling end effector is interchangeably coupled to the distal ends of the robotic arms.

5. The automated drywalling system network of claim 1, wherein the mudding end effector and painting end effector further comprise a blower, and
wherein the blower is configured to apply heat and/or dry air to material that has been applied by the mudding end effector or painting end effector.

6. The automated drywalling system network of claim 1, wherein the mudding end effector, insulation end effector, and painting end effector further comprise a spray gun to generate a material spray.

7. An automated drywalling system network comprising:
a plurality of automated drywalling systems that each comprise a robotic arm and one or more vision systems; and
a plurality of drywalling end effectors configured to interchangeably couple to a respective distal end of each of the robotic arms of the plurality of automated drywalling systems, with each of the plurality of end effectors configured to be controlled by each of the plurality of automated drywalling systems when a respective end effector of the plurality of end effectors is coupled to a respective automated drywalling system of the plurality of automated drywalling systems, the plurality of end effectors comprising:
a drywall mudding end effector configured to apply joint compound to a drywall pieces disposed on a wall assembly;
a drywalling sanding end effector configured to sand joint compound on drywall pieces disposed on a wall assembly; and
a drywall painting end effector configured to paint drywall pieces disposed on a wall assembly; and
an electronic visualization system that presents a visualization associated with a target wall assembly that generates information to be read by the one or more vision systems in order to control each of the plurality of end effectors when a respective end effector of the plurality of end effectors is coupled to a respective automated drywalling system of the plurality of automated drywalling systems.

8. The automated drywalling system network of claim 7, wherein different automated drywalling systems perform at least one hanging task, at least one mudding task, at least one sanding task, and at least one painting task.

9. The automated drywalling system network of claim 7, wherein the mudding end effector is further configured to apply joint tape to one or more joints between respective drywall pieces disposed on the wall assembly.

10. The automated drywalling system network of claim 7, wherein at least one of the plurality of end effectors includes a force limiting stage assembly that comprises one or more pneumatic springs configured to allow the at least one end effector to move relative to the distal end of the robotic arm to limit force applied to the target surface.

11. The automated drywalling system network of claim 7, wherein each of the plurality of automated drywalling systems further comprises a vacuum hood disposed at the distal end of the respective robotic arm.

12. The automated drywalling system network of claim 7, wherein the mudding end effector and painting end effector further comprise a blower, and wherein the blower is configured to apply heat and/or dry air to material that has been applied by the mudding end effector or painting end effector.

13. The automated drywalling system network of claim 7, wherein the mudding end effector, and painting end effector further comprise a spray gun to generate a material spray.

14. An automated drywalling system network comprising:
one or more automated drywalling systems that each comprise a robotic arm and one or more vision systems; and
two or more of drywalling end effectors configured to couple to a distal end of the robotic arms of the one or more automated drywalling systems, the two or more drywalling end effectors selected from a set consisting of:
an insulation end effector;
a drywall hanging end effector;
a drywall mudding end effector;
a drywalling sanding end effector;
a drywall painting end effector; and
an electronic visualization system that presents a visualization associated with a target wall assembly that generates information to be read by the one or more vision systems in order to control each of the plurality of end effectors when a respective end effector of the plurality of end effectors is coupled to a respective automated drywalling system of the plurality of automated drywalling systems.

15. The automated drywalling system network of claim 14, wherein the automated drywalling system network comprises a mudding end effector, and wherein the mudding end effector is further configured to apply joint tape to one or more joints between respective drywall pieces disposed on a wall assembly.

16. The automated drywalling system network of claim 14, wherein the two or more drywalling end effectors further include a guiding element configured to engage a target surface or adjacent portion of a wall assembly to guide the respective two or more drywalling end effectors in performing one or more drywalling task on a target surface.

17. The automated drywalling system network of claim 14, wherein the automated drywalling system network comprises a mudding end effector, a sanding end effector and a painting end effector; and wherein the mudding end effector, sanding end effector and painting end effector are configured to be surrounded by a vacuum hood when the mudding end effector, sanding end effector and painting end effector are respectively interchangeably coupled to the robotic arm.

18. The automated drywalling system network of claim 14, wherein the automated drywalling system network comprises a mudding end effector and a painting end effector;
wherein the mudding end effector and painting end effector further comprise a blower; and
wherein the blower is configured to apply heat and/or dry air to material that has been applied by the mudding end effector or painting end effector.

19. The automated drywalling system network of claim 14, wherein the automated drywalling system network comprises a mudding end effector and a painting end effector, and wherein the mudding end effector, and painting end effector further comprise a spray gun to generate a material spray.

20. The automated drywalling system network of claim 14, wherein instructions are generated for the two or more of drywalling end effectors to perform at least one drywalling task, and
wherein the instructions to perform the at least one drywalling task are generated based on identified features of a wall assembly identified by a vision system of the automated drywalling system network, and wherein the at least one drywalling task includes one or more of:
avoiding identified features including obstacles or openings,
changing an amount of material added or removed from a wall assembly based on an identified feature; or
selecting an alternative toolpath based on an identified feature.

21. The automated drywalling system network of claim 1, wherein at least one automated drywalling system is configured to drive a sanding end effector coupled to the robotic arm of the automated drywalling system to perform a sanding task that includes sanding specific areas of joint compound applied to pieces of drywall hung on studs of a target wall assembly.

* * * * *

UNITED STATES PATENT AND TRADEMARK OFFICE
CERTIFICATE OF CORRECTION

| | |
|---|---|
| PATENT NO. | : 10,697,188 B2 |
| APPLICATION NO. | : 15/942286 |
| DATED | : June 30, 2020 |
| INVENTOR(S) | : Maria J. Telleria et al. |

It is certified that error appears in the above-identified patent and that said Letters Patent is hereby corrected as shown below:

In the Claims

Column 40, Line 34, cancel the text beginning with "1. An automated drywalling" to and ending "automated drywalling systems." in Column 41, Line 8 and insert the following claim:
--1. An automated drywalling system network comprising:
  a plurality of automated drywalling systems that each comprise:
    a base unit that includes:
      a platform,
      a cart configured to be disposed on and move on the ground, and
      a lift disposed between the platform and the cart, the lift configured to raise the platform up and down;
    an elongated robotic arm that extends between a base end and a distal end, the robotic arm coupled to the base unit on the platform at the base end of the robotic arm; and
      one or more vision systems, and
  a plurality of drywalling end effectors configured to interchangeably couple to each of the distal ends of the robotic arms of the plurality of automated drywalling systems, with each of the plurality of drywalling end effectors configured to be controlled by each of the plurality of automated drywalling systems when a respective end effector of the plurality of drywalling end effectors is coupled to a respective automated drywalling system of the plurality of automated drywalling systems, the plurality of drywalling end effectors comprising:
      an insulation end effector configured to apply insulation to a wall assembly;
      a drywall hanging end effector configured to hang drywall pieces on the wall assembly;
      a drywall mudding end effector configured to apply joint compound to the drywall pieces disposed on the wall assembly;
      a drywalling sanding end effector configured to sand the joint compound on the drywall pieces disposed on the wall assembly; and
      a drywall painting end effector configured to paint the drywall pieces disposed on the wall assembly; and Signed and Sealed this
Sixth Day of December, 2022

Katherine Kelly Vidal
*Director of the United States Patent and Trademark Office* an electronic visualization system that presents a visualization associated with a target wall assembly that generates information to be read by the one or more vision systems in order to control each of the plurality of drywalling end effectors when a respective end effector of the plurality of drywalling end effectors is coupled to a respective automated drywalling system of the plurality of automated drywalling systems.--

Column 41, Line 9, cancel the text beginning with "2. The automated drywalling" to and ending "the wall assembly." in Column 41, Line 12 and insert the following claim:
--2. The automated drywalling system network of claim 1, wherein the drywall mudding end effector is further configured to apply joint tape to one or more joints between respective drywall pieces disposed on the wall assembly.--

Column 41, Line 13, cancel the text beginning with "3. The automated drywalling" to and ending "respective drywall pieces." in Column 41, Line 16 and insert the following claim:
--3. The automated drywalling system network of claim 2, wherein the drywall mudding end effector is further configured to run a blade over the joint tape and the joint compound applied at the one or more joints between the respective drywall pieces.--

Column 41, Line 17, cancel the text beginning with "4. The automated drywalling" to and ending "the robotic arms." in Column 41, Line 25 and insert the following claim:
--4. The automated drywalling system network of claim 1, wherein each of the plurality of automated drywalling systems further comprises a vacuum hood disposed at the distal end of the respective robotic arm, the vacuum hood configured to surround each of the plurality of drywalling end effectors when a respective drywalling end effector is interchangeably coupled to the distal ends of the respective robotic arms.--

Column 41, Line 26, cancel the text beginning with "5. The automated drywalling" to and ending "painting end effector." in Column 41, Line 31 and insert the following claim:
--5. The automated drywalling system network of claim 1, wherein the drywall mudding end effector and the drywall painting end effector further comprise a blower, and
wherein the blower is configured to apply heat and/or dry air to material that has been applied by the drywall mudding end effector or the drywall painting end effector.--

Column 41, Line 32, cancel the text beginning with "8. The automated drywalling" to and ending "a material spray." in Column 41, Line 35 and insert the following claim:
--6. The automated drywalling system network of claim 1, wherein the drywall mudding end effector, the insulation end effector, and the drywall painting end effector further comprise a spray gun to generate a material spray.--

Column 41, Line 36, cancel the text beginning with "7. An automated drywalling" to and ending "automated drywalling systems." in Column 41, Line 65 and insert the following claim:
--7. An automated drywalling system network comprising:
    a plurality of automated drywalling systems that each comprise a robotic arm and one or more vision systems; and
    a plurality of drywalling end effectors configured to interchangeably couple to a respective distal end of each of the robotic arms of the plurality of automated drywalling systems, with each of the plurality of drywalling end effectors configured to be controlled by each of the plurality of automated drywalling systems when a respective end effector of the plurality of drywalling end effectors is coupled to a respective automated drywalling system of the plurality of automated drywalling systems, the plurality of drywalling end effectors comprising:

a drywall mudding end effector configured to apply joint compound to drywall pieces disposed on a wall assembly;

a drywalling sanding end effector configured to sand joint compound on the drywall pieces disposed on the wall assembly; and a drywall painting end effector configured to paint the drywall pieces disposed on the wall assembly; and an electronic visualization system that presents a visualization associated with a target wall assembly that generates information to be read by the one or more vision systems in order to control each of the plurality of drywalling end effectors when a respective end effector of the plurality of drywalling end effectors is coupled to a respective automated drywalling system of the plurality of automated drywalling systems.--

Column 42, Line 3, cancel the text beginning with "9. The automated drywalling" to and ending "the wall assembly." in Column 42, Line 6 and insert the following claim:
--9. The automated drywalling system network of claim 7, wherein the drywall mudding end effector is further configured to apply joint tape to one or more joints between respective drywall pieces disposed on the wall assembly.--

Column 42, Line 7, cancel the text beginning with "10. The automated drywalling" to and ending "the target surface." in Column 42, Line 12 and insert the following claim:
--10. The automated drywalling system network of claim 7, wherein at least one of the plurality of drywalling end effectors includes a force limiting stage assembly that comprises one or more pneumatic springs configured to allow the at least one of the plurality of drywalling end effectors to move relative to the distal end of the robotic arm to limit force applied to a target surface.--

Column 42, Line 18, cancel the text beginning with "12. The automated drywalling" to and ending "painting end effector." in Column 42, Line 22 and insert the following claim:
--12. The automated drywalling system network of claim 7, wherein the drywall mudding end effector and the drywall painting end effector further comprise a blower, and wherein the blower is configured to apply heat and/or dry air to material that has been applied by the drywall mudding end effector or the drywall painting end effector.--

Column 42, Line 23, cancel the text beginning with "13. The automated drywalling" to and ending "a material spray." in Column 42, Line 25 and insert the following claim:
--13. The automated drywalling system network of claim 7, wherein the drywall mudding end effector, and the drywall painting end effector further comprise a spray gun to generate a material spray.--

Column 42, Line 26, cancel the text beginning with "14. An automated drywalling" to and ending "automated drywalling systems." in Column 42, Line 47 and insert the following claim:
--14. An automated drywalling system network comprising:
    one or more automated drywalling systems that each comprise a robotic arm and one or more vision systems;

two or more drywalling end effectors configured to interchangeably couple to a distal end of the robotic arms of the one or more automated drywalling systems, with each of the two or more drywalling end effectors configured to be controlled by each of the one or more of automated drywalling systems when a respective end effector of the two or more drywalling end effectors is coupled to a respective automated drywalling system of the one or more of automated drywalling systems, the two or more drywalling end effectors selected from a set consisting of:
    an insulation end effector;
    a drywall hanging end effector;
    a drywall mudding end effector;
    a drywalling sanding end effector; and
    a drywall painting end effector; and
an electronic visualization system that presents a visualization associated with a target wall assembly that generates information to be read by the one or more vision systems in order to control each of the two or more drywalling end effectors when a respective end effector of the two or more drywalling end effectors is coupled to a respective automated drywalling system of the one or more of automated drywalling systems.--

Column 42, Line 48, cancel the text beginning with "15. The automated drywalling" to and ending "a wall assembly." in Column 42, Line 53 and insert the following claim:
--15. The automated drywalling system network of claim 14, wherein the automated drywalling system network comprises the drywall mudding end effector, and wherein the drywall mudding end effector is further configured to apply joint tape to one or more joints between respective drywall pieces disposed on a wall assembly.--

Column 42, Line 54, cancel the text beginning with "16. The automated drywalling" to and ending "a target surface." in Column 42, Line 59 and insert the following claim:
--16. The automated drywalling system network of claim 14, wherein the two or more drywalling end effectors further include a guiding element configured to engage a target surface or adjacent portion of a wall assembly to guide the respective two or more drywalling end effectors in performing one or more drywalling task on the target surface.--

Column 42, Line 60, cancel the text beginning with "17. The automated drywalling" to and ending "the robotic arm." in Column 42, Line 67 and insert the following claim:
--17. The automated drywalling system network of claim 14, wherein the automated drywalling system network comprises the drywall mudding end effector, the drywalling sanding end effector, and the drywall painting end effector; and wherein the drywall mudding end effector, the drywalling sanding end effector, and the drywall painting end effector are configured to be surrounded by a vacuum hood when the drywall mudding end effector, the drywalling sanding end effector, and the drywall painting end effector are respectively interchangeably coupled to the robotic arm.--

Column 43, Line 1, cancel the text beginning with "18. The automated drywalling" to and ending "painting end effector." in Column 43, Line 8 and insert the following claim:
--18. The automated drywalling system network of claim 14, wherein the automated drywalling system network comprises the drywall mudding end effector and the drywall painting end effector;
    wherein the drywall mudding end effector and drywall painting end effector further comprise a blower; and wherein the blower is configured to apply heat and/or dry air to material that has been applied by the drywall mudding end effector or the drywall painting end effector.--

Column 43, Line 9, cancel the text beginning with "19. The automated drywalling" to and ending "a material spray." in Column 43, Line 14 and insert the following claim:
--19. The automated drywalling system network of claim 14, wherein the automated drywalling system network comprises the drywall mudding end effector and the drywall painting end effector, and wherein the drywall mudding end effector, and the drywall painting end effector further comprise a spray gun to generate a material spray.--

Column 43, Line 15, cancel the text beginning with "20. The automated drywalling" to and ending "an identified feature." in Column 44, Line 10 and insert the following claim:
--20. The automated drywalling system network of claim 14, wherein instructions are generated for the two or more drywalling end effectors to perform at least one drywalling task, and
    wherein the instructions to perform the at least one drywalling task are generated based on identified features of a wall assembly identified by a vision system of the one or more vision systems of the automated drywalling system network, and wherein the at least one drywalling task includes one or more of:
    avoiding the identified features including obstacles or openings,
    changing an amount of material added or removed from the wall assembly based on an identified feature; or
    selecting an alternative toolpath based on the identified feature.--

Column 44, Line 11, cancel the text beginning with "21. The automated drywalling" to and ending "target wall assembly." in Column 44, Line 18 and insert the following claim:
--21. The automated drywalling system network of claim 1, wherein at least one automated drywalling system is configured to drive the drywalling sanding end effector coupled to the robotic arm of the automated drywalling system to perform a sanding task that includes sanding specific areas of the joint compound applied to drywall pieces hung on studs of the target wall assembly.--